US011567985B2

(12) United States Patent
Circlaeys et al.

(10) Patent No.: US 11,567,985 B2
(45) Date of Patent: Jan. 31, 2023

(54) MOOD DETERMINATION OF A COLLECTION OF MEDIA CONTENT ITEMS

(71) Applicant: Apple Inc., Cupertino, CA (US)

(72) Inventors: Eric Circlaeys, Los Gatos, CA (US); James Alan Queen, San Jose, CA (US); Killian Huyghe, San Francisco, CA (US); Zachary H. Smith, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 12 days.

(21) Appl. No.: 16/989,332

(22) Filed: Aug. 10, 2020

(65) Prior Publication Data

US 2020/0372064 A1 Nov. 26, 2020

Related U.S. Application Data

(63) Continuation of application No. 15/896,725, filed on Feb. 14, 2018, now Pat. No. 10,740,383.

(60) Provisional application No. 62/514,899, filed on Jun. 4, 2017.

(51) Int. Cl.
| | |
|---|---|
| *G06F 7/02* | (2006.01) |
| *G06F 16/00* | (2019.01) |
| *G06F 16/44* | (2019.01) |
| *H04N 21/466* | (2011.01) |
| *G06F 16/28* | (2019.01) |
| *G06F 16/683* | (2019.01) |
| *H04N 21/235* | (2011.01) |
| *G06F 16/48* | (2019.01) |
| *H04N 21/414* | (2011.01) |

(52) U.S. Cl.
CPC ............ *G06F 16/44* (2019.01); *G06F 16/287* (2019.01); *G06F 16/48* (2019.01); *G06F 16/683* (2019.01); *H04N 21/2353* (2013.01); *H04N 21/41407* (2013.01); *H04N 21/4668* (2013.01); *G10H 2240/085* (2013.01)

(58) Field of Classification Search
CPC ...... G06F 16/48; G06F 16/287; G06F 16/683; G06F 16/44; G06F 2203/011; G06F 3/0484; H04N 21/4668; H04N 21/41407; H04N 21/2353; G10H 2240/085
See application file for complete search history.

(56) References Cited

U.S. PATENT DOCUMENTS

| | | |
|---|---|---|
| 8,837,831 B2 | 9/2014 | Raju |
| 9,129,008 B1 | 9/2015 | Kuznetsov |
| 9,160,773 B2 | 10/2015 | Bill |
| 9,552,549 B1 | 1/2017 | Gong et al. |
| 9,788,777 B1 | 10/2017 | Knight et al. |
| 10,268,690 B2 | 4/2019 | Bostick et al. |
| 2008/0109391 A1 | 5/2008 | Chan |
| 2009/0313302 A1* | 12/2009 | Teal ..................... G11B 27/105 |
| 2011/0280476 A1 | 11/2011 | Berger et al. |
| 2012/0272185 A1* | 10/2012 | Dodson ............ H04N 21/44204 715/810 |
| 2015/0178915 A1 | 6/2015 | Chatterjee et al. |
| 2017/0091154 A1 | 3/2017 | Eppolito et al. |
| 2017/0125059 A1* | 5/2017 | Zich ..................... G11B 27/034 |
| 2017/0357644 A1 | 12/2017 | Circlaeys et al. |

(Continued)

*Primary Examiner* — Bruce M Moser
(74) *Attorney, Agent, or Firm* — Dickinson Wright RLLP

(57) ABSTRACT

Systems, methods, and computer-readable media for determining at least one valid mood for a collection of media content items of a media library are provided.

20 Claims, 13 Drawing Sheets

(56) References Cited

U.S. PATENT DOCUMENTS

2018/0330152 A1 11/2018 Mittelstaedt et al.
2019/0332656 A1* 10/2019 Chatter ................ G06F 3/0483
2020/0045356 A1* 2/2020 Glasgow .......... H04N 21/23424

* cited by examiner

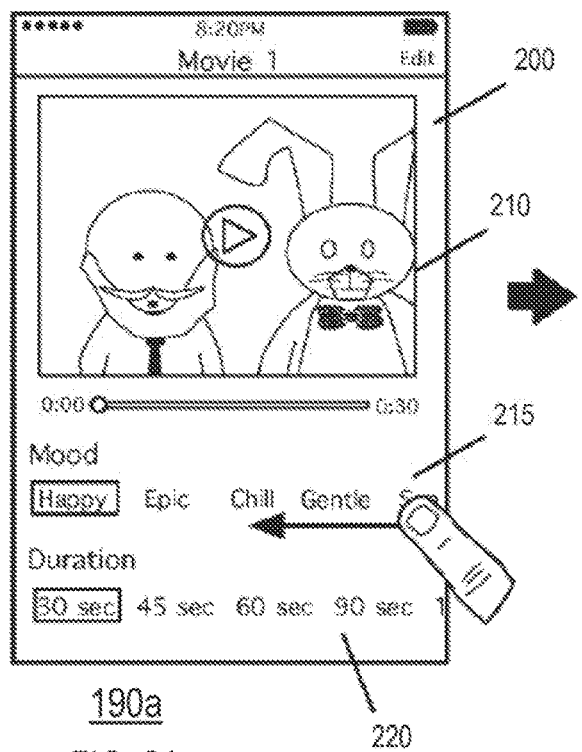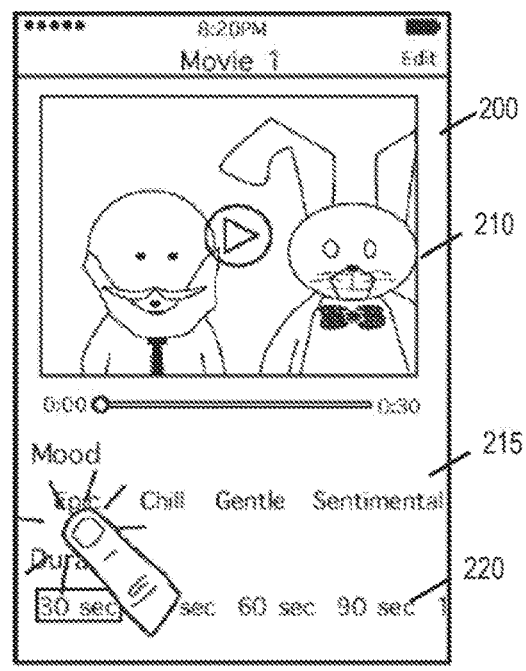
FIG. 2A    FIG. 2B
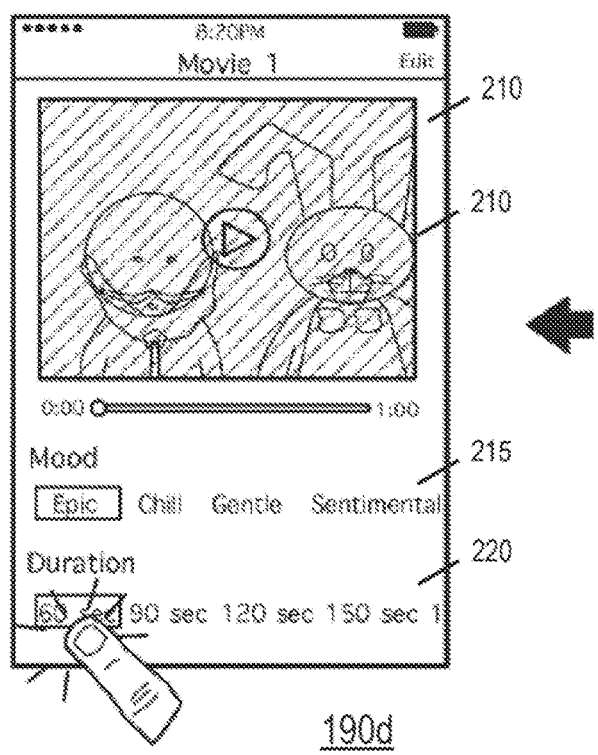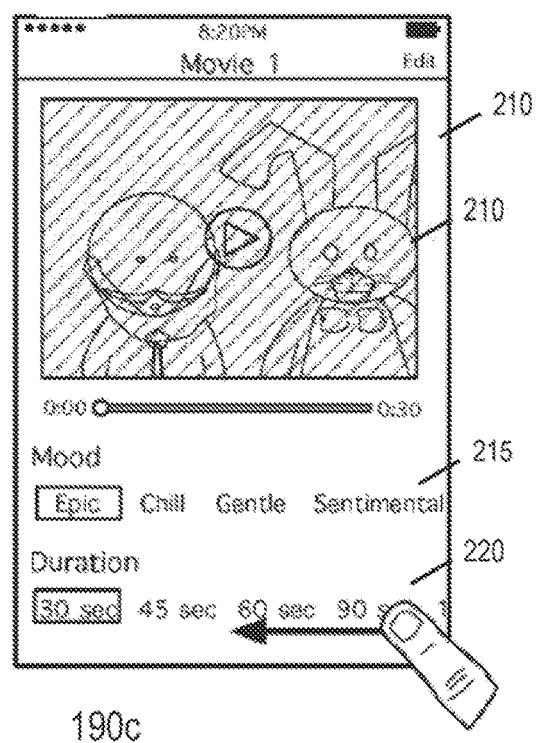
FIG. 2D    FIG. 2C

| Source Type (Weight) Source | 1st Mood (dreamy) 501 | 2nd Mood (sentimental) 502 | 3rd Mood (gentle) 503 | 4th Mood (chill) 504 | 5th Mood (neutral) 505 | 6th Mood (happy) 506 | 7th Mood (uplifting) 507 | 8th Mood (epic) 508 | 9th Mood (club) 509 | 10th Mood (extreme) 510 |
|---|---|---|---|---|---|---|---|---|---|---|
| 520~ Meaning (2.0 Weight) | | | | | | | | | | |
| 521~ "Anniversary" | 0 | +1 | 0 | 0 | 0 | 0 | 0 | 0 | 0 | 0 |
| 522~ "Sport Event" | -1 | -1 | 0 | 0 | 0 | +1 | 0 | +1 | +1 | +1 |
| 523~ "Winter Sport" | 0 | -1 | 0 | 0 | 0 | +1 | +1 | +1 | +1 | +1 |
| 530~ Scene (1.5 Weight) | | | | | | | | | | |
| 531~ "Baby" | 0 | +1 | 0 | 0 | 0 | +1 | +1 | -1 | -1 | -1 |
| 532~ "Candle" | 0 | +1 | +1 | +1 | 0 | 0 | +1 | 0 | 0 | 0 |
| 533~ "Swan" | +1 | +1 | +1 | +1 | 0 | 0 | +1 | 0 | 0 | 0 |
| 534~ "Wedding" | 0 | +1 | 0 | 0 | 0 | 0 | +1 | -1 | 0 | -1 |
| 535~ "Wrestling" | 0 | 0 | 0 | 0 | 0 | 0 | 0 | +1 | 0 | +1 |
| 540~ Network Context (1.0 Weight) | | | | | | | | | | |
| 541~ "At (my) Home" | -1 | -1 | 0 | +1 | 0 | 0 | 0 | -1 | -1 | -1 |
| 542~ "Crowd" | -1 | 0 | 0 | 0 | 0 | 0 | 0 | 0 | 0 | 0 |
| 543~ "No People" | 0 | -1 | 0 | 0 | 0 | -1 | 0 | 0 | 0 | 0 |
| 550~ Memory (1.0 Weight) | | | | | | | | | | |
| 551~ "Earl.Mom.Pers." | +1 | +1 | 0 | 0 | 0 | +1 | 0 | 0 | -1 | -1 |
| 552~ "Feat.Soc.Group" | 0 | +1 | 0 | 0 | 0 | +1 | +1 | 0 | 0 | 0 |
| 553~ "This Season" | -1 | -1 | +1 | +1 | 0 | +1 | +1 | 0 | -1 | -1 |
| 560~ Network Node (0.5 Weight) | | | | | | | | | | |
| 561~ "Restaurant" | 0 | 0 | +1 | +1 | 0 | +1 | 0 | 0 | 0 | 0 |
| 562~ "Travel" | 0 | +1 | +1 | +1 | 0 | +1 | +1 | 0 | 0 | 0 |
| 563~ "Water" | +1 | 0 | +1 | +1 | 0 | 0 | +1 | +1 | 0 | 0 |
| 570~ Video (0.5 Weight) | | | | | | | | | | |
| 571~ "Extreme Tempo" | -1 | -1 | -1 | -1 | 0 | 0 | 0 | +1 | 0 | +1 |
| 572~ "Fast Tempo" | -1 | -1 | -1 | -1 | 0 | 0 | 0 | +1 | 0 | 0 |
| 573~ "Slow Tempo" | 0 | 0 | +1 | +1 | 0 | 0 | 0 | -1 | -1 | -1 |
| 580~ Asset (0.5 Weight) | | | | | | | | | | |
| 581~ "Many Smiles" | 0 | 0 | 0 | 0 | 0 | +1 | 0 | 0 | 0 | 0 |
| 582~ "No Smiles" | 0 | 0 | 0 | 0 | 0 | 0 | 0 | 0 | 0 | 0 |
| 583~ "Some Smiles" | 0 | 0 | 0 | 0 | 0 | +1 | +1 | 0 | 0 | 0 |

FIG. 5

```
┌─────────────────────────────────────────────────────────────────────────┐
│ IDENTIFY A COLLECTION OF A PLURALITY OF MEDIA CONTENT ITEMS (MCIs) OF A │
│ MEDIA LIBRARY AND METADATA ASSOCIATED WITH THE MEDIA LIBRARY            │
└─────────────────────────────────────────────────────────────────────────┘
                                      ↓  ╲_702
┌─────────────────────────────────────────────────────────────────────────┐
│ ANALYZE THE PLURALITY OF MCIs AND THE METADATA TO IDENTIFY A PLURALITY  │
│ OF MOOD SOURCES ASSOCIATED WITH THE PLURALITY OF MCIs, WHEREIN EACH     │
│ MOOD SOURCE IS OF A MOOD SOURCE TYPE OF A PLURALITY OF MOOD SOURCE TYPES│
└─────────────────────────────────────────────────────────────────────────┘
                                      ↓  ╲_704
┌─────────────────────────────────────────────────────────────────────────┐
│ FOR EACH MOOD SOURCE OF THE IDENTIFIED PLURALITY OF MOOD SOURCES,       │
│ OBTAIN A SOURCE MOOD VECTOR ("SMV") INCLUDING A PLURALITY OF SMV        │
│ ELEMENTS, WHEREIN EACH SMV ELEMENT OF THE PLURALITY OF SMV ELEMENTS IS  │
│ ASSOCIATED WITH A RESPECTIVE MOOD OF THE PLURALITY OF MOODS, AND        │
│ WHEREIN EACH SMV ELEMENT OF THE PLURALITY OF SMV ELEMENTS INCLUDES A    │
│ SMV VALUE                                                               │
└─────────────────────────────────────────────────────────────────────────┘
                                      ↓  ╲_706
┌─────────────────────────────────────────────────────────────────────────┐
│ FOR EACH MOOD SOURCE TYPE OF THE PLURALITY OF MOOD SOURCE TYPES,        │
│ DETERMINE, BASED ON THE SMV OBTAINED FOR EACH MOOD SOURCE OF THE MOOD   │
│ SOURCE TYPE, A SOURCE TYPE POSITIVE MOOD VECTOR ("STPMV") INCLUDING A   │
│ PLURALITY OF STPMV ELEMENTS, WHEREIN EACH STPMV ELEMENT OF THE          │
│ PLURALITY OF STPMV ELEMENTS IS ASSOCIATED WITH A RESPECTIVE MOOD OF THE │
│ PLURALITY OF MOODS, AND WHEREIN EACH STPMV OF THE PLURALITY OF STPMV    │
│ ELEMENTS INCLUDES A STPMV VALUE                                         │
└─────────────────────────────────────────────────────────────────────────┘
                                      ↓  ╲_708
┌─────────────────────────────────────────────────────────────────────────┐
│ FOR EACH MOOD SOURCE TYPE OF THE PLURALITY OF MOOD SOURCE TYPES,        │
│ DETERMINE, BASED ON THE SMV OBTAINED FOR EACH MOOD SOURCE OF THE MOOD   │
│ SOURCE TYPE, A SOURCE TYPE NEGATIVE MOOD VECTOR ("STNMV") INCLUDING A   │
│ PLURALITY OF STNMV ELEMENTS, WHEREIN EACH STNMV OF THE PLURALITY OF     │
│ STNMV ELEMENTS IS ASSOCIATED WITH A RESPECTIVE MOOD OF THE PLURALITY OF │
│ MOODS, AND WHEREIN EACH STNMV ELEMENT OF THE PLURALITY OF STNMV         │
│ ELEMENTS INCLUDES A STNMV VALUE                                         │
└─────────────────────────────────────────────────────────────────────────┘
                                      ↓  ╲_710
┌─────────────────────────────────────────────────────────────────────────┐
│ DETERMINE, BASED ON EACH STPMV DETERMINED FOR THE PLURALITY OF MOOD     │
│ SOURCE TYPES, A GROUP POSITIVE MOOD VECTOR ("GPMV") INCLUDING A         │
│ PLURALITY OF GPMV ELEMENTS, WHEREIN EACH GPMV ELEMENT OF THE PLURALITY  │
│ OF GPMV ELEMENTS IS ASSOCIATED WITH A RESPECTIVE MOOD OF THE PLURALITY  │
│ OF MOODS, AND WHEREIN EACH GPMV ELEMENT OF THE PLURALITY OF GPMV        │
│ ELEMENTS INCLUDES A GPMV VALUE                                          │
└─────────────────────────────────────────────────────────────────────────┘
                                      ↓  ╲_712
┌─────────────────────────────────────────────────────────────────────────┐
│ DETERMINE, BASED ON EACH STNMV DETERMINED FOR THE PLURALITY OF MOOD     │
│ SOURCE TYPES, A GROUP NEGATIVE MOOD VECTOR ("GNMV") INCLUDING A         │
│ PLURALITY OF GNMV ELEMENTS, WHEREIN EACH GNMV ELEMENT OF THE PLURALITY  │
│ OF GNMV ELEMENTS IS ASSOCIATED WITH A RESPECTIVE MOOD OF THE PLURALITY  │
│ OF MOODS, AND WHEREIN EACH GNMV ELEMENT OF THE PLURALITY OF GNMV        │
│ ELEMENTS INCLUDES A GNMV VALUE                                          │
└─────────────────────────────────────────────────────────────────────────┘
                                      ↓  ╲_714
┌─────────────────────────────────────────────────────────────────────────┐
│ FOR EACH MOOD OF THE PLURALITY OF MOODS, DETERMINE THAT THE MOOD IS A   │
│ VALID MOOD WHEN (i) THE GPMV VALUE OF THE GPMV ELEMENT OF THE GPMV      │
│ ASSOCIATED WITH THE MOOD SATISFIES A GPMV THRESHOLD CONDITION AND (ii)  │
│ THE GNMV VALUE OF THE GNMV ELEMENT OF THE GNMV ASSOCIATED WITH THE      │
│ MOOD SATISFIES A GNMV THRESHOLD CONDITION                               │
└─────────────────────────────────────────────────────────────────────────┘
                                                              ╲_716
                                    700

FIG. 7
```

```
┌─────────────────────────────────────────────────────────────────────┐
│ IDENTIFY A COLLECTION OF MEDIA CONTENT ITEMS (MCIs) OF A MEDIA      │
│ LIBRARY AND METADATA ASSOCIATED WITH THE MEDIA LIBRARY              │
└─────────────────────────────────────────────────────────────────────┘
                                    ↓                              ⎯802
┌─────────────────────────────────────────────────────────────────────┐
│ ANALYZE THE COLLECTION OF MCIs AND THE METADATA TO IDENTIFY A       │
│ PLURALITY OF MOOD SOURCES ASSOCIATED WITH THE COLLECTION OF MCIs,   │
│ WHEREIN EACH MOOD SOURCE IS OF A MOOD SOURCE TYPE OF A PLURALITY    │
│ OF MOOD SOURCE TYPES                                                │
└─────────────────────────────────────────────────────────────────────┘
                                    ↓                              ⎯804
┌─────────────────────────────────────────────────────────────────────┐
│ FOR EACH MOOD SOURCE OF THE IDENTIFIED PLURALITY OF MOOD SOURCES,   │
│ OBTAIN A SOURCE MOOD VECTOR ("SMV") INCLUDING A PLURALITY OF SMV    │
│ ELEMENTS, WHEREIN EACH SMV ELEMENT OF THE PLURALITY OF SMV          │
│ ELEMENTS IS ASSOCIATED WITH A RESPECTIVE MOOD OF THE PLURALITY OF   │
│ MOODS, AND WHEREIN EACH SMV ELEMENT OF THE PLURALITY OF SMV         │
│ ELEMENTS INCLUDES A SMV VALUE                                       │
└─────────────────────────────────────────────────────────────────────┘
                                    ↓                              ⎯806
┌─────────────────────────────────────────────────────────────────────┐
│ DETERMINE, BASED ON THE SMV OBTAINED FOR EACH MOOD SOURCE OF THE    │
│ IDENTIFIED PLURALITY OF MOOD SOURCES, A GROUP POSITIVE MOOD VECTOR  │
│ ("GPMV") INCLUDING A PLURALITY OF GPMV ELEMENTS, WHEREIN EACH GPMV  │
│ ELEMENT OF THE PLURALITY OF GPMV ELEMENTS IS ASSOCIATED WITH A      │
│ RESPECTIVE MOOD OF THE PLURALITY OF MOODS, AND WHEREIN EACH GPMV    │
│ ELEMENT OF THE PLURALITY OF GPMV ELEMENTS COMPRISES A GPMV VALUE    │
└─────────────────────────────────────────────────────────────────────┘
                                    ↓                              ⎯808
┌─────────────────────────────────────────────────────────────────────┐
│ DETERMINE, BASED ON THE SMV OBTAINED FOR EACH MOOD SOURCE OF THE    │
│ IDENTIFIED PLURALITY OF MOOD SOURCES, A GROUP NEGATIVE MOOD VECTOR  │
│ ("GNMV") INCLUDING A PLURALITY OF GNMV ELEMENTS, WHEREIN EACH GNMV  │
│ ELEMENT OF THE PLURALITY OF GNMV ELEMENTS IS ASSOCIATED WITH A      │
│ RESPECTIVE MOOD OF THE PLURALITY OF MOODS, AND WHEREIN EACH GNMV    │
│ ELEMENT OF THE PLURALITY OF GNMV ELEMENTS COMPRISES A GNMV VALUE    │
└─────────────────────────────────────────────────────────────────────┘
                                    ↓                              ⎯810
┌─────────────────────────────────────────────────────────────────────┐
│ FOR EACH MOOD OF THE PLURALITY OF MOODS, DETERMINE THAT THE MOOD IS │
│ A VALID MOOD BY (i) DETERMINING THAT THE GPMV VALUE OF THE GPMV     │
│ ELEMENT OF THE GPMV ASSOCIATED WITH THE MOOD SATISFIES A GPMV       │
│ THRESHOLD CONDITION AND (ii) DETERMINING THAT THE GNMV VALUE OF THE │
│ GNMV ELEMENT OF THE GNMV ASSOCIATED WITH THE MOOD SATISFIES A       │
│ GNMV THRESHOLD CONDITION                                            │
└─────────────────────────────────────────────────────────────────────┘
                                                                   ⎯812
```

MOOD DETERMINATION OF A COLLECTION OF MEDIA CONTENT ITEMS

CROSS-REFERENCE TO RELATED APPLICATION(S)

This application is a continuation of U.S. patent application Ser. No. 15/896,725, filed Feb. 14, 2018 (now U.S. Pat. No. 10,740,383), which claims the benefit of prior filed U.S. Provisional Patent Application No. 62/514,899, filed Jun. 4, 2017, each of which is hereby incorporated by reference herein in its entirety.

TECHNICAL FIELD

This disclosure relates to determining at least one valid mood for a collection of media content items of a media library with an electronic device.

BACKGROUND OF THE DISCLOSURE

A system may be provided for managing a library of media items. Often, however, management of such a library may result in inappropriately themed presentations of certain media.

SUMMARY OF THE DISCLOSURE

This document describes systems, methods, and computer-readable media for determining at least one valid mood for a collection of media content items of a media library with an electronic device.

For example, a non-transitory machine readable medium storing a program for execution by at least one processing unit of a device may be provided, where the program may be for analyzing media content, and where the program includes sets of instructions for identifying a collection of a plurality of media content items (MCIs) of a media library and metadata associated with the media library and identifying at least one valid mood of a plurality of moods for use with the identified plurality of MCIs, wherein the identifying the at least one mood includes analyzing the plurality of MCIs and the metadata to identify a plurality of mood sources associated with the plurality of MCIs, wherein each mood source is of a mood source type of a plurality of mood source types, for each mood source of the identified plurality of mood sources, obtaining a source mood vector (SMV) including a plurality of SMV elements, wherein each SMV element of the plurality of SMV elements is associated with a respective mood of the plurality of moods, and wherein each SMV element of the plurality of SMV elements includes a SMV value, for each mood source type of the plurality of mood source types, determining, based on the SMV obtained for each mood source of the mood source type, a source type positive mood vector (STPMV) including a plurality of STPMV elements, wherein each STPMV element of the plurality of STPMV elements is associated with a respective mood of the plurality of moods, and wherein each STPMV of the plurality of STPMV elements includes a STPMV value, and determining, based on the SMV obtained for each mood source of the mood source type, a source type negative mood vector (STNMV) including a plurality of STNMV elements, wherein each STNMV element of the plurality of STNMV elements is associated with a respective mood of the plurality of moods, and wherein each STNMV element of the plurality of STNMV elements includes a STNMV value, determining, based on each STPMV determined for the plurality of mood source types, a group positive mood vector (GPMV) including a plurality of GPMV elements, wherein each GPMV element of the plurality of GPMV elements is associated with a respective mood of the plurality of moods, and wherein each GPMV element of the plurality of GPMV elements includes a GPMV value, determining, based on each STNMV determined for the plurality of mood source types, a group negative mood vector (GNMV) including a plurality of GNMV elements, wherein each GNMV element of the plurality of GNMV elements is associated with a respective mood of the plurality of moods, and wherein each GNMV element of the plurality of GNMV elements includes a GNMV value, and, for each mood of the plurality of moods, determining that the mood is a valid mood when the GPMV value of the GPMV element of the GPMV associated with the mood satisfies a GPMV threshold condition and the GNMV value of the GNMV element of the GNMV associated with the mood satisfies a GNMV threshold condition.

As another example, a method for analyzing media content on an electronic device may include identifying, with the electronic device, a collection of media content items (MCIs) of a media library and metadata associated with the media library and identifying, with the electronic device, at least one valid mood of a plurality of moods for use with the identified collection of MCIs, wherein the identifying the at least one mood includes analyzing the collection of MCIs and the metadata to identify a plurality of mood sources associated with the collection of MCIs, for each mood source of the identified plurality of mood sources, obtaining a source mood vector (SMV) including a plurality of SMV elements, wherein each SMV element of the plurality of SMV elements is associated with a respective mood of the plurality of moods, and wherein each SMV element of the plurality of SMV elements includes a SMV value, determining, based on the SMV obtained for each mood source of the identified plurality of mood sources, a group positive mood vector (GPMV) including a plurality of GPMV elements, wherein each GPMV element of the plurality of GPMV elements is associated with a respective mood of the plurality of moods, and wherein each GPMV element of the plurality of GPMV elements includes a GPMV value, determining, based on the SMV obtained for each mood source of the identified plurality of mood sources, a group negative mood vector (GNMV) including a plurality of GNMV elements, wherein each GNMV element of the plurality of GNMV elements is associated with a respective mood of the plurality of moods, and wherein each GNMV element of the plurality of GNMV elements includes a GNMV value, and, for each mood of the plurality of moods, determining that the mood is a valid mood by determining that the GPMV value of the GPMV element associated with the mood satisfies a GPMV threshold condition and determining that the GNMV value of the GNMV element associated with the mood satisfies a GNMV threshold condition.

As yet another example, a method for managing a media library with a computing system may include identifying, with the computing system, a collection of media content items (MCIs) of the media library and identifying, with the computing system, at least one valid mood of a plurality of moods for use with the identified collection of MCIs, wherein the identifying the at least one valid mood includes analyzing the collection of MCIs, identifying a plurality of mood sources associated with the collection of MCIs based on the analyzing, determining a source mood vector for each mood source of the identified plurality of mood sources, wherein each source mood vector includes a plurality of source mood vector values, and wherein each source mood vector value of the plurality of source mood vector values is associated with a respective mood of the plurality of moods, and, for each mood of the plurality of moods, determining that the mood is a valid mood by determining that a combination of the source mood vector value associated with the mood from each determined source mood vector meets a validity threshold.

As yet another example, a method for managing a media library with a computing system may include identifying, with the computing system, a collection of a plurality of media content items (MCIs) of a media library and metadata associated with the media library and identifying, with the computing system, at least one valid mood of a plurality of moods for use with the identified plurality of MCIs, wherein the identifying the at least one mood includes analyzing the plurality of MCIs and the metadata to identify a plurality of mood sources associated with the plurality of MCIs, wherein each mood source is of a mood source type of a plurality of mood source types, for each mood source of the identified plurality of mood sources, obtaining a source mood statistical representation (SMSR) including a plurality of SMSR elements, wherein each SMSR element of the plurality of SMSR elements is associated with a respective mood of the plurality of moods, and wherein each SMSR element of the plurality of SMSR elements includes a SMSR value, for each mood source type of the plurality of mood source types, determining, based on the SMSR obtained for each mood source of the mood source type, a source type positive mood statistical representation (STPMSR) and determining, based on the SMSR obtained for each mood source of the mood source type, a source type negative mood statistical representation (STNMSR), determining, based on each STPMSR determined for the plurality of mood source types, a group positive mood statistical representation (GPMSR), determining, based on each STNMSR determined for the plurality of mood source types, a group negative mood statistical representation (GNMSR), and, for each mood of the plurality of moods, determining that the mood is a valid mood when a GPMSR value of a GPMSR element of the GPMSR associated with the mood satisfies a GPMSR threshold condition and a GNMSR value of a GNMSR element of the GNMSR associated with the mood satisfies a GNMSR threshold condition.

As yet another example, a method for managing a media library with a computing system may include identifying, with the computing system, a collection of media content items (MCIs) of a media library and metadata associated with the media library and identifying, with the computing system, at least one valid mood of a plurality of moods for use with the identified collection of MCIs, wherein the identifying includes analyzing the collection of MCIs and the metadata to identify a plurality of mood sources associated with the collection of MCIs, for each mood source of the identified plurality of mood sources, obtaining a source mood statistical representation (SMSR) including a plurality of SMSR elements, wherein each SMSR element of the plurality of SMSR elements is associated with a respective mood of the plurality of moods, and wherein each SMSR element of the plurality of SMSR elements includes a SMSR value, determining, based on the SMSR obtained for each mood source of the identified plurality of mood sources, a group positive mood statistical representation (GPMSR), determining, based on the SMSR obtained for each mood source of the identified plurality of mood sources, a group negative mood statistical representation (GNMSR), and, for each mood of the plurality of moods, determining that the mood is a valid mood by determining that a GPMSR value of a GPMSR element associated with the mood satisfies a GPMSR threshold condition and determining that a GNMSR value of a GNMSR element associated with the mood satisfies a GNMSR threshold condition.

MOM As yet another example, a method for managing a media library with a computing system may include identifying, with the computing system, a collection of media content items (MCIs) of the media library and identifying, with the computing system, at least one valid mood of a plurality of moods for use with the identified collection of MCIs, wherein the identifying includes analyzing the collection of MCIs, identifying a plurality of mood sources associated with the collection of MCIs based on the analyzing, determining a source mood statistical representation for each mood source of the identified plurality of mood sources, wherein each source mood statistical representation includes a plurality of source mood statistical representation values, and wherein each source mood statistical representation value of the plurality of source mood statistical representation values is associated with a respective mood of the plurality of moods, and, for each mood of the plurality of moods, determining that the mood is a valid mood by determining that a combination of the source mood statistical representation value associated with the mood from each determined source mood statistical representation meets a validity threshold.

This Summary is provided only to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which:

FIGS. 2A-2D are additional exemplary interfaces of the electronic device of FIGS. 1 and 2;

FIG. 5 is an exemplary representation of a mood property dictionary data structure of the system of FIGS. 1-4;

FIGS. 7-12 are flowcharts of illustrative processes for managing a media library.

DETAILED DESCRIPTION OF THE DISCLOSURE

Systems, methods, and computer-readable media may be provided to determine at least one valid mood for a collection of media content items of a media library. For example, various ones of many possible mood sources may be identified from analysis of metadata associated with a collection of media content items, such as one or more forms of scene mood sources (e.g., one or more objects or faces or environments that may be detected in various items of media content of a media library (e.g., through pixel analysis of images), one or more forms of context mood sources (e.g., one or more inferred or derived types of metadata), and/or the like. Each mood source may be used to identify a particular mood source vector (or any other suitable statistical representation) from a mood property dictionary that may be defined to facilitate proper mood identification for a collection of media content items, where each mood source vector may include a number of mood source vector elements, each of which may be associated with a respective potential mood of a number of different potential moods. A value of each element of each mood source vector may be either positive (e.g., recommended), negative (e.g., not recommended or forbidden), or neutral, as may be defined by the mood dictionary as appropriate for the particular combination of mood source and mood for that element. All mood source vectors defined for all mood sources identified in a collection of media content items may be combined in any suitable manner to determine a mood score for each of the potential moods and then only the potential mood(s) that satisfy one or more threshold conditions (e.g., a positive or recommended mood threshold condition, a negative or forbidden mood condition, and/or the like) may be identified as valid for the collection of media content items. Additionally or alternatively, one or more valid important keywords may be identified based on analysis of the media content collection. Then, at least one identified valid mood and/or at least one identified valid important keyword may be used to affect the presentation of the media content item collection (e.g., to define one or more emotive characteristics of a composite media presentation generated for the media content items of the collection).

Figure 1:
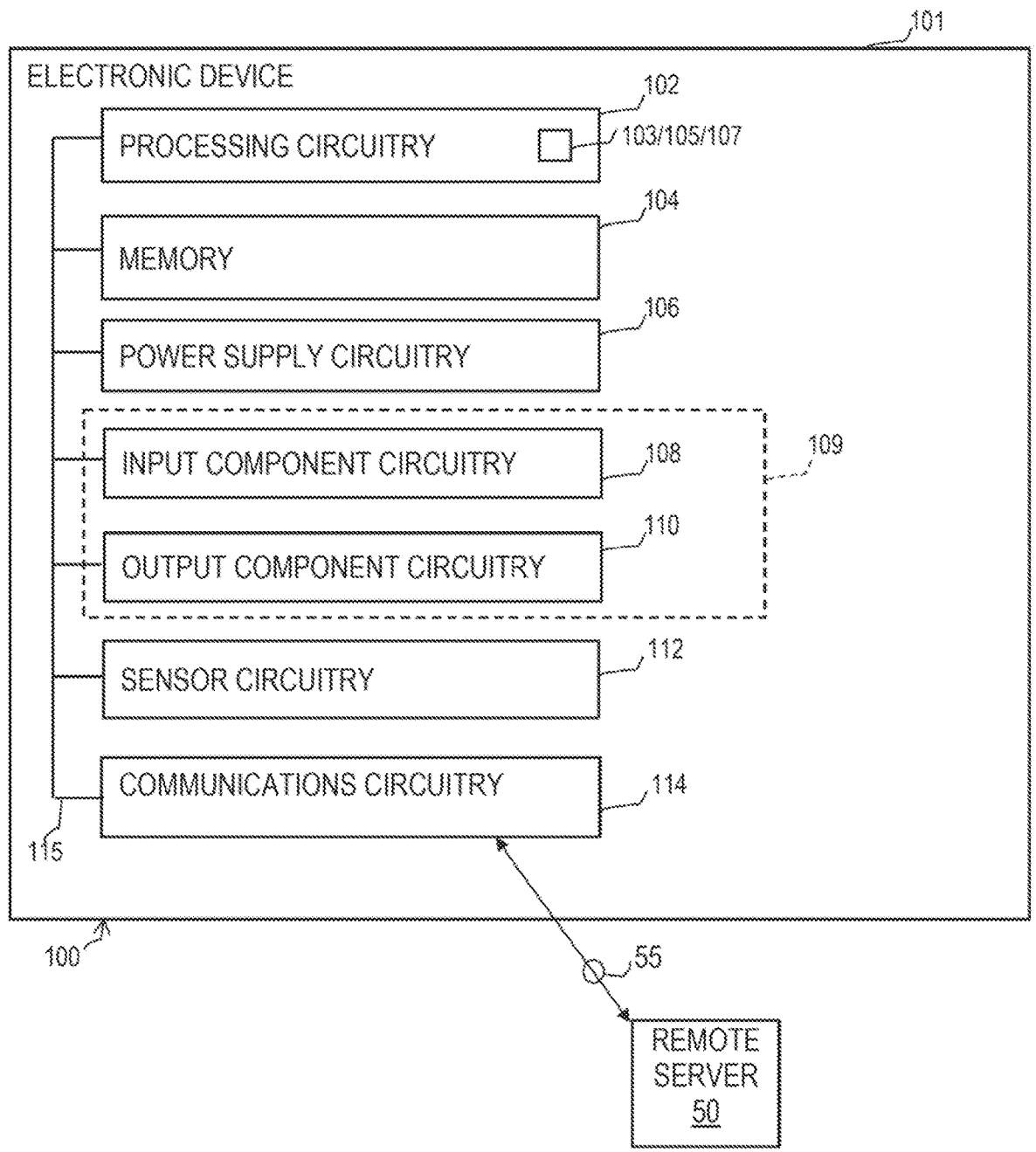
FIG. 1 is a schematic view of an illustrative system for determining at least one valid mood for a collection of media content items of a media library.

FIG. 1 is a schematic view of an illustrative system 1 that may include at least one of electronic device 100 and remote server 50 for determining at least one valid mood for a collection of media content items of a media library in accordance with some embodiments. Electronic device 100 can include, but is not limited to, a media player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet (e.g., an iPad™ available by Apple Inc.), server, etc.), monitor, television, stereo equipment, set up box, set-top box, boom box, modem, router, printer, watch, biometric monitor, or any combination thereof. In some embodiments, electronic device 100 may perform a single function (e.g., a device dedicated to determining at least one valid mood for a collection of media content items of a media library) and, in other embodiments, electronic device 100 may perform multiple functions (e.g., a device that manages a media library, plays music, and receives and transmits telephone calls). Electronic device 100 may be any portable, mobile, hand-held, or miniature electronic device that may be configured to determine at least one valid mood for a collection of media content items of a media library wherever a user travels. Some miniature electronic devices may have a form factor that is smaller than that of hand-held electronic devices, such as an iPod™. Illustrative miniature electronic devices can be integrated into various objects that may include, but are not limited to, watches (e.g., an Apple Watch™ available by Apple Inc.), rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, electronic device 100 may not be portable at all, but may instead be generally stationary.

As shown in FIG. 1, for example, electronic device 100 may include processing circuitry 102, memory 104, power supply circuitry 106, input component circuitry 108, output component circuitry 110, sensor circuitry 112, and communications circuitry 114. Electronic device 100 may also include a bus 115 that may provide one or more wired or wireless communication links or paths for transferring data and/or power to, from, or between various other components of device 100. In some embodiments, one or more components of electronic device 100 may be combined or omitted. Moreover, electronic device 100 may include any other suitable components not combined or included in FIG. 1 and/or several instances of the components shown in FIG. 1. For the sake of simplicity, only one of each of the components is shown in FIG. 1.

Memory 104 may include one or more storage mediums, including, for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may be fixedly embedded within electronic device 100 or may be incorporated onto one or more suitable types of cards that may be repeatedly inserted into and removed from electronic device 100 (e.g., a subscriber identity module ("SIM") card or secure digital ("SD") memory card). Memory 104 may store media data (e.g., music and image files), software (e.g., for implementing functions on device 100), firmware, media information (e.g., media content and/or associated metadata), preference information (e.g., media playback preferences), lifestyle information (e.g., food preferences), exercise information (e.g., information obtained by exercise monitoring equipment or any suitable sensor circuitry), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, pass information (e.g., transportation boarding passes, event tickets, coupons, store cards, financial payment cards, etc.), any other suitable data, or any combination thereof.

Power supply circuitry 106 can include any suitable circuitry for receiving and/or generating power, and for providing such power to one or more of the other components of electronic device 100. For example, power supply circuitry 106 can be coupled to a power grid (e.g., when device 100 is not acting as a portable device or when a battery of the device is being charged at an electrical outlet with power generated by an electrical power plant). As another example, power supply circuitry 106 can be configured to generate power from a natural source (e.g., solar power using solar cells). As another example, power supply circuitry 106 can include one or more batteries for providing power (e.g., when device 100 is acting as a portable device). For example, power supply circuitry 106 can include one or more of a battery (e.g., a gel, nickel metal hydride, nickel cadmium, nickel hydrogen, lead acid, or lithium-ion battery), an uninterruptible or continuous power supply ("UPS" or "CPS"), and circuitry for processing power received from a power generation source (e.g., power generated by an electrical power plant and delivered to the user via an electrical socket or otherwise). The power can be provided by power supply circuitry 106 as alternating current or direct current, and may be processed to transform power or limit received power to particular characteristics. For example, the power can be transformed to or from direct current, and constrained to one or more values of average power, effective power, peak power, energy per pulse, voltage, current (e.g., measured in amperes), or any other characteristic of received power. Power supply circuitry 106 can be operative to request or provide particular amounts of power at different times, for example, based on the needs or requirements of electronic device 100 or periphery devices that may be coupled to electronic device 100 (e.g., to request more power when charging a battery than when the battery is already charged).

One or more input components 108 may be provided to permit a user to interact or interface with device 100. For example, input component circuitry 108 can take a variety of forms, including, but not limited to, a touch pad, dial, click wheel, scroll wheel, touch screen, one or more buttons (e.g., a keyboard), mouse, joy stick, track ball, microphone, still image camera, video camera, scanner (e.g., a bar code scanner or any other suitable scanner that may obtain product identifying information from a code, such as a bar code, or the like), proximity sensor, light detector, biometric sensor (e.g., a fingerprint reader or other feature recognition sensor, which may operate in conjunction with a feature-processing application that may be accessible to electronic device 100 for authenticating a user), line-in connector for data and/or power, and combinations thereof. Each input component 108 can be configured to provide one or more dedicated control functions for making selections or issuing commands associated with operating device 100.

Electronic device 100 may also include one or more output components 110 that may present information (e.g., graphical, audible, and/or tactile information) to a user of device 100. For example, output component circuitry 110 of electronic device 100 may take various forms, including, but not limited to, audio speakers, headphones, line-out connectors for data and/or power, visual displays, infrared ports, tactile/haptic outputs (e.g., rumblers, vibrators, etc.), and combinations thereof. As a particular example, electronic device 100 may include a display output component as output component 110, where such a display output component may include any suitable type of display or interface for presenting visual data to a user. A display output component may include a display embedded in device 100 or coupled to device 100 (e.g., a removable display). A display output component may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, a display output component can include a movable display or a projecting system for providing a display of content on a surface remote from electronic device 100, such as, for example, a video projector, a head-up display, or a three-dimensional (e.g., holographic) display. As another example, a display output component may include a digital or mechanical viewfinder, such as a viewfinder of the type found in compact digital cameras, reflex cameras, or any other suitable still or video camera. A display output component may include display driver circuitry, circuitry for driving display drivers, or both, and such a display output component can be operative to display content (e.g., media playback information, application screens for applications implemented on electronic device 100, information regarding ongoing communications operations, information regarding incoming communications requests, device operation screens, etc.) that may be under the direction of processor 102.

It should be noted that one or more input components and one or more output components may sometimes be referred to collectively herein as an input/output ("I/O") component or I/O circuitry or I/O interface (e.g., input component 108 and output component 110 as I/O component or I/O interface 109). For example, input component 108 and output component 110 may sometimes be a single I/O component 109, such as a touch screen, that may receive input information through a user's touch (e.g., multi-touch) of a display screen and that may also provide visual information to a user via that same display screen.

Sensor circuitry 112 may include any suitable sensor or any suitable combination of sensors operative to detect movements of electronic device 100 and/or any other characteristics of device 100 or its environment (e.g., physical activity or other characteristics of a user of device 100). For example, sensor circuitry 112 may include one or more three-axis acceleration motion sensors (e.g., an accelerometer) that may be operative to detect linear acceleration in three directions (i.e., the x- or left/right direction, the y- or up/down direction, and the z- or forward/backward direction). As another example, sensor circuitry 112 may include one or more single-axis or two-axis acceleration motion sensors that may be operative to detect linear acceleration only along each of the x- or left/right direction and the y- or up/down direction, or along any other pair of directions. In some embodiments, sensor circuitry 112 may include an electrostatic capacitance (e.g., capacitance-coupling) accelerometer that may be based on silicon micro-machined micro electro-mechanical systems ("MEMS") technology, including a heat-based MEMS type accelerometer, a piezo-electric type accelerometer, a piezo-resistance type accelerometer, and/or any other suitable accelerometer (e.g., which may provide a pedometer or other suitable function). In some embodiments, sensor circuitry 112 may be operative to directly or indirectly detect rotation, rotational movement, angular displacement, tilt, position, orientation, motion along a non-linear (e.g., arcuate) path, or any other non-linear motions. Additionally or alternatively, sensor circuitry 112 may include one or more angular rate, inertial, and/or gyro-motion sensors or gyroscopes for detecting rotational movement. For example, sensor circuitry 112 may include one or more rotating or vibrating elements, optical gyroscopes, vibrating gyroscopes, gas rate gyroscopes, ring gyroscopes, magnetometers (e.g., scalar or vector magnetometers), compasses, and/or the like. Any other suitable sensors may also or alternatively be provided by sensor circuitry 112 for detecting motion on device 100, such as any suitable pressure sensors, altimeters, or the like. Using sensor circuitry 112, electronic device 100 may be configured to determine a velocity, acceleration, orientation, and/or any other suitable motion attribute of electronic device 100.

Sensor circuitry 112 may include any suitable sensor(s), including, but not limited to, one or more of a GPS sensor, accelerometer, directional sensor (e.g., compass), gyroscope, motion sensor, pedometer, passive infrared sensor, ultrasonic sensor, microwave sensor, a tomographic motion detector, a camera, a biometric sensor, a light sensor, a timer, or the like. In some examples, a biometric sensor may include, but is not limited to, one or more health-related optical sensors, capacitive sensors, thermal sensors, electric field ("eField") sensors, and/or ultrasound sensors, such as photoplethysmogram ("PPG") sensors, electrocardiography ("ECG") sensors, galvanic skin response ("GSR") sensors, posture sensors, stress sensors, photoplethysmogram sensors, and/or the like. These sensors can generate data providing health-related information associated with the user. For example, PPG sensors can provide information regarding a user's respiratory rate, blood pressure, and/or oxygen saturation. ECG sensors can provide information regarding a user's heartbeats. GSR sensors can provide information regarding a user's skin moisture, which may be indicative of sweating and can prioritize a thermostat application to determine a user's body temperature. In some examples, each sensor can be a separate device, while, in other examples, any combination of two or more of the sensors can be included within a single device. For example, a gyroscope, accelerometer, photoplethysmogram, galvanic skin response sensor, and temperature sensor can be included within a wearable electronic device, such as a smart watch, while a scale, blood pressure cuff, blood glucose monitor, SpO2 sensor, respiration sensor, posture sensor, stress sensor, and asthma inhaler can each be separate devices. While specific examples are provided, it should be appreciated that other sensors can be used and other combinations of sensors can be combined into a single device. Using one or more of these sensors, device 100 can determine physiological characteristics of the user while performing a detected activity, such as a heart rate of a user associated with the detected activity, average body temperature of a user detected during the detected activity, any normal or abnormal physical conditions associated with the detected activity, or the like. In some examples, a GPS sensor or any other suitable location detection component(s) of device 100 can be used to determine a user's location and movement, as well as a displacement of the user's motion. An accelerometer, directional sensor, and/or gyroscope can further generate activity data that can be used to determine whether a user of device 100 is engaging in an activity, is inactive, or is performing a gesture. Device 100 can further include a timer that can be used, for example, to add time dimensions to various attributes of the detected physical activity, such as a duration of a user's physical activity or inactivity, time(s) of a day when the activity is detected or not detected, and/or the like. One or more sensors of sensor circuitry or component 112 may be embedded in a body (e.g., housing 101) of device 100, such as a long a bottom surface that may be operative to contact a user, or can be positioned at any other desirable location. In some examples, different sensors can be placed in different locations inside or on the surfaces of device 100 (e.g., some located inside housing 101) and some attached to an attachment mechanism (e.g., a wrist band coupled to a housing of a wearable device), or the like. In other examples, one or more sensors can be worn by a user separately from device 100. In such cases, the sensors can be configured to communicate with device 100 using a wired and/or wireless technology (e.g., via communications circuitry 114). In some examples, sensors can be configured to communicate with each other and/or share data collected from one or more sensors. In some other examples, device 100 can be waterproof such that the sensors can detect a user's activity in water.

Communications circuitry 114 may be provided to allow device 100 to communicate with one or more other electronic devices or servers using any suitable communications protocol. For example, communications circuitry 114 may support Wi-Fi™ (e.g., an 802.11 protocol), ZigBee™ (e.g., an 802.15.4 protocol), WiDi™, Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multiband, etc.), any communications protocol that may be used by a low power Wireless Personal Area Network ("6LoWPAN") module, Near Field Communication ("NFC"), any other communications protocol, or any combination thereof. Communications circuitry 114 may also include or be electrically coupled to any suitable transceiver circuitry that can enable device 100 to be communicatively coupled to another device (e.g., a host computer or an accessory device) and communicate with that other device wirelessly, or via a wired connection (e.g., using a connector port). Communications circuitry 114 may be configured to determine a geographical position of electronic device 100. For example, communications circuitry 114 may utilize the global positioning system ("GPS") or a regional or site-wide positioning system that may use cell tower positioning technology or Wi-Fi™ technology.

Processing circuitry 102 of electronic device 100 may include any processing circuitry that may be operative to control the operations and performance of one or more components of electronic device 100. For example, processor 102 may receive input signals from any input component 108 and/or sensor circuitry 112 and/or communications circuitry 114 and/or drive output signals through any output component 110 and/or communications circuitry 114. As shown in FIG. 1, processor 102 may be used to run at least one application 103. Application 103 may include, but is not limited to, one or more operating system applications, firmware applications, software applications, algorithmic modules, media analysis applications, media playback applications, media editing applications, communications applications, pass applications, calendar applications, social media applications, state determination applications, biometric feature-processing applications, activity monitoring applications, activity motivating applications, and/or any other suitable applications. For example, processor 102 may load application 103 as a user interface program to determine how instructions or data received via an input component 108 and/or any other component of device 100 may manipulate the one or more ways in which information may be stored and/or provided to the user via an output component 110 and/or any other component of device 100. Any application 103 may be accessed by any processing circuitry 102 from any suitable source, such as from memory 104 (e.g., via bus 115) and/or from another device or server (e.g., remote server 50) (e.g., via communications circuitry 114). Processor 102 may include a single processor or multiple processors. For example, processor 102 may include at least one "general purpose" microprocessor, a combination of general and special purpose microprocessors, instruction set processors, graphics processors, video processors, communications processors, motion processors, biometric processors, application processors, and/or related chips sets, and/or special purpose microprocessors. Processor 102 also may include on board memory for caching purposes.

Processor 102 may be configured to capture (e.g., with an input component 108) or otherwise access (e.g., from memory 104 and/or communications circuitry 114) and process any suitable library 105 of any suitable amount of media content pieces (e.g., any media content and/or associated metadata) for managing the media content pieces in an effective and user-friendly manner. Media content pieces ("MCPs") may include any suitable type of asset or item of media content, such as image content (e.g., pixel values for one or more photographs or video frames) and/or audio content (e.g., one or more audio tracks that may or may not be associated with video frames as audio/visual video content) and/or text content (e.g., an E-book, etc.) and/or haptic content (e.g., vibrations or motions that may be provided in connection with other media, such as a video), where examples of different types of visual media content of an MCP may include, but are not limited to, a still photo, a video clip, a burst-mode photo sequence, a panoramic photo, a time lapse video, a slow motion video, a short video that may be captured alongside a photograph (e.g., a Live Photo™ available by Apple Inc.), and/or the like. An MCP may also include any suitable amount of any suitable type(s) of metadata assets or metadata content (metadata) that may describe one or more characteristics of and be associated with the media content (e.g., an image, a video, etc.) of the MCP, including, but not limited to, captured metadata, post-capture metadata, derived metadata, explicit user-assigned metadata, and/or the like. Additionally, processor 102 may be configured to generate or otherwise access (e.g., from memory 104 and/or communications circuitry 114) an MCP management system 107 (e.g., a database (e.g., a relational database (e.g., a tabular database, etc.), a distributed database that can be dispersed or replicated among different points in a network, an object-oriented programming database that can be congruent with the data defined in object classes and subclasses, etc.) and/or a knowledge graph metadata network) that may be operative to be used by processor 102 (e.g., along with or as a portion of any suitable application 103) to manage, store, ingest, organize, and/or retrieve the various MCPs of library 105. In some examples where device 100 may collect and/or process a relatively large MCP library 105 and/or use relatively large MCP management systems 107, device 100 may not have enough memory capacity to collect and process and store all of the data for such a library and/or management system and can instead be configured to offload some or all of the data on an external device that may be remote from device 100 (e.g., server 50, which, although not shown, may be configured to include, one, some, each, and/or multiple ones of the components of device 100). The external device can be configured to communicate with a plurality of devices 100, and store data collected from these devices. The external device can be further configured to execute computer instructions on the data and communicate the result with one or more of these devices 100.

Electronic device 100 may also be provided with a housing 101 that may at least partially enclose one or more of the components of device 100 for protection from debris and other degrading forces external to device 100. In some embodiments, one or more of the components may be provided within its own housing (e.g., input component 108 may be an independent keyboard or mouse within its own housing that may wirelessly or through a wire communicate with processor 102, which may be provided within its own housing).

Figure 2:
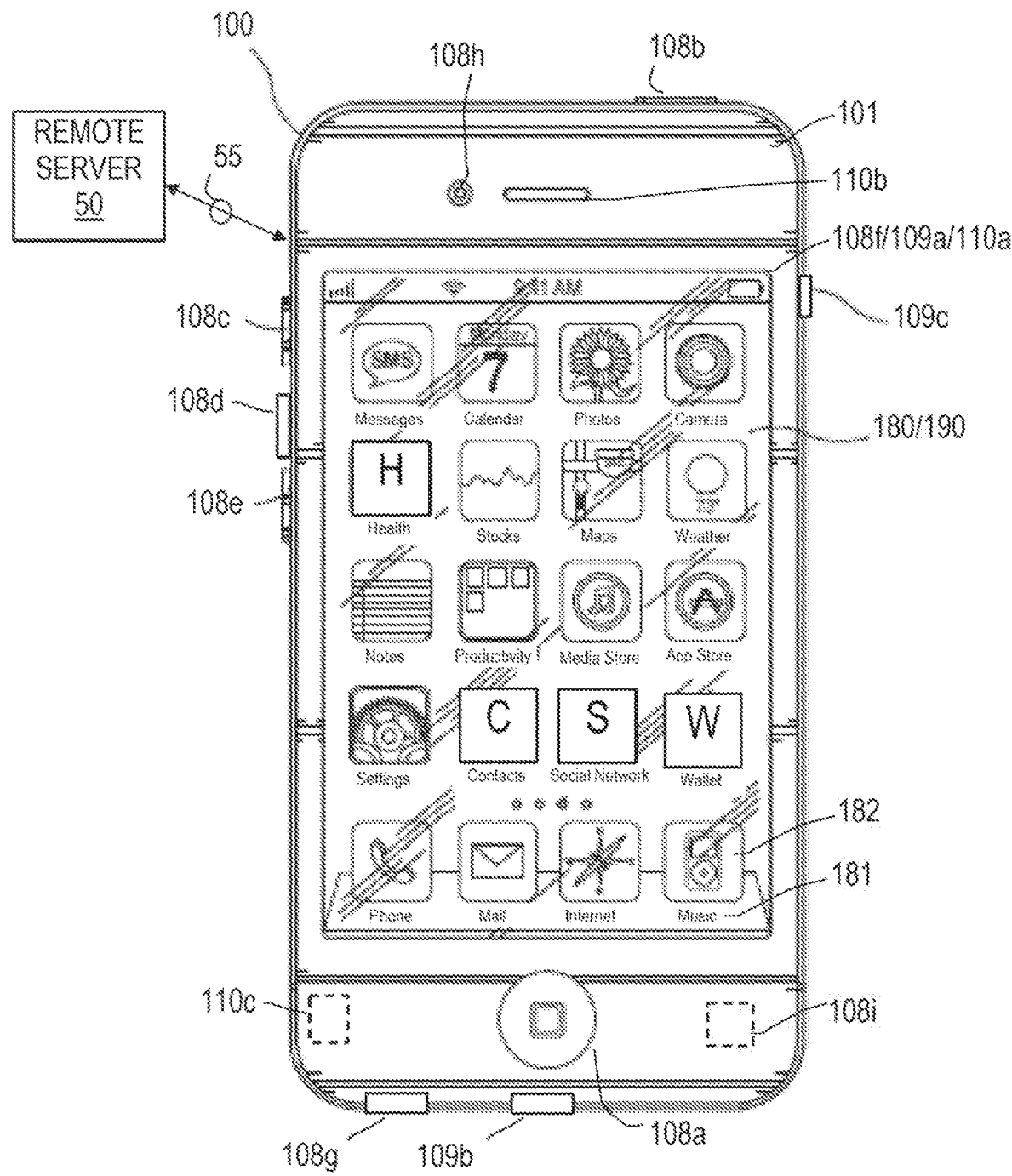
FIG. 2 is a front view of an illustrative example of an electronic device in the system of FIG. 1.

As shown in FIGS. 2-2D, one specific example of electronic device 100 may be an electronic device, such as an iPhone™, where housing 101 may allow access to various input components 108a-108i, various output components 110a-110c, and various I/O components 109a-109c through which device 100 and a user and/or an ambient environment may interface with each other. Input component 108a may include a button that, when pressed, may cause a "home" screen or menu of a currently running application to be displayed by device 100. Input component 108b may be a button for toggling electronic device 100 between a sleep mode and a wake mode or between any other suitable modes. Input component 108c may include a two-position slider that may disable one or more output components 112 in certain modes of electronic device 100. Input components 108d and 108e may include buttons for increasing and decreasing the volume output or any other characteristic output of an output component 110 of electronic device 100. Each one of input components 108a-108e may be a mechanical input component, such as a button supported by a dome switch, a sliding switch, a control pad, a key, a knob, a scroll wheel, or any other suitable form.

An output component 110a may be a display that can be used to display a visual or graphic user interface ("GUI") 180, which may allow a user to interact with electronic device 100. GUI 180 may include various layers, windows, screens, templates, elements, menus, and/or other components of a currently running application (e.g., application 103) that may be displayed in all or some of the areas of display output component 110a. One or more of user input components 108a-108i may be used to navigate through GUI 180. For example, one user input component 108 may include a scroll wheel that may allow a user to select one or more graphical elements or icons 182 of GUI 180. Icons 182 may also be selected via a touch screen I/O component 109a that may include display output component 110a and an associated touch input component 108f. Such a touch screen I/O component 109a may employ any suitable type of touch screen input technology, such as, but not limited to, resistive, capacitive, infrared, surface acoustic wave, electromagnetic, or near field imaging. Furthermore, touch screen I/O component 109a may employ single point or multi-point (e.g., multi-touch) input sensing.

Icons 182 may represent various applications, layers, windows, screens, templates, elements, and/or other components that may be displayed in some or all of the areas of display component 110*a* upon selection by the user. Furthermore, selection of a specific icon 182 may lead to a hierarchical navigation process. For example, selection of a specific icon 182 may lead from screen 190 of FIG. 2 to a new screen of GUI 180 that may include one or more additional icons or other GUI elements of the same application or of a new application associated with that icon 182. Textual indicators 181 may be displayed on or near each icon 182 to facilitate user interpretation of each graphical element icon 182. It is to be appreciated that GUI 180 may include various components arranged in hierarchical and/or non-hierarchical structures. When a specific icon 182 is selected, device 100 may be configured to open a new application associated with that icon 182 and display a corresponding screen of GUI 180 associated with that application. For example, when the specific icon labeled with a "Photos" textual indicator is selected, device 100 may launch or otherwise access a media management and editing application (e.g., Photos™ available by Apple Inc.) that may provide user access to one or more collections of MCPs (e.g., photos and/or videos) and may display screens of a specific user interface that may include one or more tools or features for interacting with media content. As another example, when the specific icon labeled with a "Calendar" textual indicator is selected, device 100 may launch or otherwise access a specific calendar or reminder application and may display screens of a specific user interface that may include one or more tools or features for interacting with one or more events or other reminders that may be time-sensitive in a specific manner. As another example, when the specific icon labeled with a "Wallet" textual indicator is selected, device 100 may launch or otherwise access a specific pass or wallet application and may display screens of a specific user interface that may include one or more tools or features for interacting with one or more passes or other credentials (e.g., payment credentials of an NFC component) in a specific manner. As another example, when the specific icon labeled with a "Contacts" textual indicator is selected, device 100 may launch or otherwise access a specific contacts or address book application and may display screens of a specific user interface that may include one or more tools or features for interacting with one or more contacts of one or more persons or businesses or other entities in a specific manner. As another example, when the specific icon labeled with a "Social Media" textual indicator is selected, device 100 may launch or otherwise access a specific social media application or site and may display screens of a specific user interface that may include one or more tools or features for interacting with one or more social media networks with which a user may or may not have an account in a specific manner. As another example, when the specific icon labeled with a "Weather" textual indicator is selected, device 100 may launch or otherwise access a specific weather application or site and may display screens of a specific user interface that may include one or more tools or features for determining or presenting the current and/or past and/or future weather and/or other environmental conditions local to and/or distant from device 100 in a specific manner (e.g., as may be detected by any suitable sensors of device 100 and/or of remote server 50). As another example, when the specific icon labeled with a "Health" textual indicator is selected, device 100 may launch or otherwise access a specific health application or site and may display screens of a specific user interface that may include one or more tools or features for determining or presenting the current and/or past health activities and/or biometric characteristics of a user (e.g., as may be detected by any suitable sensors of device 100 and/or of remote server 50) in a specific manner. For each application, screens may be displayed on display output component 110*a* and may include various user interface elements. Additionally or alternatively, for each application, various other types of non-visual information may be provided to a user via various other output components 110 of device 100.

Electronic device 100 also may include various other I/O components 109 that may allow for communication between device 100 and other devices, such as a connection port 109*b* that may be configured for transmitting and receiving data files, such as media files or customer order files, and/or any suitable information (e.g., audio signals) from a remote data source and/or power from an external power source. For example, I/O component 109*b* may be any suitable port (e.g., a Lightning™ connector or a 30-pin dock connector available by Apple Inc.). I/O component 109*c* may be a connection slot for receiving a SIM card or any other type of removable component. Electronic device 100 may also include at least one audio input component 110*g*, such as a microphone, and at least one audio output component 110*b*, such as an audio speaker. Electronic device 100 may also include at least one tactile output component 110*c* (e.g., a nimbler, vibrator, haptic and/or taptic component, etc.), a camera and/or scanner input component 108*h* (e.g., a video or still camera, and/or a bar code scanner or any other suitable scanner that may obtain product identifying information from a code, such as a bar code, or the like), and a biometric input component 108*i* (e.g., a fingerprint reader or other feature recognition sensor, which may operate in conjunction with a feature-processing application that may be accessible to electronic device 100 for authenticating a user).

Figure 3:
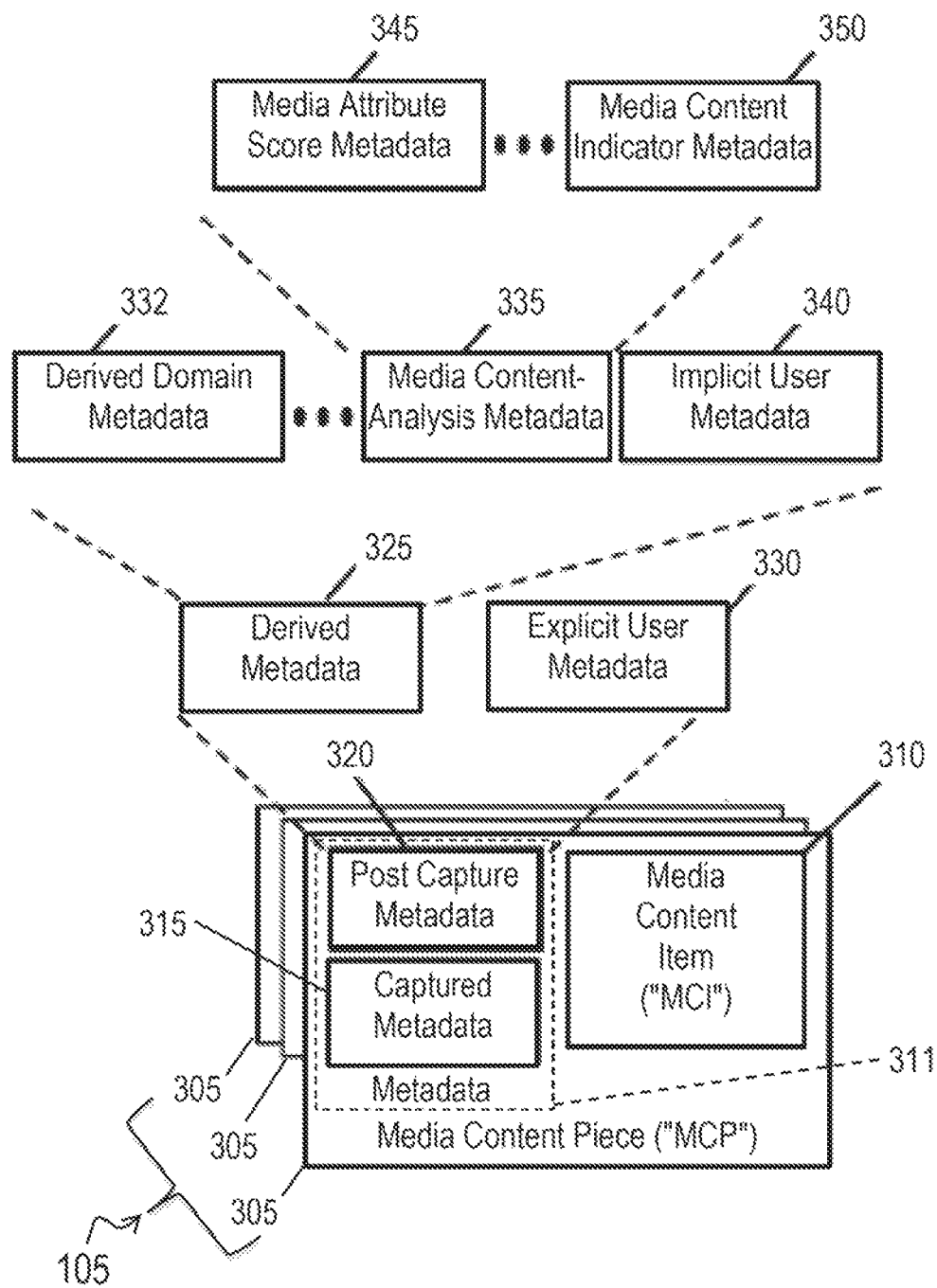
FIG. 3 is an exemplary block diagram of at least a portion of a library of media content pieces of the system of FIGS. 1 and 2.

FIG. 3 is an illustrative schematic of MCP library 105, which may include any suitable number of MCPs 305 of any suitable type. Library 105 may at least partially reside on device 100 (e.g., in memory 104) and/or may at least partially reside on a remote server (e.g., server 50) that may be accessible to device 100. As shown in FIG. 3, for example, at least one, some, or each MCP 305 may include an asset or item of MCP media content or an MCP media content item ("MCI") 310 (e.g., an image, a video, etc.) and associated MCP metadata content 311. MCP metadata content 311 may include any suitable number of metadata assets of any suitable type(s) of metadata, including, but not limited to, captured metadata 315 and post-capture metadata 320. Captured metadata 315 may include any suitable metadata that may be generated by or associated with characteristics of the capture device that captured the associated media content 310 (e.g., by camera input component 108*h* and/or any other suitable component(s) of device 100 or by any suitable component(s) of any other suitable media capture device (e.g., server 50)) at the time that such media content is captured. Examples of capture metadata 315 may include, but are not limited to, date and time of media content capture (e.g., based on a clock of device 100), location of media content capture (e.g., based on GPS or any other location service of device 100), one or media capture device settings of media content capture (e.g., any suitable settings of camera input component 108*h*, such as exposure, flash, white point, etc.), and/or the like.

Post-capture metadata 320 may include any suitable type(s) of metadata that may be defined for the media content after the media content has been capture. As shown, for example, two exemplary types of post-capture metadata 320 may include derived metadata 325 and explicit user-assigned metadata 330. Explicit user-assigned metadata 330 may include any suitable keywords (e.g., birthday, vacation, anniversary, etc.) or other suitable tags (e.g., like, dislike, favorite, verification of identity of one or more content indicators (e.g., faces or locations or scenes or clusters of features or indicators or otherwise) in the media content, etc.) that a user may assign to or otherwise associate with the media content and/or one or more user-specified associations for the MCP with respect to other MCPs (e.g., inclusion of the MCP in a user-specified album (e.g., photo album) or other collection type of MCPs). Such user-assignment of any suitable user-assigned metadata 330 may be accomplished via any suitable user interface application that may be presented by device 100 and/or server 50 to a user of system 1.

Derived metadata 325 of an MCP 305 may include any suitable types of metadata assets that may be derived or inferred by processor analysis (e.g., by an application 103 of processor 102) of media content 310, captured metadata 315, user-assigned metadata 330, and/or any user actions that may be associated with that MCP 305. One or more framework services (e.g., service(s) of device 100 and/or of server 50) may analyze one or more MCPs 305, their media content, their metadata, and/or any associated user actions to produce derived metadata 325 for one or more of the MCPs. Examples of such derived metadata 325 may include, but are not limited to, derived domain metadata 332, media content-analysis metadata 335 (e.g., image-analysis metadata for an image MCI 310), and/or implicit user metadata 340. Implicit user metadata 340 may be any suitable metadata that may be generated by monitoring any user actions with respect to the MCP (e.g., sharing the MCP with others, repeatedly viewing the MCP, etc.).

Media content-analysis metadata 335 may include any suitable type(s) of metadata attributes that may be determined by analyzing MCP media content 310. In some embodiments, such media content-analysis metadata 335 may include any suitable media attribute score metadata 345 and/or any suitable media content indicator metadata 350. Examples of media attribute score metadata 345 may include, but are not limited to, any suitable media attribute scores for quantifying focus, exposure, blur, sharpness, color attributes, pixel characteristics, pixel intensity values, luminance values, brightness values, and/or the like for any image MCI and/or for any frame(s) of any video MCI, and/or for quantifying volume, pitch, timbre, voice, source (e.g., detected sound is human voice, detected sound is fire truck, etc.) and/or the like for any audio MCI and/or the like for any other type of MCI. Media attribute score metadata 345 may be generated and/or otherwise obtained by one or more suitable services (e.g., framework services) of system 1 (e.g., of device 100 and/or of server 50). Examples of media content indicator metadata 350 may include, but are not limited to, any suitable media content indicators that may be indicative of the type of its associated MCI 310 and/or that may characterize its associated MCI 310 in any suitable manner. In an example when an MCI 310 is an image, one or more media content indicators of associated media content indicator metadata 350 may reference one or more types of particular content indicators that may be valid for that image. Additionally or alternatively, when an MCI 310 may be a video clip with multiple frames or images, one or more media content indicators of associated media content indicator metadata 350 may be expressed in terms of ranges that may define the range of images or frames over which a particular content indicator may be valid. Examples of particular types of content indicators of media content indicator metadata 350 may include, but are not limited to, face indicators (e.g., unique face vectors (or any other suitable statistical representations)), smile indicators, voice indicators, camera motion indicators, junk content indicators, scene indicators, image quality indicators, and/or the like. Any such content indicators 350 may be generated or obtained (e.g., as one or more feature vectors or feature indicators) by one or more suitable services (e.g., framework services) of system 1 (e.g., of device 100 and/or of server 50).

Derived domain metadata 332 may include any suitable data associated with any suitable domain type(s) that may be associated with the MCP by analyzing the metadata already associated with the MCP. For example, in some embodiments, a domain type may be a location domain and any captured location metadata of captured metadata 315, explicit user metadata 330, media content-analysis metadata 335 (e.g., media attribute score(s) 345 and/or content indicator(s) 350), and/or implicit user metadata 340 and/or other derived metadata 325 for any MCP or collection of MCPs may be analyzed with or without any contextual data in order to associate an MCP with any suitable derived location metadata 332 that may be indicative of one or more location regions and/or one or more location areas (e.g., areas of interest) and/or one or more location designations (e.g., home, residence, office, etc.) and/or the like that may enable the MCP to be grouped with other MCPs. As another example, a domain type may be a time domain and any captured time metadata of captured metadata 315, explicit user metadata 330, media content-analysis metadata 335 (e.g., media attribute score(s) 345 and/or content indicator(s) 350), and/or implicit user metadata 340 and/or other derived metadata 325 for any MCP or collection of MCPs may be analyzed with or without any contextual data in order to associate an MCP with any suitable derived time metadata 332 that may be indicative of one or more time quantifications (e.g., weekday, season, etc.) and/or one or more time event designations (e.g., holiday, Halloween, etc.) and/or the like that may enable the MCP to be grouped with other MCPs. As another example, a domain type may be a person domain and any captured person metadata of captured metadata 315, explicit user metadata 330, media content-analysis metadata 335 (e.g., media attribute score(s) 345 and/or content indicator(s) 350), and/or implicit user metadata 340 and/or other derived metadata 325 for any MCP or collection of MCPs may be analyzed with or without any contextual data in order to associate an MCP with any suitable derived person metadata 332 that may be indicative of one or more person quantifications (e.g., person names and/or person relationships, such as John Doe ("user"), Jane Doe ("user's wife"), Jenn Doe ("user's daughter"), unverified person (unknown relationship), Jim James ("user's co-worker"), etc.) and/or one or more person event designations (e.g., anniversary, birthday, etc.) and/or one or more person social group designations (e.g., co-worker social group of John Doe and Jim James, any social group collection of identities that may be identified to appear together often (e.g., in different moments, at different events, etc.), etc.) and/or the like that may enable the MCP to be grouped with other MCPs. As another example, a domain type may be a place domain and any captured place metadata of captured metadata 315, explicit user metadata 330, media content-analysis metadata 335 (e.g., media attribute score(s) 345 and/or content indicator(s) 350), and/or implicit user metadata 340 and/or other derived metadata 325 for any MCP or collection of MCPs may be analyzed with or without any contextual data in order to associate an MCP with any suitable derived place metadata 332 that may be indicative of one or more points of interest ("POIs") and/or regions of interest ("ROIs") (e.g., nature, water, mountain, urban, beach, nightlife, restaurant, entertainment, park, culture, travel, shopping, etc.) and/or the like that may enable the MCP to be grouped with other MCPs. As another example, a domain type may be a scene domain and any captured scene metadata of captured metadata 315, explicit user metadata 330, media content-analysis metadata 335 (e.g., media attribute score(s) 345 and/or content indicator(s) 350), and/or implicit user metadata 340 and/or other derived metadata 325 for any MCP or collection of MCPs may be analyzed with or without any contextual data in order to associate an MCP with any suitable derived scene metadata 332 that may be indicative of one or more scenes (e.g., animal (e.g., bird, reptile, dog, fish, etc.), outdoor (e.g., sky, sand, playground, etc.), celebration (e.g., wedding, birthday cake, jack-o-lantern, etc.), structure (e.g., fireplace, aquarium, etc.), vehicle (e.g., helicopter, bicycle, limousine, etc.), recreation (e.g., performance (e.g., orchestra, karaoke, rodeo, etc.), sport (e.g., rafting, surfing, scuba, etc.), etc.), plant (e.g., flower, tree, etc.), game (e.g., poker, foosball, etc.), fire, liquid (e.g., jacuzzi, river, etc.), art (e.g., origami, balloon, etc.), light (e.g., chandelier, candle, etc.), room (e.g., bar, museum, restaurant, etc.), people, etc.) and/or the like that may enable the MCP to be grouped with other MCPs. As another example, a domain type may be a moment domain and any captured moment metadata of captured metadata 315, explicit user metadata 330, media content-analysis metadata 335 (e.g., media attribute score(s) 345 and/or content indicator(s) 350), and/or implicit user metadata 340 and/or other derived metadata 325 for any MCP or collection of MCPs may be analyzed with or without any contextual data in order to associate an MCP with any suitable derived moment metadata 332 that may be indicative of a moment (e.g., a distinct range of times and a distinct location or distinct range of locations) and/or the like that may enable the MCP to be grouped with other MCPs. As described in more detail with respect to FIG. 4, for example, one or more applications or services (e.g., a framework services) of system 1 (e.g., of processor 102 and/or server 50) may be operative to generate and/or use an MCP management system 107 (e.g., a database and/or a knowledge graph metadata network (e.g., a hierarchical directed acyclic graph ("DAG") structure that may include nodes corresponding to different domain types and different specific sub-domains of each domain type of metadata 311, for example, where derived domain metadata 332 may be defined in terms of node identifiers in the graph structure, and all nodes of the structure may be correlated (e.g., by correlation weights (e.g., confidence weights and/or relevance weights))) to manage, store, ingest, organize, and/or retrieve the various MCPs 305 (e.g., metadata 311 and/or content 310) of library 105. Additional disclosure regarding suitable graph metadata networks can be found in co-pending, commonly-assigned U.S. Patent Application Publication No. 2017/0091154 (published on Mar. 30, 2017) and in co-pending, commonly-assigned U.S. patent application Ser. No. 15/391,269 (filed on Dec. 27, 2016), each of which is hereby incorporated by reference herein in its entirety.

Therefore, there may be various types of metadata assets 311 that may be associated with an MCI 310 of an MCP 305. A particular type of metadata asset may be a first metadata asset 311 of a first MCP 305 associated with a first MCI 310 and may also be a second metadata asset 311 of a second MCP 305 associated with a second MCI 310. In some embodiments, a type of metadata may be categorized as primitive metadata or inferred metadata, which may be determined based at least on primitive metadata. For example, as may be used herein, "primary primitive metadata" may refer to metadata that may describe one or more characteristics or attributes associated with one or more MCIs 310. Some types of primary primitive metadata include, but are not limited to, one or more of time metadata, geo-position metadata, geolocation metadata, people metadata, scene metadata, content metadata, object metadata, and/or sound metadata. Time metadata may refer to a time that may be associated with one or more media content items (e.g., a timestamp associated with a media content item, a time at which the media content item was captured or otherwise generated, a time at which the media content item was modified, a time at which the media content item was stored, a time at which the media content item was transmitted, a time at which the media content item was received, etc.), which may be captured metadata 315. Geo-position metadata may refer to geographic and/or spatial attributes that may be associated with one or more media content items using any suitable location sensing and/or geographic coordinate system (e.g., latitude, longitude, and/or altitude, etc.), which may be captured metadata 315. Geolocation metadata may refer to one or more meaningful locations rather than geographic coordinates that may be associated with one or more media content items, such as a beach (and its name), a street address, a country name, a region, a building, a landmark, and/or the like, which, for example, may be determined by processing geo-position metadata together with data from a map application and/or any other suitable data available to device 100 to determine that the geolocation for a scene in a group of images. People metadata may refer to at least one face that may be detected in at least one media content item (e.g., through any suitable facial recognition technique(s)), where the people metadata may be indicative of a particular identity (e.g., a tagged or otherwise known (e.g., verified) person) or an unknown identity (e.g., an unverified or unknown person), which may be metadata 330 and/or metadata 335. Scene metadata and/or object metadata may refer to an overall description of an activity or situation associated with one or more media content items based on any objects that may be detected therein (e.g., if a media content item includes a group of images, then scene metadata for the group of images may be determined using detected objects in one or more of the images (e.g., the detection of a large cake with candles and/or balloons in at least two images in the group can be used to associate "birthday" scene metadata with each of the images)), where such objects or scene indicators or content indicators may be any suitable objects (e.g., a detected animal, a detected company logo, a detected piece of furniture, a detected instrument, etc.) that may be able to be detected in a media content item using any suitable techniques (e.g., any suitable image processing techniques), which may be metadata 350. Content metadata may refer to any features of a media content item (e.g., pixel characteristics, pixel intensity values, luminance values, brightness values, loudness levels, etc., etc.), which may be metadata 345. Sound metadata may refer to one or more detected sounds associated with one or more media content items (e.g., a detected sound as a human's voice, a detected sound as a fire truck's siren, etc.), which may be metadata 335.

As used herein, "inferred metadata" may refer to metadata that may describe one or more characteristics or attributes associated with one or more MCIs 310 that is beyond the information that may be provided by primitive metadata. One difference between primitive metadata and inferred metadata may be that primitive metadata may represent an initial set of descriptions of one or more media content items while inferred metadata may provide one or more additional descriptions or characteristics of the one or more media content items based on processing one or more of the primitive metadata assets (e.g., in combination with any suitable contextual data that may be available to device 100). For example, primitive metadata may identify two detected persons in one or a group of images as John Doe and Jane Doe, while inferred metadata may identify John Doe and Jane Doe as a married couple based on processing at least a portion of the primitive metadata (e.g., in combination with any suitable contextual data). Inferred metadata may be determined from at least one of (i) processing of a combination of different types of primary primitive metadata, (ii) processing of a combination of different types of contextual information, and (iii) processing of a combination of primary primitive metadata and contextual information. As used herein, "context" and/or its variations may refer to any or all data that may be accessible to device 100, such as physical, logical, social, and/or other contextual information. As used herein, "contextual information" and/or contextual data and/or contextual metadata and/or its variations may refer to metadata or any other suitable information that may describe or define a user's context or a context of a user's device (e.g., device 100 with access to library 105 (e.g., as may be associated with a user)). Exemplary contextual information may include, but is not limited to, a predetermined time interval, a time event scheduled to occur in a predetermined time interval, a geolocation to be visited in a predetermined time interval, one or more identified persons associated with a predetermined time, an event scheduled for a predetermined time, a geolocation to be visited at predetermined time, weather metadata describing weather associated with a particular period in time (e.g., rain, snow, sun, temperature, etc.), season metadata describing a season associated with capture of a media content item, and/or the like. For example, such contextual information can be obtained from any suitable application data local to device 100 and/or any suitable application data that may be provided by external sources (e.g., a remote server (e.g., server 50 (e.g., via the internet))) from any suitable application or data source, such as a social networking application (e.g., information indicative of relationships between people, planned events with or without known attendees, birthdays, favorite hobbies and/or restaurants and/or media, etc.), a weather application (e.g., information indicative of weather or other environmental conditions at a certain place at a certain time), a calendar application (e.g., information indicative of a scheduled event, scheduled participants, etc.), a contact application (e.g., information indicative of a person's home address, etc.), a health application (e.g., information indicative of a user's heart rate, steps taken, speed, calories burned, food ingested, particular sport or hobby performed, etc.), a wallet application (e.g., information indicative of a scheduled or attended event, passes for an event, receipts for services and/or goods purchased, etc.), a messaging application or an e-mail application (e.g., information indicative of discussed events, communicating persons, etc.), a map application (e.g., information indicative of places visited, etc.), a photos application itself (e.g., information indicative of any tags or verified face identifications, likes, shares, groupings, albums, and/or the like based on a user's interaction (e.g., input data) with library 105), and/or any other type of application or data source that may be operative to provide information that may be processed (e.g., based on and/or in combination with any known metadata of library 105) to reveal additional characteristics to be associated with one or more media content items (e.g., as new metadata and/or correlations between known metadata (e.g., to define a new node and/or correlation between nodes of a metadata network (e.g., a knowledge graph)), as described in more detail with respect to FIG. 4). Therefore, one or metadata assets of library 105 may be indicative of a person's name, birthplace, birthday, gender, relationship status, identification of related persons, social groups and identities of members of social groups of any type (e.g., family, friends, co-workers, etc.), current and/or prior address(es) of residence and/or vacation and/or work, interests (e.g., hobbies (e.g., pets owned, instruments played, activities enjoyed, restaurants enjoyed, etc.)), places of interest (e.g., visited and/or interested in), etc.), religion, trips taken and associated travelers, events attended and associated attendees, physical activity (e.g., workouts or sports or hobbies or activities performed or enjoyed), and/or the like. The preceding examples are illustrative and not restrictive.

Two categories of inferred metadata may be referred to herein as primary inferred metadata and auxiliary inferred metadata. Primary inferred metadata may include time event metadata that may describe one or more time events associated with one or more media content items. For example, if a media content item or a collection of media content items is associated with primary primitive metadata indicative of a particular time or a particular range of times and/or a particular location, then associated primary inferred metadata may be determined to include time event metadata that may describe one or more time events or people events associated with such time and/or location information (e.g., a vacation, a birthday, a sporting event, a concert, a graduation ceremony, a dinner, a project, a work-out session, a traditional holiday, etc.), where such primary inferred metadata may, in some embodiments, be determined by analyzing such primary primitive metadata alone or in combination with any suitable contextual metadata (e.g., calendar data and/or social media data, etc.). Auxiliary inferred metadata may be any suitable metadata including, but not limited to, geolocation relationship metadata, person relationship metadata, object relationship metadata, and sound relationship metadata. Geolocation relationship metadata may refer to a relationship between one or more known persons associated with one or more media content items and one or more locations associated with the one or more media content items. For example, an analytics engine or data mining technique can be used to determine that a scene associated with one or more media content items of John Doe represents John Doe's home. Person relationship metadata may refer to a relationship between one or more known persons associated with one or more media content items and one or more other known persons associated with the one or more media content items. For example, an analytics engine or data mining technique can be used to determine that Jane Doe (who appears in one or more images with John Doe) is John Doe's wife. Object relationship metadata may refer to a relationship between one or more known persons associated with one or more media content items and one or more known objects associated with the one or more media content items. For example, an analytics engine or data mining technique can be used to determine that a boat appearing in one or more images with John Doe is owned by John Doe. Sound relationship metadata may refer to a relationship between one or more known sounds associated with one or more media content items and one or more known persons associated with the one or more media content items. For example, an analytics engine or data mining technique can be used to determine that a voice that appears in one or more videos with John Doe is John Doe's voice.

Inferred metadata may be determined or inferred from primitive metadata and/or contextual information by performing any suitable type(s) of processing, including, but not limited to, data mining primitive metadata and/or contextual information; analyzing primitive metadata and/or contextual information, applying logical rules to primitive metadata and/or to contextual information, and/or any other known methods that may be used to infer new information from provided or acquired information. In some embodiments, primitive metadata can be extracted from inferred metadata. For example, primary primitive metadata (e.g., time metadata, geolocation metadata, scene metadata, etc.) can be extracted from primary inferred metadata (e.g., time event metadata, etc.). Techniques for determining inferred metadata and/or extracting primitive metadata from inferred metadata can be iterative. For example, inferring metadata can trigger the inference of other metadata and so on. As another example, extracting primitive metadata from inferred metadata can trigger inference of additional inferred metadata or extraction of additional primitive metadata.

Figure 4:
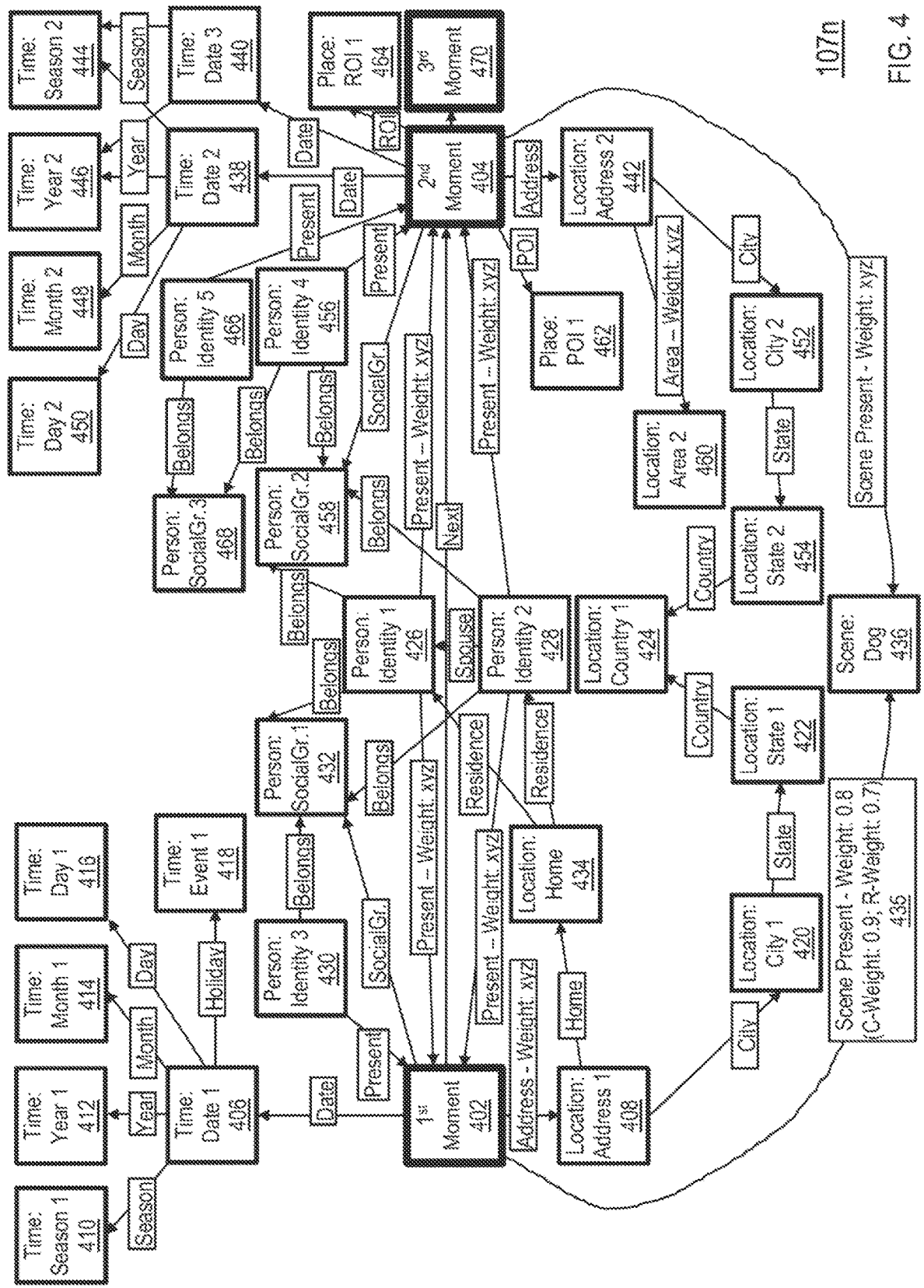
FIG. 4 is an exemplary block diagram of a portion of an illustrative metadata network of the system of FIGS. 1 and 2.

FIG. 4 shows, in block diagram form, an exemplary portion 107n of a type of MCP management system 107, which may be provided by any suitable graph structure, such as a DAG structure or otherwise, and may also be referred to herein as a knowledge graph metadata network or knowledge graph or metadata network 107n. While an MCP management system may, alternatively, be provided by any suitable database (e.g., a relational database, a distributed database, an object-oriented programming database, etc.), using such a database for management of a library of MCPs may be too resource-intensive (e.g., substantial computational resources may be needed to manage the MCPs (e.g., substantial processing power may be needed for performing queries or transactions, storage memory space for storing the necessary databases, etc.)) and/or may not be as easily implemented on a computing system with limited storage capacity (e.g., device 100), thereby requiring certain functionality of a remote subsystem (e.g., remote server 50). Instead, in some embodiments, MCP management system 107 may be at least partially provided as a metadata network 107n, at least an exemplary portion of which may be shown in FIG. 4, that may include correlated metadata assets that may describe characteristics associated with various MCIs 310 of MCPs 305 of library 105, where such a metadata network may be operative to manage library 105 locally on device 100 (e.g., with processing circuitry 102) without the need for any external data sources (e.g., remote server 50). Each metadata asset may be a type of metadata 311 that may be associated with and that may describe or otherwise be indicative of at least characteristic of one or more MCIs 310 of one or more MCPs 305 of library 105. As a non-limiting example, a metadata asset can describe a characteristic associated with multiple MCIs 310 (e.g., a metadata asset may be metadata 311 of two or more different MCPs 305) in library 105. Each metadata asset can be represented as a node in metadata network 107n. A metadata asset can be correlated with at least one other metadata asset. Each correlation between metadata assets can be represented as an edge in the metadata network that is between the nodes representing the correlated metadata assets.

Device 100 (e.g., processing circuitry 102) may include any suitable processing unit(s), such as one or more central processing units ("CPUs"), one or more graphics processing units ("GPUs"), other integrated circuits ("ICs"), memory, and/or other electronic circuitry. Such processing unit(s) may include any suitable MCP management logic/modules, which may be implemented as hardware (e.g., electronic circuitry associated with processing circuitry 102, dedicated logic, etc.), software (e.g., one or more instructions associated with a computer program (e.g., application 103) that may be executed by processing circuitry 102, software run on a general-purpose computer system or a dedicated machine, etc.), or a combination thereof, for generating and/or maintaining and/or otherwise operating MCP management system 107 by manipulating and/or otherwise processing any suitable data of library 105 and any other suitable data (e.g., contextual data) available to device 100 (e.g., social media application data, contact application data, weather application data, health application data, calendar application data, messaging application data, e-mail application data, and/or the like). Therefore, device 100 and/or any other portion(s) of system 1 (e.g., server 50) may be operative to generate and use a knowledge graph metadata network 107n as a multi-dimensional network, which may be a dynamically organized collection of metadata assets of metadata 311 of MCPs 305 of library 105 but which may not include any media content items 310 of such MCPs 305, and/or which may be used for deductive reasoning. For example, device 100 may be operative to (i) generate metadata network 107n, (ii) relate and/or present at least two MCIs 310 based on metadata network 107n, (iii) determine and/or present interesting MCIs 310 of library 105 based on metadata network 107n and predetermined criterion, (iv) select and/or present representative MCIs 310 to summarize a collection (e.g., a moment) of media content items based on input specifying the representative group's size, (v) use metadata network 107n to reduce a number of unverified persons detected in media content 310, (vi) use metadata network 107n to determine a mood of a collection (e.g., a moment) of media content items, and/or (vii) use metadata network 107n to identify a group of media content items associated with a particular type of scene that may be relevant to a user.

Metadata network 107n may enable deep connections between metadata using multiple dimensions in the metadata network, which can be traversed for additionally deduced correlations. Each dimension in the metadata network may be viewed as a grouping of metadata based on metadata type. For example, a grouping of metadata may be all time metadata assets in a metadata collection (e.g., all metadata 311 of library 105) and another grouping could be all geo-position metadata assets in the same metadata collection. Thus, in such an example, a time dimension may refer to all time metadata assets in the metadata collection and a geo-position dimension may refer to all geo-position metadata assets in the same metadata collection. Furthermore, the number of dimensions can vary based on constraints. Constraints may include, but are not limited to, a desired use for the metadata network, a desired level of detail, and/or the available metadata or computational resources that may be used to implement the metadata network. For example, the metadata network can include only a time dimension, the metadata network can include all types of primitive metadata dimensions, and/or the like. With regard to the desired level of detail, each dimension can be further refined based on specificity of the metadata. That is, each dimension in the metadata network may be a grouping of metadata based on metadata type and the granularity of information may be described by the metadata. For a first example, there may be two time dimensions in the metadata network, where a first time dimension may include all time metadata assets classified by week and a second time dimension may include all time metadata assets classified by month. For a second example, there may be two geolocation dimensions in the metadata network, where a first geolocation dimension may include all geolocation metadata assets classified by type of establishment (e.g., home, business, etc.) and a second geolocation dimension that may include all geolocation metadata assets classified by country. The preceding examples are merely illustrative and not restrictive. It is to be appreciated that the level of detail for dimensions can vary depending on designer choice, application, available metadata, and/or available computational resources.

Metadata network 107n may be a multi-dimensional network of MCP metadata 311. As used herein, a "multi-dimensional network" and its variations may refer to a graph (e.g., a complex graph) having multiple kinds of relationships. A multi-dimensional network generally may include multiple nodes and edges, where, in some embodiments, the nodes may represent metadata and the edges may represent relationships or correlations between the metadata. Exemplary multi-dimensional networks include, but are not limited to, edge-labeled multigraphs, multipartite edge-labeled multigraphs, DAGs, and multilayer networks. In some embodiments, the nodes in metadata network 107n may represent metadata assets of MCP metadata 311, for example, where each node may represent a particular metadata asset that may be associated with one or more MCIs 310 and MCPs 305 of library 105 (e.g., a first node may be a first metadata asset that may not only be a part of first metadata 311 associated with a first MCI 310 of a first MCP 305 of library 105 but that may also be a part of second metadata 311 associated with a second MCI 310 of a second MCP 305 of library 105. As another example, each node may represent a metadata asset that may be associated with a group of MCIs in a collection. As used herein, a "metadata asset" and its variations may refer to metadata (e.g., a single instance of metadata, a group of multiple instances of metadata, etc.) that may describe one or more characteristics of one or more MCIs in a library. As such, there may be a primitive metadata asset, an inferred metadata asset, and/or the like. For a first example, a primary primitive metadata asset may refer to a time metadata asset describing a time interval between Jun. 1, 2016 and Jun. 3, 2016 when one or more MCIs may have been captured. For a second example, a primary primitive metadata asset may refer to a geo-position metadata asset that may describe one or more latitudes and/or longitudes where one or more MCIs may have been captured. For a third example, an inferred metadata asset may refer to a time event metadata asset that may describe a holiday of Halloween.

Metadata network 107n may be configured to include two types of nodes, such as moment nodes and non-moments nodes. As used herein, a "moment" may refer to a single event (e.g., as may be described by an event or moment metadata asset) that may be associated with one or more MCIs. For example, a moment may refer to a vacation in Paris, France that lasted between Jun. 1, 2016 and Jun. 9, 2016 or to a Halloween party on Halloween afternoon at a person's home. For this example, the moment can be used to identify one or more MCIs 310 (e.g., one image, a group of images, a video, a group of videos, a song, a group of songs, etc.) that may be associated with the vacation in Paris, France that lasted between Jun. 1, 2016 and Jun. 9, 2016 or that may be associated with the afternoon Halloween party at a person's home. As used herein, a "moment node" may refer to a node in a multi-dimensional network, such as metadata network 107n, that may represent a moment. Thus, a moment node may refer to a metadata asset (e.g., a primary inferred metadata asset) that may represent a single event or moment that may be associated with one or more MCIs. As used herein, a "non-moment node" may refer to a node in a multi-dimensional, such as metadata network 107n, that may not represent a moment. Thus, a non-moment node may refer to at least one of a primary primitive metadata asset associated with one or more MCIs or an inferred metadata asset associated with one or more MCIs that is not a moment (i.e., not a moment metadata asset). As used herein, an "event" and its variations may refer to a situation or an activity that may be occurring at one or more locations during a specific time interval. An event may include, but is not limited to, one or more of a gathering of one or more persons to perform an activity (e.g., a holiday, a vacation, a birthday, a dinner, a project, a work-out session, etc.), a sporting event (e.g., an athletic competition, etc.), a ceremony (e.g., a ritual of cultural significance that is performed on a special occasion, etc.), a meeting (e.g., a gathering of individuals engaged in some common interest, etc.), a festival (e.g., a gathering to celebrate some aspect in a community, etc.), a concert (e.g., an artistic performance, etc.), a media event (e.g., an event created for publicity, etc.), a party (e.g., a large social or recreational gathering, etc.), and/or the like. While network 107n may be described with respect to moment nodes and non-moment nodes such that all nodes may be related via a moment dimension (e.g., a time dimension, as each moment node may be associated with a discrete duration/range of time), network 107n may alternatively be described with respect to "visit" nodes and non-visit nodes such that all nodes may be related via a visit dimension (e.g., a location dimension, where each visit node may be associated with a discrete geographic location/range of locations, not beholden to any particular time frame), or with respect to any other type of nod/dimension(s) delineation.

Edges in metadata network 107n between nodes may represent relationships or correlations between the nodes. For example, system 1 may update metadata network 107n as new metadata 311 is obtained. System 1 may be configured to manage MCIs 310 of library 105 using metadata network 107n, such as to relate multiple MCIs based on the correlations (e.g., the edges in metadata network 107n) between metadata assets associated with the MCIs (e.g., the nodes of metadata network 107n). For example, a first group of one or more MCIs 310 may be related to a second group of one or more MCIs based on the metadata assets that may be represented as moment nodes in metadata network 107n. As another example, metadata network 107n may be used to identify and present or otherwise utilize interesting groups of one or more MCIs 310 in library 105 based on certain correlations (e.g., certain edges in metadata network 105) between metadata assets associated with the MCIs (e.g., the nodes in metadata network 107n) and any suitable predetermined criterion, where the interesting groups of MCIs may be selected based on moment nodes in metadata network 107n and such predetermined criterion may refer to any suitable contextual information. It is to be appreciated that metadata network 107n of FIG. 4 is exemplary and that every node that can be generated by system 1 is not shown. For example, even though every possible node is not illustrated in FIG. 4, system 1 may be operative to generate a node to represent each metadata asset of library 105.

In metadata network 107n of FIG. 4, nodes representing metadata may be illustrated as boxes while edges representing correlations between metadata may be illustrated as labeled connections between boxes. Furthermore, moment nodes (e.g., a first moment node 402, a second moment node 404, and a third moment node 470) may be represented as boxes with thickened boundaries while other non-moment nodes (e.g., nodes 406-468) may lack such thickened boundaries. System 1 (e.g., processing circuitry 102) may be operative to define nodes based on metadata 311 associated with MCIs 310 of MCPs 305 of library 105, and, as additional metadata 311 is determined (e.g., as new metadata is captured, assigned, inferred, derived, and/or the like (e.g., as additional MCIs 310 are captured or added to library 105 and/or as additional explicit user actions are taken and/or as additional contextual data is made available to system 1), additional nodes and/or edges may be generated and added to metadata network 107*n*.

As shown, metadata network 107*n* may include a first moment metadata asset node 402 and a second moment metadata asset node 404. Any moment node may be generated for a particular moment that may be identified by system 1 based on library 105 in any suitable manner. For example, when at least a threshold amount of MCIs 310 are identified to be associated with time metadata within a particular time range and with location metadata within a particular location range, then those identified MCIs 310 may be associated with a moment metadata asset that is descriptive of that time range and location range (e.g., a moment that may be indicative of an interesting event that took place during that time range at that location(s) due to at least a threshold amount of MCIs being captured). Alternatively, a particular subset of MCIs 310 of library 105 may be associated with a particular moment metadata asset in any other suitable manner. As just one particular example, which may be referred to herein with respect to metadata network 107*n* of FIG. 4, first moment metadata asset node 402 may be defined to represent first moment metadata indicative of a first moment that may be based on a particular time range of 2:00 PM to 4:00 PM on Oct. 31, 2009 and for a particular location range (e.g., within 100 feet) of a particular geographic coordinate (e.g., a particular address), such as a user's home at 22 Skyline Drive in Wellesley, Mass., 02482, U.S.A., where such a first moment may be defined as a result of at least a certain number of MCIs 310 being identified in library 105 that are associated with time metadata 311 indicative of any time within that time range and with location metadata 311 indicative of any location within that location range (e.g., when many MCIs are captured at a Halloween party at a person's home), while second moment metadata asset node 404 may be defined to represent second moment metadata indicative of a second moment that may be based on a particular time range of Jun. 30, 2016 through Jul. 1, 2016 and for a particular location range (e.g., within the city limits of a particular city), such as within New York City, N.Y., U.S.A., where such a second moment may be defined as a result of at least a certain number of MCIs 310 being identified in library 105 that are associated with time metadata 311 indicative of any time within that time range and with location metadata 311 indicative of any location within that location range (e.g., when many MCIs are captured during a vacation to New York City), where each one of such MCIs associated with second moment 404 may be different than each one of such MCIs associated with first moment 402. Although only two moment nodes may be shown in FIG. 4, network 107*n* may include more than two moment nodes, each associated with a particular moment of a particular time range and a particular geographic range. Two moment nodes may be correlated by advancement of time (e.g., second moment metadata asset node 404 associated with the year 2016 may be after first moment metadata asset node 402 associated with the year 2009, as may be shown by the edge labelled "Next" between nodes 402 and 404).

Any suitable nodes may be associated with any suitable metadata assets and may be defined within network 107*n* and correlated with one or more moment nodes and/or one or more non-moment nodes. As shown, first moment metadata asset node 402 may be correlated (e.g., by date) with at least one time date metadata asset node 406 that may be defined to represent time date metadata indicative of a first date (e.g., Oct. 31, 2009) and/or may be correlated (e.g., by address) with at least one location address metadata asset node 408 that may be defined to represent location address metadata indicative of a first address (e.g., 22 Skyline Drive, Wellesley, Mass., 02482, U.S.A. or an associated geographic coordinate system (e.g., latitude, longitude, and/or altitude)). At least one MCI 310 of library 105 may be associated with first moment metadata represented by moment node 402 and time metadata represented by time node 406 and location metadata represented by location node 408. As shown, time date metadata asset node 406 (e.g., indicative of Oct. 31, 2009) may be correlated (e.g., by season) with a time season metadata asset node 410 that may be defined to represent time season metadata indicative of a first season (e.g., Fall) and/or may be correlated (e.g., by year) with a time year metadata asset node 412 that may be defined to represent time year metadata indicative of a first year (e.g., 2009) and/or may be correlated (e.g., by month) with a time month metadata asset node 414 that may be defined to represent time month metadata indicative of a first month (e.g., October) and/or may be correlated (e.g., by day) with a time day metadata asset node 416 that may be defined to represent time day metadata indicative of a first day (e.g., 31) and/or may be correlated (e.g., by holiday) with a time holiday metadata asset node 418 that may be defined to represent time holiday metadata indicative of a first holiday (e.g., Halloween), and, although not shown, it is to be understood that time date metadata asset node 406 may be correlated with any other suitable types of metadata asset nodes within network 107*n*, including, but not limited to, a time day of week metadata asset node that may be defined to represent time day of week metadata indicative of a day of week (e.g., Saturday) and/or the like. Additionally or alternatively, as shown, location address metadata asset node 408 (e.g., indicative of 22 Skyline Drive, Wellesley, Mass., 02482, U.S.A.) may be correlated (e.g., by city) with a location city metadata asset node 420 that may be defined to represent location city metadata indicative of a first city (e.g., Wellesley), which may be correlated (e.g., by state) with a location state metadata asset node 422 that may be defined to represent location state metadata indicative of a first state (e.g., Massachusetts), which may be correlated (e.g., by country) with a location country metadata asset node 424 that may be defined to represent location country metadata indicative of a first country (e.g., United States of America), and, although not shown, it is to be understood that location address metadata asset node 408 may be correlated (e.g., directly or via another node) with any other suitable types of metadata asset nodes within network 107*n*, including, but not limited to, a location ZIP code metadata asset node that may be defined to represent location ZIP code metadata indicative of a ZIP code and/or the like.

Additionally or alternatively, as shown, first moment metadata asset node 402 may be correlated (e.g., by presence) with at least one person identity metadata asset node, such as a person identity metadata asset node 426 that may be defined to represent person identity metadata indicative of a first identity (e.g., John Doe) and/or a person identity metadata asset node 428 that may be defined to represent person identity metadata indicative of a second identity (e.g., Jane Doe) and/or a person identity metadata asset node 430 that may be defined to represent person identity metadata indicative of a third identity (e.g., a first unknown person), while person identity metadata asset node 428 may be correlated (e.g., by spouse) with person identity metadata asset node 426 (e.g., when the first identity (e.g., John Doe) and the second identity (e.g., Jane Doe) are determined to be each other's spouse). At least one MCI 310 of library 105 may be associated with first moment metadata represented by moment node 402 and person metadata represented by person node 426, at least one MCI 310 of library 105 may be associated with first moment metadata represented by moment node 402 and person metadata represented by person node 428, and at least one MCI 310 of library 105 may be associated with first moment metadata represented by moment node 402 and person metadata represented by person node 430. Network 107*n* may also include a person social group metadata asset node 432 that may be defined to represent person social group metadata indicative of a first social group and that may be correlated (e.g., by social group) with moment node 402, and each one of person identity metadata asset node 426 and person identity metadata asset node 428 and person identity metadata asset node 430 may be correlated (e.g., by belonging) with person social group metadata asset node 432 (e.g., when the first identity (e.g., John Doe) and the second identity (e.g., Jane Doe) and the third identity (e.g., the first unknown person) are determined to be of a particular social group). Network 107*n* may also include a location home metadata asset node 434 that may be defined to represent location home metadata indicative of a first home or residence, and location address metadata asset node 408 may be correlated (e.g., by home) with location home metadata asset node 434 (e.g., when the first address (e.g., 22 Skyline Drive, Wellesley, Mass., 02482, U.S.A.) is determined to be a home or residence), while each one of person identity metadata asset node 426 and person identity metadata asset node 428 may be correlated (e.g., by residence) with location home metadata asset node 434 (e.g., when each one of the first identity (e.g., John Doe) and the second identity (e.g., Jane Doe) is determined to reside at the first home). Additionally or alternatively, as shown, first moment metadata asset node 402 may be correlated (e.g., by presence) with at least one scene metadata asset node, such as a scene metadata asset node 436 that may be defined to represent scene metadata indicative of a first scene (e.g., a dog). At least one MCI 310 of library 105 may be associated with first moment metadata represented by moment node 402 and scene metadata represented by scene node 436.

Second moment metadata asset node 404 may be correlated (e.g., by date) with at least one time date metadata asset node 438 that may be defined to represent time date metadata indicative of a second date (e.g., Jun. 30, 2016) and/or may be correlated (e.g., by date) with at least one other time date metadata asset node 440 that may be defined to represent time date metadata indicative of a third date (e.g., Jul. 1, 2016) and/or may be correlated (e.g., by address) with at least one location address metadata asset node 442 that may be defined to represent at least one location address metadata indicative of a second address (e.g., 350 5$^{th}$ Avenue, New York, N.Y. 10118, U.S.A. or an associated geographic coordinate system (e.g., latitude, longitude, and/or altitude)). At least one MCI 310 of library 105 may be associated with second moment metadata represented by moment node 404 and location metadata represented by location node 408 and at least one of time metadata represented by time node 438 and time metadata represented by time node 440. As shown, time date metadata asset node 438 (e.g., indicative of Jun. 30, 2016) may be correlated (e.g., by season) with a time season metadata asset node 444 that may be defined to represent time season metadata indicative of a second season (e.g., Summer) and/or may be correlated (e.g., by year) with a time year metadata asset node 446 that may be defined to represent time year metadata indicative of a second year (e.g., 2016) and/or may be correlated (e.g., by month) with a time month metadata asset node 448 that may be defined to represent time month metadata indicative of a second month (e.g., June) and/or may be correlated (e.g., by day) with a time day metadata asset node 450 that may be defined to represent time day metadata indicative of a second day (e.g., 30), and, although not shown, it is to be understood that time date metadata asset node 438 may be correlated with any other suitable types of metadata asset nodes within network 107*n*, including, but not limited to, a time day of week metadata asset node that may be defined to represent time day of week metadata indicative of a day of week (e.g., Thursday) and/or the like. Additionally or alternatively, as shown, time date metadata asset node 440 (e.g., indicative of Jul. 1, 2016) may be correlated (e.g., by season) with time season metadata asset node 444 that may be defined to represent time season metadata indicative of the second season (e.g., Summer) and/or may be correlated (e.g., by year) with a time year metadata asset node 446 that may be defined to represent time year metadata indicative of the second year (e.g., 2016) and/or may be correlated (e.g., by month) with a time month metadata asset node (not shown) that may be defined to represent time month metadata indicative of a third month (e.g., July) and/or may be correlated (e.g., by day) with a time day metadata asset node (not shown) that may be defined to represent time day metadata indicative of a third day (e.g., 1), and, although not shown, it is to be understood that time date metadata asset node 440 may be correlated with any other suitable types of metadata asset nodes within network 107*n*, including, but not limited to, a time day of week metadata asset node that may be defined to represent time day of week metadata indicative of a day of week (e.g., Friday) and/or the like. Additionally or alternatively, as shown, location address metadata asset node 442 (e.g., indicative of 350 5$^{th}$ Avenue, New York, N.Y. 10118, U.S.A.) may be correlated (e.g., by city) with a location city metadata asset node 452 that may be defined to represent location city metadata indicative of a second city (e.g., New York City), which may be correlated (e.g., by state) with a location state metadata asset node 454 that may be defined to represent location state metadata indicative of a second state (e.g., New York), which may be correlated (e.g., by country) with location country metadata asset node 424 that may be defined to represent location country metadata indicative of the first country (e.g., United States of America), and, although not shown, it is to be understood that location address metadata asset node 442 may be correlated (e.g., directly or via another node) with any other suitable types of metadata asset nodes within network 107*n*, including, but not limited to, a location ZIP code metadata asset node that may be defined to represent location ZIP code metadata indicative of a ZIP code and/or the like.

Additionally or alternatively, as shown, second moment metadata asset node 404 may be correlated (e.g., by presence) with at least one person identity metadata asset node, such as person identity metadata asset node 426 that may be defined to represent person identity metadata indicative of the first identity (e.g., John Doe) and/or person identity metadata asset node 428 that may be defined to represent person identity metadata indicative of the second identity (e.g., Jane Doe) and/or a person identity metadata asset node 456 that may be defined to represent person identity metadata indicative of a fourth identity (e.g., Jenn Doe) and/or a person identity metadata asset node 466 that may be defined to represent person identity metadata indicative of a fifth identity (e.g., a second unknown person). Although not shown, person identity metadata asset node 456 may be correlated (e.g., by offspring) with person identity metadata asset node 426 and with person identity metadata asset node 428 (e.g., when the fourth identity (e.g., Jenn Doe) is determined to be the offspring of the first identity (e.g., John Doe) and of the second identity (e.g., Jane Doe)). At least one MCI 310 of library 105 may be associated with second moment metadata represented by moment node 404 and person metadata represented by person node 426, at least one MCI 310 of library 105 may be associated with second moment metadata represented by moment node 404 and person metadata represented by person node 428, at least one MCI 310 of library 105 may be associated with second moment metadata represented by moment node 404 and person metadata represented by person node 456, and at least one MCI 310 of library 105 may be associated with second moment metadata represented by moment node 404 and person metadata represented by person node 466. Network 107*n* may also include a person social group metadata asset node 458 that may be defined to represent person social group metadata indicative of a second social group and that may be correlated (e.g., by social group) with moment node 404, and each one of person identity metadata asset node 426 and person identity metadata asset node 428 and person identity metadata asset node 456 may be correlated (e.g., by belonging) with person social group metadata asset node 458 (e.g., when the first identity (e.g., John Doe) and the second identity (e.g., Jane Doe) and the fourth identity (e.g., Jenn Doe) are determined to be of a particular social group (e.g., a family)), while it is to be noted that person identity metadata asset node 466 may not be correlated with person social group metadata asset node 458 (e.g., when the fifth identity (e.g., second unknown person) is determined not to be of a particular social group (e.g., a family)). However, network 107*n* may also include a person social group metadata asset node 468 that may be defined to represent person social group metadata indicative of a third social group and that may be correlated (e.g., by social group (not shown)) with moment node 402, and each one of person identity metadata asset node 456 and person identity metadata asset node 466 may be correlated (e.g., by belonging) with person social group metadata asset node 468 (e.g., when the fourth identity (e.g., Jenn Doe) and the fifth identity (e.g., second unknown person) are determined to be of a particular social group). Network 107*n* may also include a location area metadata asset node 460 that may be defined to represent location area metadata indicative of a first area (e.g., an area of interest), such as the Empire State Building, and location address metadata asset node 442 may be correlated (e.g., by area) with location area metadata asset node 460 (e.g., when the second address (e.g., 350 5$^{th}$ Avenue, New York, N.Y. 10118, U.S.A.) is determined to be a particular area (e.g., an area of interest)). Additionally or alternatively, as shown, second moment metadata asset node 404 may be correlated (e.g., by point of interest ("POI")) with at least one place POI metadata asset node, such as a place POI metadata asset node 462 that may be defined to represent place POI metadata indicative of a first POI (e.g., culture). At least one MCI 310 of library 105 may be associated with second moment metadata represented by moment node 404 and place POI metadata represented by place POI node 462. Additionally or alternatively, as shown, second moment metadata asset node 404 may be correlated (e.g., by region of interest ("ROI")) with at least one place ROI metadata asset node, such as a place ROI metadata asset node 464 that may be defined to represent place ROI metadata indicative of a first ROI (e.g., urban). At least one MCI 310 of library 105 may be associated with second moment metadata represented by moment node 404 and place ROI metadata represented by place ROI node 464. Additionally or alternatively, as shown, second moment metadata asset node 404 may be correlated (e.g., by presence) with at least one scene metadata asset node, such as scene metadata asset node 436 that may be defined to represent scene metadata indicative of the first scene (e.g., a dog). At least one MCI 310 of library 105 may be associated with second moment metadata represented by moment node 404 and scene metadata represented by scene node 436.

It is to be understood that FIG. 4 is just exemplary of what may only be a portion of one illustrative metadata network 107*n* of system 1. For example, any node of FIG. 4 may be correlated with one or more other nodes of network 107*n* not shown in FIG. 4. For example, person identity metadata node 426 may be correlated (not shown) with one or more additional moment metadata nodes of network 107*n* in addition to moment nodes 402 and 404 (e.g., a third moment node 470 that may be representative of third moment metadata indicative of a third moment after the second moment represented by moment node 404). Additionally or alternatively, location country metadata node 424 may be correlated with one or more additional location nodes of network 107*n* in addition to location nodes 422 and 454. Additionally or alternatively, moment node 404 may be correlated with one or more additional location nodes of network 107*n* in addition to location node 442 (e.g., one or more MCIs 310 of library 105 may be associated with second moment metadata represented by moment node 404 and location address metadata other than the location address represented by location address node 442 (e.g., another MCI 310 associated with moment node 404 may be associated with third location address metadata indicative of a third location address other than 350 5$^{th}$ Avenue, New York, N.Y. 10118, U.S.A. (e.g., an address associated with another area of interest other than the Empire State Building))). Network 107*n* may be further populated with one or more additional nodes and/or one or more additional edges between nodes when one or more new metadata assets may be determined and associated with one or more MCIs already associated with moment metadata represented by one of moment node 402 and moment 404 and/or when one or more new MCIs may be associated with moment metadata represented by one of moment node 402 and moment node 404 and/or when further processing is carried out by system 1 on any existing metadata and/or contextual data available to system 1. It is to be appreciated that certain metadata assets and their respective nodes may be associated with individual MCIs and/or with other nodes (e.g., moment nodes) that may be associated with individual MCIs or groups of MCIs. For example, a moment node may be associated with each MCI in a group of MCIs, where each MCI in the group of MCIs may be associated with time metadata indicative of a time within the time range of the moment and/or may be associated with location metadata indicative of a location within the location range of the moment. As another example, a scene node (e.g., scene metadata asset node 436 that may be defined to represent scene metadata indicative of a first scene (e.g., a dog)) may be correlated with moment node 402, which may be associated with each MCI that has time and/or location metadata related to the time and location constraints of the moment, while only one or some but not all of those MCIs may be associated with scene metadata indicative of the scene represented by the scene node. Therefore, a scene node may be correlated to a moment node that is associated with a group of MCIs, while the scene node may also be directly associated with only one or some (or maybe all) of the MCIs of that group.

System 1 may be configured to generate additional nodes based on moment nodes in any suitable manner, including, but not limited to, determining (e.g., detecting, receiving, inferring, deriving, or otherwise obtaining a new metadata asset associated with a moment node by cross-referencing the new metadata asset with other assets in network 107*n* and/or generating a node for each metadata asset of library 105. System 1 may be configured to refine one, some, or each metadata asset associated with a moment nodes in any suitable manner, such as based on a probability distribution (e.g., a discrete probability distribution, a continuous probability distribution, etc.). For example, a Gaussian distribution may be used to determine a distribution of at least some metadata assets, such as the primary primitive metadata assets. For this example, the distribution may be used to ascertain a mean, a median, a mode, a standard deviation, a variance, and/or any other suitable characteristic associated with the distribution of the primary primitive metadata assets. System 1 may be configured to use the Gaussian distribution to select or filter out a subset of the primary primitive metadata assets that may be within any suitable predetermined criterion (e.g., 1 standard deviation (e.g., 68%), 2 standard deviations (e.g., 95%), 3 standard deviations (e.g., 99.7%), etc.). Hence, such selection/filtering operation(s) may be operative to assist with identifying relevant primary primitive metadata assets for MCP management and/or with filtering out noise and/or unreliable primary primitive metadata assets. Consequently, other types of metadata (e.g., inferred metadata assets, etc.) that may be associated with, determined from, or inferred from the primary primitive metadata assets may also be relevant and relatively noise-free. As another example, a Gaussian distribution may be used to determine a distribution of one, some, or each moment nodes. For this example, the distribution may be used to ascertain a mean, a median, a mode, a standard deviation, a variance, and/or any other suitable characteristic associated with the distribution of the moments. System 1 may be operative to use the Gaussian distribution to select or filter out a subset of the moment nodes that may be within any suitable predetermined criterion (e.g., 1 standard deviation (e.g., 68%), 2 standard deviations (e.g., 95%), 3 standard deviations (e.g., 99.7%), etc.). Hence, such selection/filtering operation(s) may be operative to assist with identifying relevant moment nodes for MCP management and/or with filtering out noise and/or unreliable primary inferred metadata assets or otherwise. Consequently, other types of metadata (e.g., primary primitive metadata assets, auxiliary inferred metadata assets, etc.) that may be associated with, determined from, or extracted from the moment metadata assets may also be relevant and relatively noise-free. Noise may occur due to primary primitive metadata assets that may be associated with one or more irrelevant MCIs, where such MCIs may be determined based on the number of MCIs associated with a primary primitive metadata asset. For example, a primary primitive metadata asset associated with two or less MCIs may be designated as noise. This may be because such metadata assets (and their associated MCIs) may be irrelevant given the little information they provide. For example, the more important or significant an event is to a user, the higher the likelihood that the event is captured using a large number of MCIs (e.g., three or more, etc.). For this example, the probability distribution described above may enable selecting the primary primitive metadata asset associated with these MCIs. This may be because the number of MCIs associated with the event may suggest an importance or relevance of the primary primitive metadata asset. In contrast, insignificant events may have only one or two MCIs captured, and the corresponding primary primitive metadata asset may not add much to MCP management based on the use of a metadata network, for example. The immediately preceding examples may also be applicable to any types of metadata.

System 1 may be configured to determine a correlation weight (e.g., confidence weight and/or a relevance weight) for one, some, or each metadata asset and/or one, some, or each correlation between any two metadata nodes representative of any two metadata assets. As used herein, a "confidence weight" and its variations may refer to a value (e.g., an integer, etc.) that may be used to describe a certainty that a metadata asset correctly identifies a feature or characteristic of one or more MCIs (e.g., one or more MCIs associated with a moment). For example, a confidence weight of 0.6 (e.g., out of a maximum of 1.0) can be used to indicate a 60% confidence level that a feature (e.g., a scene) in one or more MCIs associated with a moment is a dog. As used herein, a "relevance weight" and its variations may refer to a value (e.g., an integer, etc.) that may be used to describe an importance assigned to a feature or characteristic of one or more MCIs (e.g., one or more MCIs associated with a moment) as identified by a metadata asset. For example, a first relevance weight of 0.85 (e.g., out of a maximum of 1.0) can be used to indicate that a first identified feature in an MCI (e.g., a person) is very important while a second relevance weight of 0.50 (e.g., out of a maximum of 1.0) can be used to indicate that a second identified feature in an MCI (e.g., a dog) is not as important.

As shown in FIG. 4, for example, system 1 may be operative to estimate that one or more metadata assets associated with one or more MCIs associated with moment node 402 describe a dog. For this example, a correlation weight of a correlation 435 between node 402 and node 436 may be assigned a value 0.8, which may be any suitable confidence weight, any suitable relevance weight, or any suitable combination of any suitable confidence weight and any suitable relevance weight (e.g., a confidence weight ("C-weight") may be determined to be a value of 0.9 to indicate a 90% confidence level that a scene dog metadata asset of scene dog metadata asset node 436 is or ought to be associated with moment node 402 (e.g., with one or more MCIs associated with the first moment represented by moment node 402) and a relevance weight ("R-weight") may be determined to be a value of 0.7 to indicate that a scene dog metadata asset of scene dog metadata asset node 436 is a relatively important feature of moment node 402 (e.g., of one or more MCIs associated with the first moment represented by moment node 402), such that a correlation weight ("weight") may be an average value of 0.8 (alternatively, a correlation weight may be based on a difference between a confidence weight and a relevance weight for a particular edge)). With specific regard to scene metadata assets and/or person identity metadata assets associated with any suitable image MCIs, correlation weights and/or confidence weights and/or relevance weights may be detected via any suitable feature detection techniques that may include analyzing such metadata associated with one or more MCIs. For example, system 1 may be configured to determine any suitable weight(s) using metadata associated with one or more MCIs by applying known feature detection techniques. Relevance can be statically defined in a metadata network from external constraints. For example, relevance can be based on information (e.g., contextual information) that may be acquired from any suitable sources, such as social network data, calendar data, and/or the like. Additionally or alternatively, relevance may be based on any suitable internal constraints, where, for example, as more detections of a metadata asset are made, its relevance can be increased. Relevance may also retard as fewer detections are made. For example, as more detections of the second identified person metadata associated with person metadata node 428 (e.g., Jane Doe) are made over a predetermined period of time (e.g., an hour, a day, a week, a year, etc.), that person's relevance may be increased to indicate that person's importance (e.g., to a user of system 1 (e.g., to John Doe)). Confidence can be dynamically generated based on the ingest of any suitable metadata in a metadata network. For instance, a detected person in an MCI may be linked with information (e.g., contextual information) about that person as may be obtained from a contacts application, a calendar application, a social networking application, and/or any other suitable source to determine a level of confidence that the detected person is correctly identified. For a further example, an overall description of a scene in an MCI may be linked with geo-position information that may be acquired from metadata associated with the MCI to determine the level of confidence. Many other examples are possible. In addition, confidence can be based on any suitable internal constraints, where, for example, as more detections of a metadata asset are made, its identification confidence may be increased. Confidence can also retard as fewer detections are made.

System 1 may be configured to identify one or more valid moods (e.g., from a pre-defined list of moods) that may be associated with a collection of MCIs for any suitable reason. For example, a mood (e.g., an emotional state) that may be associated with a collection of MCIs ("MCI collection") may be used to select an appropriate graphic type for a graphical album cover that may be used to present the collection of MCIs to a user. As another example, a mood associated with an MCI collection may be used to determine when it may be appropriate to suggest (or not suggest) the collection of MCIs to a user (e.g., only promote MCI collections that are associated with a happy mood at certain times and/or avoid promoting MCI collections that are not associated with a happy mood at certain times, etc.). As yet another example, an MCI collection may be used to generate a composite presentation (e.g., a video presentation) and a mood associated with the MCI collection may be used to determine any suitable characteristics of the composite presentation, including, but not limited to, length of the composite presentation, tempo of the composite presentation, filters, animations, graphics, transitions between MCIs, effects, edit styles (e.g., pace of the edits), accompanying music, type of presentation, and/or the like. Moreover, any suitable number of MCIs 310 of library 105 may be used to define any suitable MCI collection for which a mood may be identified. In some embodiments, an MCI collection may include each MCI associated with a particular moment (e.g., each MCI 310 associated with the first moment of first moment node 402 of network 107n) or each MCI associated with two or more moments or each MCI associated with any suitable other type of metadata or types of metadata (e.g., any suitable non-moment node or any suitable combination of non-moment nodes). For example, an MCI collection may be defined to be each MCI 310 that is associated with scene metadata indicative of a first scene type (e.g., a dog). As another example, an MCI collection may be defined to be each MCI 310 that is not only associated with scene metadata indicative of a particular scene type (e.g., a dog) but also associated with place ROI metadata indicative of a particular ROI type (e.g., beach).

When a particular collection of MCIs has been identified as an MCI collection for which a mood may be identified, system 1 may be configured to identify at least one mood of a number of moods (e.g., of a number of pre-defined moods) that may be a valid mood to be associated with the identified MCI collection. Identification of at least one valid mood for the MCI collection may be made by analyzing the MCIs of the MCI collection and any metadata associated with the MCI collection (e.g., a particular collection of MCIs 310 of library 105 and any metadata 311 that may be associated therewith and/or any suitable portion(s) of metadata network 107n) to identify at least one mood source that is associated with the plurality of MCIs. Then a source mood vector (or any other suitable statistical representation) may be determined for one, some, or each of the identified mood sources. Any suitable mood property list or dictionary, an exemplary representation of which may be shown by mood property list or dictionary data structure 500 of FIG. 5 (e.g., a .plist file), may be made available to system 1 that may be operative to define a source mood vector for any suitable type of mood source. Such a mood property dictionary may be defined by any suitable source (e.g., server 50) and shared with device 100 (e.g., as part of an application or an update to an application). In some embodiments, at least a portion of such a mood property dictionary may be defined or updated or customized by an end user. Additionally or alternatively, in some embodiments, at least a portion of such a mood property dictionary may be automatically updated over time based on previous use of the mood property dictionary and/or based on any suitable media library data that may be available to system 1.

As shown in FIG. 5, for example, mood property dictionary 500 may be operative to define at least one source mood vector 597 for at least one mood source, where each source mood vector 597 may include a number of source mood vector elements 599, such as one source mood vector element 599 for each potential mood associated with dictionary 500, and where each source mood vector element 599 may be defined to include an appropriate source mood vector value 598 (e.g., −1 (e.g., negative or not recommended or forbidden), 0 (e.g., neutral), or +1 (e.g., positive or recommended)) for a respective one of the potential moods based on the particular mood source. Mood property dictionary 500 may be configured to define source mood vector values 598 for each one of 10 different moods 501-510, although any other suitable number of moods less than or greater than 10 may be used to define mood property dictionary 500 in other embodiments. Moods 501-510 may be defined to represent any suitable moods. As just one particular example, mood 501 may be a "dreamy" mood, mood 502 may be a "sentimental" mood, mood 503 may be a "gentle" mood, mood 504 may be a "chill" mood, mood 505 may be a "neutral" mood, mood 506 may be a "happy" mood, mood 507 may be an "uplifting" mood, mood 508 may be an "epic" mood, mood 509 may be a "club" mood, and mood 510 may be an "extreme" mood. Various other suitable moods may include, but are not limited to, sad, angry, silly, and/or the like.

A mood property dictionary may not only be representative of multiple different moods (e.g., moods 501-510 of mood property dictionary 500), but may also be defined to be representative of multiple mood sources, such that each represented mood source may be used to identify a particular source mood vector 597 that may be defined by a source mood vector value 598 for each one of the different represented moods. For example, as shown in FIG. 5, mood property dictionary 500 may be configured to define an appropriate source mood vector value 598 for each one of moods 501-510 for any one of any suitable number of mood sources, such as mood sources 521-523, 531-535, 541-543, 551-553, 561-563, 571-573, and 581-583. In some embodiments, each mood source of a mood property dictionary and/or each mood source that may be identified to be associated with a particular MCI group may generally be considered a mood source of any suitable type of mood source. For example, as shown in FIG. 5, mood property dictionary 500 may be representative of mood sources of one, some, or each of any suitable mood source types, including, but not limited to, a meaning mood source type 520 (e.g., a special meaning event node mood source type), a scene mood source type 530 (e.g., content and/or object and/or sound mood source type), a metadata network context mood source type 540 (e.g., a unique context mood source type), a memory mood source type 550 (e.g., collection-defining characteristic source type), a metadata network node mood source type 560 (e.g., a non-moment node mood source type), a video mood source type 570 (e.g., video tempo mood source type), an asset mood source type 580 (e.g., a face expression indicator mood source type), and/or the like.

Meaning mood source type 520 may include any suitable number of mood sources that may be indicative of a special meaning event node mood source type. Although not shown in metadata network 107n, MCP management system 107 or any other suitable portion of system 1 may be operative to identify (e.g., derive or infer or otherwise determine) that certain MCIs or associated metadata may be indicative of a special meaning event. For example, a special meaning node may be defined for network 107n and correlated to one or more moment nodes and/or to any one or more non-moment nodes and/or to any one or more specific MCIs, where a special meaning node may be defined to represent special meaning metadata indicative of a special meaning event (e.g., a trip, a wedding, and/or the like (e.g., time holiday metadata asset node 418 of network 107n of FIG. 4 that may be defined to represent time holiday metadata indicative of a first holiday (e.g., Halloween) may be correlated with a special meaning node (not shown) that may be defined to represent special meaning event metadata indicative of a first special meaning event (e.g., a celebrated holiday if it may be determined that such a holiday is routinely celebrated by the user or one or more other identities, an anniversary if Halloween also happens to be the anniversary of one or more identities, etc.))). In some embodiments, if a collection of MCIs being analyzed for mood is a collection of MCIs of two or more moments, then each moment may be correlated to a special meaning event in order for the special meaning event to be used as a mood source of meaning mood source type 520. In other embodiments, if a collection of MCIs being analyzed for mood is a collection of MCIs of two or more moments, then each moment may not be correlated to a special meaning event in order for the special meaning event to be used as a mood source of meaning mood source type 520 for the MCI collection. Instead, if a special meaning event is not correlated with all moments associated with the MCI collection, then the effect of the source mood vector associated with the special meaning event mood source may be prorated to the ratio of moment(s) to which it is correlated and all moment(s) associated with the MCI collection (e.g., if a special meaning mood source vector is determined for a special meaning event that is associated with only 2 out of the 4 moments associated with the MCI collection, then that special meaning mood source vector may be weighted by 0.5 when that special meaning mood source vector may be used to determine a valid mood of the MCI collection). Various types of special meaning events may be indicated by any suitable MCI metadata and identified by analysis of the MCI collection and its metadata as a suitable meaning mood source of meaning mood source type 520, including, but not limited to, an "activity" special meaning event mood source, a "winter sport" special meaning event mood source 523, a "beaching" special meaning event mood source, a "hiking" special meaning event mood source, a "diving" special meaning event mood source, an "entertainment" special meaning event mood source, a "performance" special meaning event mood source, a "sport event" special meaning event mood source 522, a "night out" (date night) special meaning event mood source, a "travel" special meaning event mood source, a "weekend" special meaning event mood source, a "trip" special meaning event mood source, a "celebration" special meaning event mood source, an "anniversary" special meaning event mood source 521, a "celebrated festive holiday" (e.g., a happy celebration that may be shared with family and/or friends (e.g., New Year's Eve, Halloween, a music festival, Independence Day, etc.)) special meaning event mood source, a "celebrated family holiday" (e.g., a festive holiday dedicated to family (e.g., Christmas, Thanksgiving, Mother's Day, Easter, etc.)) special meaning event mood source, a "celebrated romantic holiday" (e.g., a holiday usually celebrating love and spent with a partner (e.g., Valentine's Day)) special meaning event mood source, a "celebrated commemorative holiday" (e.g., a celebrations about remembering something or someone in a not too festive/cheerful way (e.g., Memorial Day, Veteran's Day, etc.)) special meaning event mood source, a "birthday" special meaning event mood source, a "wedding" special meaning event mood source, a "restaurant" special meaning event mood source, a "breakfast" special meaning event mood source, a "lunch" special meaning event mood source, a "dinner" special meaning event mood source, a "gathering" special meaning event mood source, and/or the like, where one, some, or each of such special meaning event mood sources may be identified through analysis of the MCI collection and represented by one or more particular source mood vectors in mood property dictionary 500. It is to be understood that certain special meaning event mood sources (e.g., "wedding") may also be identified separately as another mood source of another mood source type (e.g., of scene mood source type 530 (see, e.g., mood source 534)), where a "wedding" may be an event identified as a special meaning event but may also be identified through detection of one or more objects (e.g., in the pixel data of one or more MCIs) that may be correlated to a wedding (e.g., a cake and a white dress and a music group), although it is to also be understood that such different types of mood sources may be defined by mood property dictionary 500 to have different source mood vectors.

Scene mood source type 530 may include any suitable number of mood sources that may be indicative of any content and/or object(s) and/or sound(s) and/or the like that may be detected in the content of one or more MCIs (e.g., as media content indicator metadata 350). For example, any suitable scene metadata asset node, such as scene metadata asset node 436, may be defined to represent any suitable scene metadata indicative of any suitable scene (e.g., any discrete objects detected in the image (e.g., a dog), any actions taking place within the image, any concepts represented by the image, and/or any other features of the image) and such a node and/or such scene metadata may be analyzed, derived, inferred, defined, and/or otherwise identified as indicative of a scene mood source. Various types of scenes may be indicated by any suitable MCI metadata and identified by analysis of the MCI collection and its metadata as a suitable scene mood source of scene mood source type 530, including, but not limited to, an "animal" scene mood source, an "animal/bird/swan" scene mood source 533, an "animal/bird/raptor/eagle" scene mood source, an "animal/bird/ostrich" scene mood source, an "animal/bird/pelican" scene mood source, an "animal/bird/toucan" scene mood source, an "animal/bird/flamingo" scene mood source, an "animal/bird/penguin" scene mood source, an "animal/reptile/crocodile" scene mood source, an "animal/reptile/alligator" scene mood source, an "animal/reptile/serpent" scene mood source, an "animal/mammal/cetacean" scene mood source, an "animal/mammal/feline/cheetah" scene mood source, an "animal/mammal/feline/cougar" scene mood source, an "animal/mammal/feline/bobcat" scene mood source, an "animal/mammal/feline/tiger" scene mood source, an "animal/mammal/feline/lion" scene mood source, an "animal/mammal/feline/leopard" scene mood source, an "animal/mammal/feline/Lynx" scene mood source, an "animal/mammal/feline/cat" scene mood source, an "animal/mammal/ungulates" scene mood source, an "animal/mammal/panda" scene mood source, an "animal/mammal/elephant" scene mood source, an "animal/mammal/bear" scene mood source, an "animal/mammal/marsupial" scene mood source, an "animal/jellyfish" scene mood source, an "animal/mammal/rhinoceros" scene mood source, an "animal/mammal/canine/hyena" scene mood source, an "animal/reptile/turtle" scene mood source, an "animal/reptile/tortoise" scene mood source, an "animal/reptile/dinosaur" scene mood source, an "outdoor" scene mood source, an "outdoor/sky/aurora" scene mood source, an "outdoor/sky/rainbow" scene mood source, an "outdoor/land/shore/beach" scene mood source, an "outdoor/land/shore/lakeshore" scene mood source, an "outdoor/land/canyon" scene mood source, an "outdoor/land/cliff" scene mood source, an "outdoor/land/desert" scene mood source, an "outdoor/land/sand/sand dune" scene mood source, an "outdoor/land/sand/sandcastle" scene mood source, an "structure/sandcastle" scene mood source, an "outdoor/land/mountain" scene mood source, an "outdoor/building/windmill" scene mood source, an "structure/building/windmill" scene mood source, an "outdoor/daytime/sunbathing" scene mood source, an "outdoor/sunrise" scene mood source, an "outdoor/sunset" scene mood source, an "outdoor/night/moon" scene mood source, an "outdoor/night/starry" scene mood source, an "outdoor/park/playground" scene mood source, an "land/park/playground" scene mood source, an "outdoor/park/amusement park" scene mood source, an "outdoor/park/amusement park/rollercoaster" scene mood source, a "land/park/zoo" scene mood source, an "outdoor/park/zoo" scene mood source, an "outdoor/sky/storm/lightning" scene mood source, an "outdoor/land/volcano" scene mood source, an "outdoor/land/island" scene mood source, an "recreation/stadium" scene mood source, an "outdoor/building/arena/stadium" scene mood source, a "structure/building/arena/stadium" scene mood source, an "outdoor/building/arena" scene mood source, an "outdoor/building/tower/light house" scene mood source, a "structure/building/tower/lighthouse" scene mood source, an "outdoor/agriculture" scene mood source, a "celebration" scene mood source, a "celebration/ceremony/wedding" scene mood source 534, a "celebration/holiday/Ramadan lantern" scene mood source, a "celebration/holiday/Christmas tree" scene mood source, a "celebration/holiday/Christmas decoration" scene mood source, a "celebration/holiday/santa claus" scene mood source, a "celebration/holiday/rangoli" scene mood source, a "celebration/ceremony/graduation" scene mood source, a "celebration/holiday/oktoberfest" scene mood source, a "celebration/holiday/carnival" scene mood source, a "celebration/holiday/masquerade" scene mood source, a "food/egg/easter egg" scene mood source, a "celebration/holiday/easter egg" scene mood source, a "celebration/holiday/birthday cake" scene mood source, a "celebration/holiday/jack o lantern" scene mood source, a "celebration/holiday/Christmas present" scene mood source, a "celebration/holiday/dragon parade" scene mood source, a "celebration/holiday/thanksgiving" scene mood source, a "structure" scene mood source, a "structure/fireplace" scene mood source, a "structure/watermill" scene mood source, a "structure/monument/grave" scene mood source, a "structure/aquarium" scene mood source, a "structure/dam" scene mood source, a "vehicle" scene mood source, an "equipment/machine/vehicle/aircraft/hangglider" scene mood source, an "equipment/machine/vehicle/aircraft/helicopter" scene mood source, an "equipment/machine/vehicle/bicycle" scene mood source, an "equipment/machine/vehicle/automobile/limousine" scene mood source, an "equipment/machine/vehicle/sled" scene mood source, an "equipment/machine/vehicle/go kart" scene mood source, an "equipment/machine/vehicle/aircraft/drone machine" scene mood source, an "equipment/machine/vehicle/snowmobile" scene mood source, a "recreation" scene mood source, a "performance" scene mood source, a "recreation/performance/orchestra" scene mood source, a "recreation/performance/ballet" scene mood source, a "recreation/performance/concert" scene mood source, a "recreation/performance/juggling" scene mood source, a "recreation/performance/karaoke" scene mood source, a "recreation/performance/rodeo" scene mood source, a "recreation/performance/circus" scene mood source, a "recreation/performance/air show" scene mood source, a "recreation/performance/parade" scene mood source, a "recreation/performance/magic" scene mood source, a "recreation/performance/entertainer/acrobat" scene mood source, a "recreation/performance/entertainer/singer" scene mood source, a "recreation/performance/entertainer/deejay" scene mood source, a "people/entertainer/deejay" scene mood source, a "recreation/performance/entertainer/ballerina" scene mood source, a "people/entertainer/ballerina" scene mood source, a "recreation/performance/entertainer/clown" scene mood source, a "people/entertainer/clown" scene mood source, a "recreation/performance/dancing/swing dancing" scene mood source, a "recreation/performance/dancing/hula" scene mood source, a "recreation/performance/dancing/samba" scene mood source, a "recreation/performance/dancing/break dancing" scene mood source, a "recreation/performance/dancing/belly dance" scene mood source, a "sport" scene mood source, a "recreation/sport/water sport/rafting" scene mood source, a "recreation/sport/ water sport/water polo" scene mood source, a "recreation/ sport/water sport/surfing" scene mood source, a "recreation/ sport/water sport/body board" scene mood source, a "recreation/sport/water sport/wake boarding" scene mood source, a "recreation/sport/water sport/wind surfing" scene mood source, a "recreation/sport/water sport/jet ski" scene mood source, a "recreation/sport/water sport/scuba" scene mood source, a "recreation/sport/water sport/snorkeline" scene mood source, a "recreation/sport/water sport/swimming" scene mood source, a "recreation/sport/water sport/ parasailing" scene mood source, a "recreation/sport/basketball" scene mood source, a "recreation/sport/motor sport" scene mood source, a "recreation/sport/badminton" scene mood source, a "recreation/sport/ping pong" scene mood source, a "recreation/sport/tennis" scene mood source, a "recreation/sport/squash sport" scene mood source, a "recreation/sport/soccer" scene mood source, a "recreation/ sport/football" scene mood source, a "recreation/sport/winter sport" scene mood source, a "recreation/sport/baseball" scene mood source, a "recreation/sport/softball" scene mood source, a "recreation/sport/bowling" scene mood source, a "recreation/sport/cheerleading" scene mood source, a "recreation/sport/equestrian" scene mood source, a "recreation/ sport/jockey horse" scene mood source, a "recreation/sport/ dressage" scene mood source, a "recreation/sport/hockey" scene mood source, a "recreation/sport/rugby" scene mood source, a "recreation/sport/cycling" scene mood source, a "recreation/sport/boxing" scene mood source, a "recreation/ sport/kick boxing" scene mood source, a "recreation/sport/ martial arts" scene mood source, a "recreation/sport/wrestling" scene mood source 535, a "recreation/sport/diving" scene mood source, a "recreation/sport/fencing sport" scene mood source, a "recreation/sport/archery" scene mood source, a "recreation/sport/paintball" scene mood source, a "recreation/sport/golf" scene mood source, a "recreation/ sport/billiards" scene mood source, a "recreation/sport/gymnastics" scene mood source, a "recreation/workout" scene mood source, a "recreation/skating" scene mood source, a "recreation/skydiving" scene mood source, a "recreation/ fishing" scene mood source, a "plant" scene mood source, a "plant/tree/bonsai" scene mood source, a "plant/flower" scene mood source, a "plant/vegetation/rainforest" scene mood source, a "plant/vegetation/jungle" scene mood source, a "plant/tree/mangrove" scene mood source, a "plant/tree/palm tree" scene mood source, a "games" scene mood source, a "games/poker" scene mood source, a "games/black jack" scene mood source, a "games/roulette" scene mood source, a "games/foosball" scene mood source, a "fire" scene mood source, a "fire/pyrotechnics" scene mood source, a "liquid" scene mood source, a "liquid/water/ jacuzzi" scene mood source, a "liquid/water/waterways/ waterfall" scene mood source, a "liquid/water/waterways/ river" scene mood source, a "liquid/water/ocean" scene mood source, a "liquid/water/lake" scene mood source, a "liquid/water/frozen/snowman" scene mood source, a "liquid/water/frozen/glacier" scene mood source, a "liquid/water/geyser" scene mood source, a "liquid/water/underwater" scene mood source, an "art" scene mood source, an "art/ decoration/gargoyle" scene mood source, an "art/origami" scene mood source, an "art/decoration/balloon" scene mood source, a "light" scene mood source, a "light/chandelier" scene mood source, a "light/candle" scene mood source 532, a "light/disco ball" scene mood source, an "interior room" scene mood source, an "interior room/bar" scene mood source, an "interior room/auditorium" scene mood source, an "interior room/planetarium" scene mood source, an "interior room/theater" scene mood source, an "interior room/ museum" scene mood source, an "interior room/restaurant" scene mood source, an "interior room/casino" scene mood source, an "interior room/ballroom" scene mood source, an "interior room/library" scene mood source, an "interior room/sauna" scene mood source, an "interior room/nightclub" scene mood source, a "people/baby" scene mood source 531, a "dog" scene mood source, a "pet" scene mood source, and/or the like, where one, some, or each of such scene mood sources may be identified through analysis of the MCI collection and represented by one or more particular source mood vectors in mood property dictionary 500. It is to be understood that certain scene sources (e.g., "outdoor/ park/zoo") may also be identified separately as another mood source of another mood source type (e.g., of metadata network node mood source type 560, where a "zoo" may be a POI place node, although it is to also be understood that such different types of mood sources may be defined by mood property dictionary 500 to have different source mood vectors. In some embodiments, if a collection of MCIs being analyzed for mood is a collection of MCIs of two or more moments, then each moment may be correlated to a scene in order for the scene to be used as a mood source of scene mood source type 530. In other embodiments, if a collection of MCIs being analyzed for mood is a collection of MCIs of two or more moments, then each moment may not be correlated to a scene in order for the scene to be used as a mood source of scene mood source type 530 for the MCI collection. Instead, if a scene is not correlated with all moments associated with the MCI collection, then the effect of the source mood vector associated with the scene mood source may be prorated to the ratio of moment(s) to which it is correlated and all moment(s) associated with the MCI collection (e.g., if a scene mood source vector is determined for a scene that is associated with only 2 out of the 4 moments associated with the MCI collection, then that scene mood source vector may be weighted by 0.5 when that scene mood source vector may be used to determine a valid mood of the MCI collection).

Metadata network context mood source type 540 may include any suitable number of mood sources that may be indicative of any unique context that may be determined from the MCI collection. For example, any suitable context determination may be made based on any suitable location metadata and/or any suitable social group metadata and/or any suitable time metadata and/or any other suitable type of metadata (e.g., any suitable node of graph 107n and/or any available contextual data) associated with the MCI collection as well as based on similar data over various periods of time that may or may not be associated with the MCI collection in order to identify some context about certain metadata of the MCI collection (e.g., for a particular type of metadata identified as associated with a moment of the MCI collection (e.g., a particular social group), it may be determined as context that more than a threshold amount of time exists between that moment of the MCI collection and the last moment prior to that moment of the MCI collection that is also associated with that particular type of metadata (e.g., a particular social group has not been identified prior to the current MCI collection for more than 3 years (e.g., "a long time no see social group")). Various types of context may be indicated by any suitable MCI metadata and identified by analysis of the MCI collection and its metadata as a suitable context mood source of context mood source type 540, including, but not limited to, an "at (my) home" context mood source 541, an "at (my) work" context mood source, a "current superset" context mood source, an "other superset" context mood source, a "no superset" context mood source, a "best pair social group" context mood source, a "best social groups" context mood source, an "other social groups" context mood source, a "long time no see location" context mood source, a "long time no see people" context mood source, a "no people" context mood source 543, a "crowd (many people)" context mood source 542, and/or the like, where one, some, or each of such context mood sources may be identified through analysis of the MCI collection and represented by one or more particular context mood vectors in mood property dictionary 500. A superset may be a location that has been identified as a frequently visited location. A home will most likely be identified as a superset for certain identities, such that such a type of location may be handled specially even if no contextual data was utilized in order to determine such a context. A current superset may be a superset that is being visited frequently in the more recent past, while another superset may be a superset that was visited frequently in the more distant past but not in the recent past (e.g., a former home). No superset may be a location never visited frequently (e.g., neither a current superset nor another superset). A best pair social group may be the most frequent social group of two people (e.g., including a known user of the system (e.g., most likely a partner, spouse, etc. of the user)). A best pair social group may not exist if a user's most frequent social group has more than two people. Best social groups may be the most frequent social groups. A limit between best social groups and other social groups may be a fixed number of social groups (e.g., 5 most frequent social groups are best), but such a limit may be determined in any suitable manner, such as based on the mean or standard deviation of the frequency of social group(s). In some embodiments, if a collection of MCIs being analyzed for mood is a collection of MCIs of two or more moments, then each moment may need to be correlated to a context in order for the context to be used as a mood source of context mood source type 540. In other embodiments, if a collection of MCIs being analyzed for mood is a collection of MCIs of two or more moments, then each moment may not be correlated to a context in order for the context to be used as a mood source of context mood source type 540 for the MCI collection. Instead, if a context is not correlated with all moments associated with the MCI collection, then the effect of the source mood vector associated with the context mood source may be prorated to the ratio of moment(s) to which it is correlated and all moment(s) associated with the MCI collection (e.g., if a context mood source vector is determined for a scene that is associated with only 2 out of the 4 moments associated with the MCI collection, then that context mood source vector may be weighted by 0.5 when that context mood source vector may be used to determine a valid mood of the MCI collection).

Memory mood source type 550 may include any suitable number of mood sources that may be indicative of any collection-defining characteristic that may be determined from the MCI collection. For example, any suitable moment-defining or other suitable collection-defining characteristic determination may be made based on any suitable location metadata and/or any suitable social group metadata and/or any suitable time metadata associated with the MCI collection as well as based on any suitable similar data over various other periods of time and/or various indications of anticipated future events or moments after the time associated with the collection and/or the like. Various types of memory characteristics may be indicated by any suitable MCI metadata and identified by analysis of the MCI collection and its metadata as a suitable memory mood source of memory mood source type 550, including, but not limited to, a "day in history" memory mood source, a "holiday in history" memory mood source, a "celebrated holiday in history" memory mood source, a "last weekend" memory mood source, a "last week" memory mood source, a "week in history" memory mood source, a "contextual" memory mood source, a "year summary" memory mood source, a "best of past" memory mood source, a "break-out of routine" memory mood source, a "featured.featured trip" memory mood source, a "featured.featuredweekend" memory mood source, a "featured.featured some time" memory mood source, a "featured.featured neighbor" memory mood source, a "featured.featured people (crowd)" memory mood source, a "featured.featured social group" memory mood source 552, a "featured.featured person" memory mood source, a "featured.featured birthday" memory mood source, a "place.place location" memory mood source, a "place.place region" memory mood source, a "place.place area" memory mood source, a "place.place business" memory mood source, a "recent past event.event people" memory mood source, a "recent past event.holiday" memory mood source, a "recent past event.holiday (celebrated)" memory mood source, a "recent past event.event calendar" memory mood source, a "recent past event.featured neighbor" memory mood source, a "recent break-out of routine?" memory mood source, a "recent crowd?" memory mood source, a "recent past event.featuredtrip" memory mood source, a "recent past event.featuredweekend" memory mood source, a "recent past event.featured social group" memory mood source, a "recent past event.featured person" memory mood source, an "upcoming related event.event people" memory mood source, an "upcoming related event.event holiday" memory mood source, an "upcoming related event.event calendar" memory mood source, a "featured.featured meaningful event" memory mood source, a "featured.featuredmeaningful event aggregation" memory mood source, a "featured.featured pet" memory mood source, a "people over time.featured person" memory mood source, a "people over time.featured social group" memory mood source, an "early moment with people" memory mood source 551, a "featured.featured past superset" memory mood source, a "featured.featured recurrent trip" memory mood source, a "celebration over time (→celebrated holiday)" memory mood source, a "home aggregation" memory mood source, a "featured.featured people visiting" memory mood source, a "throwback thursday" memory mood source, a "this season" memory mood source 553, a "season in history" memory mood source, a "key people for upcoming holiday event.featured social group" memory mood source, a "key people for upcoming holiday event.featured person" memory mood source, and/or the like, where one, some, or each of such memory mood sources may be identified through analysis of the MCI collection and represented by one or more particular memory mood vectors in mood property dictionary 500. A memory may be a specific type of MCI collection that may include exactly one category and one subcategory property. The category and subcategory of a memory may determine what, why, and how MCIs are aggregated together in the memory MCI collection. When a mood inference happens on a Memory, the category and subcategory may already be defined and the Memory category/subcategory pair may be used as the memory mood source, such that there may be at most one memory mood source and therefore one memory mood vector for a single memory MCI collection. In some embodiments, if a collection of MCIs being analyzed for mood is a collection of MCIs of two or more moments, then each moment may need to be correlated to a memory in order for the memory to be used as a mood source of memory mood source type 550. In other embodiments, if a collection of MCIs being analyzed for mood is a collection of MCIs of two or more moments, then each moment may not be correlated to a memory in order for the memory to be used as a mood source of memory mood source type 550 for the MCI collection. Instead, if a memory is not correlated with all moments associated with the MCI collection, then the effect of the source mood vector associated with the memory mood source may be prorated to the ratio of moment(s) to which it is correlated and all moment(s) associated with the MCI collection (e.g., if a memory mood source vector is determined for a scene that is associated with only 2 out of the 4 moments associated with the MCI collection, then that memory mood source vector may be weighted by 0.5 when that memory mood source vector may be used to determine a valid mood of the MCI collection).

Metadata network node mood source type 560 may include any suitable number of mood sources that may be indicative of any non-moment node or associated metadata that may be determined from the MCI collection. For example, any suitable non-moment determination may be made based on any suitable non-moment node metadata that may be associated with the MCI collection. Various types of node characteristics may be indicated by any suitable MCI metadata and identified by analysis of the MCI collection and its metadata as a suitable node mood source of node mood source type 560, including, but not limited to, a "social group" node mood source, an "other people" node mood source, a "home" node mood source, a "work" node mood source, an "area" node mood source, a "weekend" node mood source, a "season.winter" node mood source, a "season.spring" node mood source, a "season summer" node mood source, a "season.autumn" node mood source, a "partofday.morning" node mood source, a "partofday.noon" node mood source, a "partofday.afternoon" node mood source, a "partofday.evening" node mood source, a "partofday.night" node mood source, a "holiday.any" node mood source, a "ROI.urban" node mood source, a "ROI.mountain" node mood source, a "ROI.nature" node mood source, a "ROI.water" node mood source 563, a "ROI.beach" node mood source, a "POI.park" node mood source, a "POI.entertainment" node mood source, a "POI.restaurant" node mood source 561, a "POI.nightlife" node mood source, a "POI.shopping" node mood source, a "POI.travel" node mood source 562, a "POI.culture" node mood source, and/or the like, where one, some, or each of such node mood sources may be identified through analysis of the MCI collection and represented by one or more particular node mood vectors in mood property dictionary 500. In some embodiments, if a collection of MCIs being analyzed for mood is a collection of MCIs of two or more moments, then each moment may need to be correlated to a node in order for the memory to be used as a mood source of node mood source type 560. In other embodiments, if a collection of MCIs being analyzed for mood is a collection of MCIs of two or more moments, then each moment may not be correlated to a node in order for the memory to be used as a node source of memory mood source type 560 for the MCI collection. Instead, if a node is not correlated with all moments associated with the MCI collection, then the effect of the source mood vector associated with the node mood source may be prorated to the ratio of moment(s) to which it is correlated and all moment(s) associated with the MCI collection (e.g., if a node mood source vector is determined for a scene that is associated with only 2 out of the 4 moments associated with the MCI collection, then that node mood source vector may be weighted by 0.5 when that node mood source vector may be used to determine a valid mood of the MCI collection).

Video mood source type 570 may include any suitable number of mood sources that may be indicative of any suitable characteristics of a video MCI or associated metadata that may be determined from the MCI collection. For example, any suitable video MCI characteristic determination may be made based on any suitable media attribute score data 345 that may be associated with the MCI collection. Various types of video characteristics may be indicated by any suitable MCI metadata and identified by analysis of the MCI collection and its metadata as a suitable video mood source of video mood source type 570, including, but not limited to, a "slow tempo" video mood source 573, a "medium tempo" video mood source, a "fast tempo" video mood source 572, an "extreme tempo" video mood source 571, and/or the like, where one, some, or each of such video mood sources may be identified through analysis of the MCI collection and represented by one or more particular video mood vectors in mood property dictionary 500.

Asset mood source type 580 may include any suitable number of mood sources that may be indicative of any suitable characteristics of facial expression indicators that may be determined from the MCI collection. For example, any suitable face expression indicator characteristic determination may be made based on any suitable media content indicator metadata 350 that may be associated with the MCI collection. Various types of face expression indicator characteristics may be indicated by any suitable MCI metadata and identified by analysis of the MCI collection and its metadata as a suitable asset mood source of asset mood source type 580, including, but not limited to, a "many smiles" asset mood source 581, a "no smiles" asset mood source 582, a "some smiles" asset mood source 583, and/or the like, where one, some, or each of such asset mood sources may be identified through analysis of the MCI collection and represented by one or more particular asset mood vectors in mood property dictionary 500. In some embodiments, for example, a "no smiles" asset mood source may be identified when at least 3 MCIs with people are detected in the MCI collection and less than 10% of the MCIs have at least one smile. In some embodiments, for example, a "some smiles" asset mood source may be identified when at least 3 MCIs with people are detected in the MCI collection and at least 30% of the MCIs with people includes a smile and the smile count is less than 50% of the people count. In some embodiments, for example, a "many smiles" asset mood source may be identified when at least 3 MCIs with people are detected in the MCI collection and at least 30% of the MCIs with people includes a smile and the smile count is more than 50% of the people count.

While various mood sources have been described in the context of one of many different mood source types, it is to be understood that, in other embodiments, one, some, or each mood source (e.g., as may be identified based on analysis of an MCI collection and/or as may be identified in mood property dictionary 500) may not be defined as a mood source of any particular mood source type or necessarily associated with respect to any mood source type.

Figure 6:
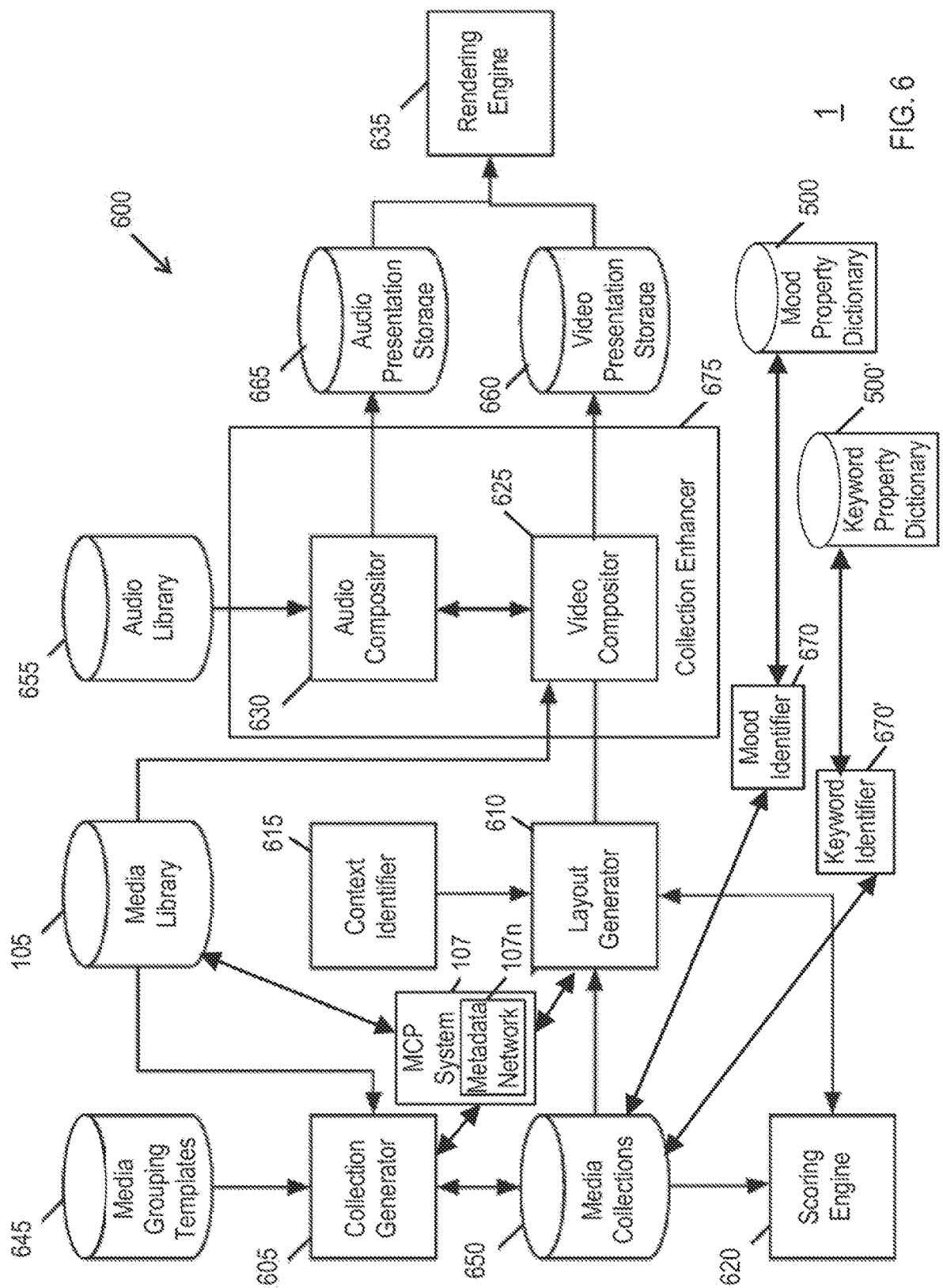
FIG. 6 is a schematic view of an illustrative portion of the system of FIGS. 1-5.

FIG. 7 is a flowchart of an illustrative process 700 for operating system 1 (e.g., a process that may be performed by media management system 600 of FIG. 6) for determining at least one valid mood for a collection of MCIs of a media library (e.g., for associating the valid mood(s) with the MCI collection for enhancing a presentation of the MCI collection). Process 700 may determine any valid mood(s) for any suitable collection of MCIs of any suitable media library (e.g., all MCIs 310 of library 105 or any suitable subset of MCIs 310 of library 105), where the collection may be defined in any suitable manner (e.g., automatically based on analysis of metadata associated with the MCIs of library 105 (e.g., based on one or more moment nodes and/or any other suitable information of metadata network 107*n* or otherwise), in response to a user selection of one or more MCIs for use in defining the collection, and/or the like). Process 700 may use any suitable metadata associated with the media library in conjunction with a mood property dictionary of any suitable data type (e.g., mood property list or dictionary data structure 500) that may be defined and/or made available to system 1 in any suitable manner in order to infer one or more valid moods for the MCI collection. Process 700 may include (i) identifying a collection of MCIs of a media library (e.g., an MCI collection that may have been defined in any suitable manner) and then (ii) identifying at least one valid mood from a number of potential moods for use with the MCI collection by analyzing the MCI collection and metadata associated with the media library and then identifying, based on the analyzing, any suitable number of mood sources that may be associated with the MCIs of the MCI collection and then determining a source mood vector for each identified mood source using any suitable mood property dictionary, where each source mood vector may include a number of source mood vector values, where each source mood vector value of a source mood vector may be associated with a respective mood of the number of potential moods, and then (iii) determining, for each mood of the number of potential moods, if the mood is a valid mood by determining if a combination of the source mood vector value associated with the mood from each determined source mood vector meets a validity threshold. Any mood(s) determined to be a valid mood, or a single valid mood that may be chosen from any determined valid moods, may then be used in any suitable manner with respect to the MCI collection. Therefore, media metadata (e.g., any data of or associated with a knowledge graph metadata network of a media library (e.g., metadata network 107*n*)) may be used to infer computationally and automatically from any suitable statistical distribution and rules, using any suitable processing techniques, with some level of confidence, one or more valid moods that may be associated with a collection of MCIs (e.g., in order to select the best music to accompany a composite presentation that may be generated from the MCI collection). A majority or the entirety of process 700 may be carried out without any user interaction (e.g., transparent to a user of system 1), which, for example, may reduce the cognitive burden on a user and/or avoid any tedious classification of media by a user, thereby creating a more efficient human-machine interface.

At operation 702 of process 700, one or more processors of the system may identify a collection of any suitable number of MCIs of a media library and metadata associated with the library. For example, one or more MCIs 310 of library 105 associated with one another as any suitable collection (e.g., a photo album, etc.) may be identified along with any or all metadata and/or contextual data that may be associated with library 105 (e.g., any or all metadata 311 of album 105 and/or network 107*n* and/or the like). The MCI collection and/or any or all such metadata may be defined prior to process 700 and may be obtained by a system (e.g., system 1) for executing process 700 in any suitable manner. Next, after an MCI collection and any metadata has been identified at operation 702, process 700 may identify (e.g., at operations 704-716) at least one valid mood of a number of potential moods for use with the identified MCI collection in any suitable manner. Although process 700 may be described with respect to identifying at least one valid mood for a collection of MCIs, it is to be understood that process 700 may, alternatively, be executed for identifying at least one valid mood for a single MCI.

At operation 704 of process 700, one or more processors of the system may analyze or process the identified MCIs and the identified metadata to identify any suitable number of mood sources that may be associated with one or more of the MCIs. For example, any suitable mood sources may be identified from analysis of an MCI collection and associated metadata (e.g., via analysis of metadata network 107*n* and/or any other suitable data (e.g., additional contextual data) that may be associated with library 105), including, but not limited to, each of mood sources 521-523, 531-535, 541-543, 551-553, 561-563, 571-573, and 581-583 and/or any of the other mood sources described with respect to mood property dictionary 500 and/or the like. As just one particular example, which may be referenced throughout an explanation of process 700, the following 6 mood sources may be identified at operation 704: (i) "baby" scene mood source 531, (ii) "candle" scene mood source 532, (iii) "swan" scene mood source 533, (iv) "wedding" scene mood source 534, (v) "restaurant" (e.g., POI) node mood source 561, and (vi) "water" (e.g., ROI) node mood source 563 (e.g., sources that might normally be identified in an MCI collection for a wedding event). In some embodiments, each particular mood source identified within the MCI collection may be only be counted once. Alternatively, for example, if a particular mood source was detected at 3 distinct instances (e.g., a "swan" scene mood source 533 was identified in 3 different image MCIs of the MCI collection), then "swan" scene mood source 533 may be counted 3 different times in the list of mood sources identified at operation 704. Additionally or alternatively, if the MCI collection includes MCIs from two moments, then a mood source may be counted at least twice (or weighted at least double) if it is detected at least once in each of the moments (e.g., a particular mood source may be counted as many times as moments it is associated with in an MCI collection). Different identified mood sources may be given different relative weights and/or may be handled in any other suitable manner with respect to their different effects on and/or importance with respect to and/or prevalence within an overall MCI collection when the different identified mood sources may be used with respect to one or more of operations 706-716 of process 700.

At operation 706 of process 700, one or more processors of the system may obtain, for each mood source of the identified mood sources, a source mood vector that may include a number of source mood vector elements, wherein each source mood vector element of the number of source mood vector elements may be associated with a respective mood of the number of potential moods, and wherein each source mood vector element of the number of source mood vector elements may include a source mood vector value. For example, continuing with the example of the 6 mood sources 531, 532, 533, 534, 561, and 563 being identified at operation 704, a particular source mood vector ("SMV") 597 may be obtained at operation 706 for each one of those 6 mood sources (e.g., from dictionary 500 of FIG. 5) as follows:

(A) source mood vector 597 for "baby" scene mood source 531=

[0, +1, 0, 0, 0, +1, +1, −1, −1, −1];

(B) source mood vector 597 for "candle" scene mood source 532=
[0, +1, +1, +1, 0, 0, +1, 0, 0, 0];
(C) source mood vector 597 for "swan" scene mood source 533=
[+1, +1, +1, +1, 0, 0, +1, 0, 0, 0];
(D) source mood vector 597 for "wedding" scene mood source 534=
[0, +1, 0, 0, 0, 0, +1, −1, 0, −1];
(E) source mood vector 597 for "restaurant" node mood source 561=
[0, 0, +1, +1, 0, +1, 0, 0, 0, 0]; and
(F) source mood vector 597 for "water" node mood source 563=
[+1, 0, +1, +1, 0, 0, +1, +1, 0, 0],
where each one of these 6 source mood vectors 597 (i.e., SMVs (A)-(F)) may include 10 source mood vector elements 599, where each one of the 10 source mood vector elements 599 may be associated with a respective one of 10 potential moods 501-510 of dictionary 500, and where each source mood vector element 599 may include a source mood vector value 598 (e.g., −1 (e.g., negative or not recommended or forbidden), 0 (e.g., neutral), or +1 (e.g., positive or recommended)).

In some embodiments, as shown in FIG. 5, each mood source identified at operation 704 may be of a mood source type of a number of mood source types (e.g., one of 7 mood source types 520, 530, 540, 550, 560, 570, and 580 of dictionary 500). For example, each one of "baby" scene mood source 531, "candle" scene mood source 532, "swan" scene mood source 533, and "wedding" scene mood source 534 may be of scene mood source type 530, while each one of "restaurant" (e.g., POI) node mood source 561 and "water" (e.g., ROI) node mood source 563 may be of node mood source type 560. Therefore, in some embodiments, a mood source type may be identified (e.g., at operation 704 or 706) for each mood source identified at operation 704. Additionally or alternatively, in some embodiments, each mood source identified at operation 704 may be associated with a mood source weight and/or each mood source type of each mood source identified at operation 704 may be associated with a mood source type weight. For example, as shown in FIG. 5, meaning mood source type 520 may be associated with a meaning mood source type weight of 2.0, scene mood source type 530 may be associated with a scene mood source type weight of 1.5, context mood source type 540 may be associated with a context mood source type weight of 1.0, memory mood source type 550 may be associated with a memory mood source type weight of 1.0, node mood source type 560 may be associated with a node mood source type weight of 0.5, video mood source type 570 may be associated with a video mood source type weight of 0.5, and asset mood source type 580 may be associated with an asset mood source type weight of 0.5. However, it is to be understood that these weight values are just exemplary and that each mood source type and/or each mood source may be associated with its own weight of any suitable value and/or any suitable relative value with respect to the weight value of any other mood source type and/or of any other mood source. Relatively larger weights may be associated with mood source types and/or mood sources that may be considered more likely to be emotive (e.g., indicative of an emotion or mood) than mood source types and/or mood sources that may be associated with relatively smaller weights. Therefore, in some embodiments, a weight for each mood source identified at operation 704 and/or a weight for each mood source type of each mood source identified at operation 704 may be identified (e.g., at operation 704 or 706). Weights for different mood source types (and/or for different mood sources) may be determined based on the level of emotion that may be confidently deduced from the mood sources of the particular mood source type (or from the particular mood source) and/or based on the reliability of the information associated with the particular mood source type (or associated with the particular mood source). For example, meaning mood sources may be determined to be very reliable sources of information and to give good information on what emotion/mood can be associated with those sources, while, on the other hand, the number of smiles (e.g., of an asset mood source) may be less reliable because all smiles may not be easily detectable and/or may give less information on the emotion as people may tend to smile in photographs no matter their emotion. In the end, the exact weights may be tuned based on experimentations and/or feedback from internal users.

For each mood source type of each mood source identified at operation 704, process 700 may be operative to have one or more source type mood vectors (or any other suitable statistical representation) determined, where a source type mood vector may be determined for a particular mood source type based on each source mood vector of that mood source type obtained at operation 706. For example, at operation 708 of process 700, one or more processors of the system may determine, for each mood source type of each mood source identified at operation 704, based on the source mood vector obtained for each mood source of the mood source type, a source type positive mood vector that may include a number of source type positive mood vector elements, wherein each source type positive mood vector element of the number of source type positive mood vector elements may be associated with a respective mood of the number of potential moods, and wherein each source type positive mood vector element of the number of source type positive mood vector elements may include a source type positive mood vector value. For example, continuing with the example of the 6 mood sources 531, 532, 533, 534, 561, and 563 being identified at operation 704, and the 6 SMVs (A)-(F) being obtained for those 6 mood sources at operation 706, a particular source type positive mood vector ("STPMV") may be determined at operation 708 for each mood source type of the 2 mood source types associated with those 6 mood sources (i.e., scene mood source type 530 and node mood source type 560) in any suitable manner based on the particular one(s) of identified SMVs (A)-(F) that may be associated with the particular mood source type. For example, an STPMV for a particular mood source type may be determined by combining together (e.g., adding, summing, etc.), for each potential mood of the number of potential moods, any positive or recommended source mood vector value 598 (e.g., a value 598 of +1) of each source mood vector element 599 associated with the particular potential mood of each source mood vector 597 obtained for the identified mood sources of the particular mood source type, and then each combination may be divided by the value of the highest combination (or by the number of SMVs being used to define the STPMV), as follows:

(G) source type positive mood vector for scene mood source type 530=
(sums of all positive source mood vector values of SMVs (A)-(D):
[+1, +4, +2, +2, 0, +1, +4, 0, 0, 0],
divided by value of highest element of result: 4)=
[+¼, +1, +½, +½, 0, +¼, +1, 0, 0, 0]; and (H) source type positive mood vector for node mood source type 560=

(sums of all positive source mood vector values of SMVs (E) and (F):

[+1, 0, +2, +2, 0, +1, +1, +1, 0, 0], divided by value of highest element of result: 2)=

[+½, 0, +1, +1, 0, +½, +½, +½, 0, 0], where each one of these 2 source type positive mood vectors (i.e., STPMVs (G) and (H)) may include 10 source type positive mood vector elements, where each one of the 10 source type positive mood vector elements may be associated with a respective one of 10 potential moods 501-510 of dictionary 500, and where each source type positive mood vector element may include a source type positive mood vector value (e.g., a value between 0 and +1). In some embodiments, certain SMVs (e.g., of certain mood source types (e.g., node, meaning, and scene mood source types)) may be prorated based on the percentage of moments with which they are associated of the total number of moments associated with the MCI collection. For example, if a first scene mood source (e.g., wedding) is associated with each one of a first moment and a second moment of the MCI collection and a second scene mood source (e.g., swan) is only associated with the first moment but not the second moment of the MCI collection, then a first moment STPMV for scene mood source type 530 may be determined as described above with respect to (G) for the first moment and a second moment STPMV for scene mood source type 530 may be determined as described above with respect to (G) for the second moment (e.g., which would be the same as the SI' for the wedding scene mood source if the wedding scene mood source were the only scene mood source associated with that second moment), and then the two moment STPMVs may be summed and divided by the number of STPMVs (i.e., 2) to arrive at the STPMV for scene mood source type 530.

At operation 710 of process 700, one or more processors of the system may determine, for each mood source type of each mood source identified at operation 704, based on the source mood vector obtained for each mood source of the mood source type, a source type negative mood vector (or any other suitable statistical representation) that may include a number of source type negative mood vector elements, wherein each source type negative mood vector element of the number of source type negative mood vector elements may be associated with a respective mood of the number of potential moods, and wherein each source type negative mood vector element of the number of source type negative mood vector elements may include a source type negative mood vector value. For example, continuing with the example of the 6 mood sources 531, 532, 533, 534, 561, and 563 being identified at operation 704, and the 6 SMVs (A)-(F) being obtained for those 6 mood sources at operation 706, a particular source type negative mood vector ("STNMV") may be determined at operation 710 for each mood source type of the 2 mood source types associated with those 6 mood sources (i.e., scene mood source type 530 and node mood source type 560) in any suitable manner based on the particular one(s) of identified SMVs (A)-(F) that may be associated with the particular mood source type. For example, an STNMV may be determined in a similar manner to how an STPMV may be determined as described above, but with any negative or non-recommended or forbidden source mood vector values 598 (e.g., where an STNMV for a particular mood source type may be determined by combining together (e.g., adding, summing, etc.), for each potential mood of the number of potential moods, any negative or non-recommended or forbidden source mood vector value 598 (e.g., a value 598 of −1) of each source mood vector element 599 associated with the particular potential mood of each source mood vector 597 obtained for the identified mood sources of the particular mood source type, and then each combination may be divided by the value of the lowest combination (or by the number of SMVs being used to define the STNMV)). Alternatively, as another example, an STNMV for a particular mood source type may be determined by combining together (e.g., OR'ing, determining the inclusive disjunction of, etc.), for each potential mood of the number of potential moods, any negative or not-recommended or forbidden source mood vector value 598 (e.g., a value 598 of −1) of each source mood vector element 599 associated with the particular potential mood of each source mood vector 597 obtained for the identified mood sources of the particular mood source type, as follows:

(I) source type negative mood vector for scene mood source type 530=

[0, 0, 0, 0, 0, 0, 0, −1, −1, −1]; and (J) source type negative mood vector for node mood source type 560=

[0, 0, 0, 0, 0, 0, 0, 0, 0, 0], where each one of these 2 source type negative mood vectors (i.e., STNMVs (I) and (J)) may include 10 source type negative mood vector elements, where each one of the 10 source type negative mood vector elements may be associated with a respective one of 10 potential moods 501-510 of dictionary 500, and where each source type negative mood vector element may include a source type negative mood vector value (e.g., a value of 0 (e.g., neutral) or −1 (e.g., negative or not recommended or forbidden)).

For each source type mood vector determined at operation 708 and/or at operation 710, process 700 may be operative to have one or more group mood vectors (or any other suitable statistical representation) determined, where a single group mood vector may be determined for all source type mood vectors of a particular kind. For example, at operation 712 of process 700, one or more processors of the system may determine, based on each source type positive mood vector determined at operation 708, a group positive mood vector (or any other suitable statistical representation) that may include a number of group positive mood vector elements, wherein each group positive mood vector element of the number of group positive mood vector elements may be associated with a respective mood of the number of potential moods, and wherein each group positive mood vector element of the number of group positive mood vector elements may include a group positive mood vector value. For example, continuing with the example of the 6 mood sources 531, 532, 533, 534, 561, and 563 being identified at operation 704, and the 6 SMVs (A)-(F) being obtained for those 6 mood sources at operation 706, and the 2 STPMVs (G) and (H) being determined for the 2 mood source types of those 6 mood sources at operation 708, a group positive mood vector ("GPMV") may be determined at operation 712 in any suitable manner based on the 2 STPMVs (G) and (H). For example, a GPMV may be determined by combining together (e.g., adding, summing, etc.), for each potential mood of the number of potential moods, each source type positive mood vector value (e.g., a value between 0 and +1) of each source type positive mood vector element associated with the particular potential mood of each source type positive mood vector of each mood source type (e.g., STPMV (G) of scene mood source type 530 and STPMV (H) of node mood source type 560), which may or may not be weighted based on (e.g., multiplied by) the mood source type weight of each mood source type, and then each combination may or may not be divided by the sum of the mood source type weights (e.g., either the sum of all mood source type weights of library 500 (i.e., 7.0 (i.e., 2.0+1.5+ 1.0+1.0+0.5+0.5±0.5)) or the sum of only the mood source type weight(s) of the mood source type(s) used to determine the STPMV(s) at operation 708 (i.e., 2.0 (i.e., 1.5+0.5)), as follows:

(K) group positive mood vector for STPMVs (G) and (H) with normalized weights=
[(scene mood source type 530's STPMV (G)*scene source type weight 1.5:
[+3/8, +3/2, +3/4, +3/4, 0, +3/8, +3/2, 0, 0, 0]),
summed with
(node mood source type 560's STPMV (H)*node source type weight 0.5:
[+1/4, 0, +1/2, +1/2, 0, +1/4, +1/4, +1/4, 0, 0])],
divided by (sum of the source type weights: 2.0)=
[+5/16, +3/4, +5/8, +5/8, 0, —5/16, —7/8, +1/8, 0, 0],
where this group positive mood vector (i.e., GPMV (K)) may include 10 group positive mood vector elements, where each one of the 10 group positive mood vector elements may be associated with a respective one of 10 potential moods 501-510 of dictionary 500, and where each group positive mood vector element may include a group positive mood vector value (e.g., a value between 0 and +1). Alternatively, each STPMV may not be weighted by its source type's weight before being summed with each other when determining a GPMV at operation 712. Additionally or alternatively, the sum or weighted sum of the STPMVs may be divided by the sum of all available source type weights (e.g., 7.0 sum of all weights of all potential source types, or possibly less if one or more source types are determined to not be possible for a given MCI collection) rather than the sum of the weights of only the identified source types when determining a GPMV at operation 712. Additionally or alternatively, the sum or weighted sum of the STPMVs may not be divided by the sum of the source type weights (e.g., the weighted sum of the STPMVs may not be normalized by dividing by the sum of the weights) when determining a GPMV at operation 712.

At operation 714 of process 700, one or more processors of the system may determine, based on each source type negative mood vector determined at operation 710, a group negative mood vector (or any other suitable statistical representation) that may include a number of group negative mood vector elements, wherein each group negative mood vector element of the number of group negative mood vector elements may be associated with a respective mood of the number of potential moods, and wherein each group negative mood vector element of the number of group negative mood vector elements may include a group negative mood vector value. For example, continuing with the example of the 6 mood sources 531, 532, 533, 534, 561, and 563 being identified at operation 704, and the 6 SMVs (A)-(F) being obtained for those 6 mood sources at operation 706, and the 2 STNMVs (I) and (J) being determined for the 2 mood source types of those 6 mood sources at operation 710, a group negative mood vector ("GNMV") may be determined at operation 714 in any suitable manner based on the 2 STNMVs (I) and (J). For example, a GNMV may be determined by combining together (e.g., adding, summing, etc.), for each potential mood of the number of potential moods, each source type negative mood vector value (e.g., a value of 0 or −1) of each source type negative mood vector element associated with the particular potential mood of each source type negative mood vector of each mood source type (e.g., STNMV (I) of scene mood source type 530 and STNMV (J) of node mood source type 560), which may or may not be weighted based on (e.g., multiplied by) the mood source type weight of each mood source type, and then each combination may or may not be divided by the sum of the mood source type weights (e.g., either the sum of all mood source type weights of library 500 (i.e., 7.0 (i.e., 2.0+1.5+ 1.0+1.0+0.5+0.5+0.5)) or the sum of only the mood source type weight(s) of the mood source type(s) used to determine the STNMV(s) at operation 710 (i.e., 2.0 (i.e., 1.5+0.5)), as follows:

(L) group negative mood vector for STNMVs (I) and (J) with normalized weights=
[(scene mood source type 530's STNMV (I)*scene source type weight 1.5:
[0, 0, 0, 0, 0, 0, 0, −3/2, −3/2, −3/2]),
summed with
(node mood source type 560's STNMV (J)*node source type weight 0.5:
[0, 0, 0, 0, 0, 0, 0, 0, 0, 0])],
divided by (sum of the source type weights: 2.0)=
[0, 0, 0, 0, 0, 0, 0, −3/4, −3/4, −3/4],
where this group negative mood vector (i.e., GNMV (L)) may include 10 group negative mood vector elements, where each one of the 10 group negative mood vector elements may be associated with a respective one of 10 potential moods 501-510 of dictionary 500, and where each group negative mood vector element may include a group negative mood vector value (e.g., a value between 0 and −1). Alternatively, each STNMV may not be weighted by its source type's weight before being summed with each other when determining a GNMV at operation 714. Additionally or alternatively, the sum or weighted sum of the STNMVs may be divided by the sum of all available source type weights (e.g., 7.0 sum of all weights of all potential source types, or possibly less if one or more source types are determined to not be possible for a given MCI collection) rather than the sum of the weights of only the identified source types when determining a GNMV at operation 714. Additionally or alternatively, the sum or weighted sum of the STNMVs may not be divided by the sum of the source type weights (e.g., the weighted sum of the STNMVs may not be normalized by dividing by the sum of the weights) when determining a GNMV at operation 714.

For each group mood vector determined at operation 712 and/or at operation 714, process 700 may be operative to have the group mood vector value of each group mood vector element of the determined group mood vector compared with any suitable group mood vector threshold to determine whether or not the potential mood associated with the group mood vector element of the comparison is a valid mood for association with the MCI collection identified at operation 702. For example, at operation 716 of process 700, one or more processors of the system may determine, for each mood of the number of potential moods, that the mood is a valid mood when each one of the following is true: (i) the group positive mood vector value of the group positive mood vector element of the group positive mood vector associated with the mood satisfies a group positive mood vector threshold condition, and (ii) the group negative mood vector value of the group negative mood vector element of the group negative mood vector associated with the mood satisfies a group negative mood vector threshold condition. For example, continuing with the example of the 6 mood sources 531, 532, 533, 534, 561, and 563 being identified at operation 704, and the 6 SMVs (A)-(F) being obtained for those 6 mood sources at operation 706, and GPMV (K) being determined at operation 712, and GNMV (L) being determined at operation 714, each potential mood element value of GPMV (K) may be compared with a group positive mood vector threshold to determine at operation 716 if the potential mood element value satisfies a group positive mood vector threshold condition, and/or each potential mood element value of GNMV (L) may be compared with a group negative mood vector threshold to determine at operation 716 if the potential mood element value satisfies a group negative mood vector threshold condition, and a particular potential mood may be determined at operation 716 to be a valid mood when both its associated GPMV potential mood element value satisfies a group positive mood vector threshold condition and its associated GNMV potential mood element value satisfies a group negative mood vector threshold condition.

In some embodiments, the group positive mood vector threshold may be the same for all potential moods (e.g., +½ or any other suitable value, which may be dependent on any suitable characteristics or goals of process 700, such as dependent on whether or not any weights are used and, if so, in what manner, with respect to one or more earlier operations of process 700) and/or the group positive mood vector threshold condition may be the same for all potential moods (e.g., the GPMV value for the potential mood must be greater than or equal to the group positive mood vector threshold). Alternatively, the group positive mood vector threshold may be different for different potential moods. Similarly, in some embodiments, the group negative mood vector threshold may be the same for all potential moods (e.g., 0 or any other suitable value, which may be dependent on any suitable characteristics or goals of process 700, such as dependent on whether or not any weights are used and, if so, in what manner, with respect to one or more earlier operations of process 700) and/or the group negative mood vector threshold condition may be the same for all potential moods (e.g., the GNMV value for the potential mood must be equal to the group negative mood vector threshold). Alternatively, the group negative mood vector threshold may be different for different potential moods. Any suitable threshold value(s) and/or any suitable weight value(s) may be learned (e.g., based in various use cases over time) in order to generalize a best value.

With specific reference to GPMV (K) and GNMV (L), the respective GPMV and GNMV values may be +5/16 and 0 for first (e.g., "dreamy") mood 501, +¾ and 0 for second (e.g., "sentimental") mood 502, +⅝ and 0 for third (e.g., "gentle") mood 503, +⅝ and 0 for fourth (e.g., "chill") mood 504, 0 and 0 for fifth (e.g., "neutral") mood 505, +5/16 and 0 for sixth (e.g., "happy") mood 506, +⅞ and 0 for seventh (e.g., "uplifting") mood 507, +⅛ and −¾ for eighth (e.g., "epic") mood 508, 0 and −¾ for ninth (e.g., "club") mood 509, and 0 and −¾ for tenth (e.g., "extreme") mood 510. Therefore, as just one particular example, when the group positive mood vector threshold condition is satisfied for each potential mood when its group positive mood vector threshold value is greater than or equal to a group positive mood vector threshold value of +½ and when the group negative mood vector threshold condition is satisfied for each potential mood when its group negative mood vector threshold value is greater than or equal to a group negative mood vector threshold value of 0, then operation 716 may be operative to determine that the GPMV and GNMV values of each one of second (e.g., "sentimental") mood 502, third (e.g., "gentle") mood 503, fourth (e.g., "chill") mood 504, and seventh (e.g., "uplifting") mood 507 may satisfy the group mood vector threshold conditions, such that operation 716 may be operative to determine that each one of potential second (e.g., "sentimental") mood 502, third (e.g., "gentle") mood 503, fourth (e.g., "chill") mood 504, and seventh (e.g., "uplifting") mood 507 may be a valid mood for the MCI collection identified at operation 502 (e.g., moods that might normally be appropriate to associate with an MCI collection for a wedding event).

If more than one valid mood is determined at operation 716, then process 700 may also include one or more further operations that may be operative to select a particular one (or a particular subset) of the determined valid moods for use with the identified MCI collection and/or to prioritize or otherwise order two or more of the determined valid moods for use with the identified MCI collection. As one particular example, one valid mood may be randomly selected from a group of multiple identified valid moods. In some embodiments, each valid mood of a group of multiple identified valid moods may be weighted before one of the weighted valid moods may be randomly selected. For example, each valid mood may be weighted based on how easily it satisfied one or more of the group mood vector threshold conditions of operation 716. As one particular example, the GNMV value may be subtracted from the GPMV value for each identified valid mood to provide a weight for the valid mood (e.g., continuing with the recent example where moods 502, 503, 504, and 507 were identified as valid, second mood 502 may be weighted with a weight value of +¾ (e.g., +¾-0), third mood 503 may be weighted with a weight value of +⅝ (e.g., +⅝-0), fourth mood 504 may be weighted with a weight value of +⅝ (e.g., +⅝-0), and seventh mood 507 may be weighted with a weight value of +⅞ (e.g., +⅞-0), prior to one of those weighted valid moods being randomly selected for use with the MCI collection). Alternatively, two or more of the largest weighted valid moods may be selected for use with the MCI collection. Additionally or alternatively, one or more of the identified valid moods may be weighted based on a history of moods previously selected for use with MCI collections (e.g., in earlier iterations of process 700 for automatic mood selection for other MCI collections and/or based on user selected moods for other MCI collections in the past (e.g., using any suitable user interface that may be provided by system 1), where past valid mood selections (either automatic or user-based) may be stored and retrieved as informative of the type of moods usually offered to and/or preferred by the user). For example, in order to promote variety, an identified valid mood that has only been selected for use with an MCI collection less than 10 times in the last year may be weighted more than an identified valid mood that has been selected for use with an MCI collection more than 10 times in the last year. The one or more valid moods as selected may be used in any suitable manner with the MCI collection, such as for enhancing a presentation of at least a portion of the MCI collection.

It is understood that the operations shown in process 700 of FIG. 7 are only illustrative and that existing operations may be modified or omitted, additional operations may be added, and the order of certain operations may be altered. For example, in some embodiments, some operations may be omitted or combined with other operations (e.g., operations 708 and 710 may be omitted and operations 712 and 714 may be carried out using the SMVs obtained at operation 706 (e.g., as may or may not be weighted using any suitable mood source weights) rather than using any determined STPMVs of operation 708 and/or any determined STNMVs of operation 710). While in some embodiments, as described with respect to some examples above, a negative value of an SMV element may be operative to facilitate forbidding the mood associated with that element from being identified as a valid mood, however, in other embodiments, negative values of SMV elements may be handled similarly to positive values in that a single instance of a negative value in an SMV may not be enough to invalidate a mood (e.g., just as a positive value in an SMV may not be enough to validate a mood (e.g., even if no negative values exist for that mood in other SMVs (see, e.g., mood 501 in the above example))). Moreover, as mentioned, while process 700 may be described with respect to identifying one or more valid moods for a collection of a plurality of MCIs, it is to be understood that process 700 may be similarly operative to identify one or more valid moods for a single MCI. Therefore, for any MCI or any defined collection of MCIs, the MCI(s) and any associated metadata may be processed to identify one or more mood sources. For each identified mood source a positive source mood vector and a negative source mood vector may be extracted (e.g., using any suitable dictionary of mood data) that may be indicative of a source mood vector value for each one of a number of potential moods. All positive source mood vectors may be combined into a single group positive mood vector and all negative source mood vectors may be combined into a single group negative mood vector, where any of the source mood vectors may be weighted in any suitable manner (e.g., due to the prevalence of the source mood vector's identified source mood within the MCI(s)) when being combined to into one or both of the group mood vectors. Then, one or more of the potential moods may be identified as a valid mood based on determining that such a potential mood's value in the single group positive mood vector satisfies a recommended mood threshold condition and/or that such a potential mood's value in the single group negative mood vector satisfies a forbidden mood threshold condition. Then, one or more of the at least one valid moods may be selected for use with the MCI(s) in any suitable manner In some embodiments, mood determination may be dynamic or may be stored as any suitable metadata and/or may be represented in any suitable MCP management system 107 (e.g., a valid mood may be represented by any suitable mood node in metadata network 107*n*, which may enable faster mood determinations of a large media library, where each moment of an MCI collection determined to have one or more valid moods may be correlated to a valid mood node for each determined valid mood and later, in response to a selection (e.g., user selection) of a particular mood, the system may be operative to collect the MCIs from all moments correlated to the valid mood node associated with that selected mood for presentation in any suitable manner to the user (e.g., in an album or in one or more composite presentations or the like)).

In some embodiments, system 1 may be operative to determine at least one valid keyword to be associated for use in enhancing a presentation of a collection of MCIs. For example, any suitable keyword property list or dictionary, which may be similar to or provided as a portion of mood dictionary 500 of FIG. 5 (e.g., a .plist file), may be provided that may facilitate the identification of any appropriate keyword vector value for any vector element of any suitable identified keyword source. As just one example, operation 704 or any other suitable operation of process 700 shown or not shown in FIG. 7 may be operative to identify one or more potential keywords based on analysis of an identified MCI collection and any associated metadata, where each identified potential keyword may be associated with one or more keyword values (e.g., keyword vector values or a single keyword value per identified keyword) as may be defined in any suitable keyword dictionary that may be available to system 1. Different identified sources for a particular type of keyword may be associated with different keyword values in such a keyword dictionary. For example, a particular potential keyword "Orlando" may be identified in multiple types of metadata of an MCI collection, such as in any suitable location city metadata associated with the MCI collection (e.g., which may be represented by a location city metadata asset node (similar to city metadata asset node 420)) that may be indicative of the city (e.g., Orlando, Fla.) and such as in any suitable place POI metadata associated with the MCI collection (e.g., which may be represented by a place POI metadata asset node (similar to place POI metadata asset node 462)) that may be indicative of the POI (e.g., Disney World, Orlando, Fla.) and such as in and/or correlated with any suitable location home metadata associated with the MCI collection (e.g., which may be represented by a residence address asset node (similar to home metadata asset node 434)) that may be indicative of the city (e.g., Orlando, Fla.). In some embodiments, the keyword dictionary may be defined to provide a positive or recommended keyword value (e.g., +1) for potential keyword "Orlando" for an identified location city metadata keyword source and/or for an identified place POI metadata keyword source (e.g., to indicate that Orlando (a popular entertainment travel destination) may be a potential valid keyword (e.g., important keyword) for the MCI collection) but may also be defined to provide a negative or not-recommended or forbidden keyword value (e.g., −1) for potential keyword "Orlando" for an identified location home metadata keyword source (e.g., to indicate that Orlando (usually a popular entertainment destination) is the residence of a user and likely should not be associated with the general popular entertainment connotations that may be otherwise associated with Orlando and thus should likely not be a potential valid keyword (e.g., important keyword) for the MCI collection). Through identification of one or more potential keywords in one or more keyword sources of an MCI collection and its associated metadata, a keyword dictionary or any other suitable construct available to system 1 may be operative to define a source keyword vector or source keyword value for each combination of identified source and potential keyword (e.g., similar to a SMV value for each combination of identified source potential mood), and all defined source keyword values for a particular potential keyword may be processed to identify one or more valid keywords for the MCI collection (e.g., similar to one or more of the operations of one or more of the processes described herein with respect to SMVs). One or more of such identified one or more valid keywords may be selected and/or ordered in any suitable fashion (e.g., similar to selection of one or more valid moods (e.g., randomly, weighted randomly, ordered, etc.)) and then the selected valid keyword(s) may then be used in any suitable manner (e.g., with or without any selected valid mood(s), which may be determined independently of any keyword determination or not at all) to affect the MCI collection (e.g., to enhance a presentation of at least a portion of the MCI collection). Therefore, system 1 may be operative to process any suitable collection of MCIs and any suitable associated metadata in order to determine the likely relevancy of one or more potential important keywords (e.g., of a set of pre-defined keywords) with respect to the MCI collection.

System 1 may be operative to manage a media library in order to identify one or more valid moods and/or one or more valid keywords for use in any suitable manner with an MCI collection of the media library (e.g., to enhance a presentation of at least a portion of the MCI collection). For example, as shown in FIG. 6, system 1 may include a media management system 600 that may be provided to manage media of media library 105 of system 1, such as, for example, to (i) generate metadata network 107n, (ii) relate and/or present at least two MCIs 310 based on metadata network 107n, (iii) determine and/or present interesting MCIs 310 of library 105 based on metadata network 107n and predetermined criterion, (iv) select and/or present representative MCIs 310 to summarize a collection (e.g., a moment) of media content items based on input specifying the representative group's size, and/or (v) use metadata network 107n and/or any other data associated with library 105 to identify one or more valid moods and/or one or more valid keywords for a collection of MCIs 310, for example, such that any valid mood(s) and/or any valid keyword(s) may be used to enhance a presentation of at least a portion of the MCI collection. Media management system 600 may include any suitable modules, including, but not limited to, MCP management system 107n, which may include metadata network 107n, a collection generator 605, a layout generator 610, a context identifier 615, a scoring engine 620, a media compositor or collection enhancer 675, which may include a video compositor 625 and/or an audio compositor 630, a rendering engine 635, a mood identifier 670, and a keyword identifier 670'. As shown, media management system 600 may have access to media library 105 of MCPs 305, metadata network 107n of MCP management system 107, mood property dictionary 500, a keyword property dictionary 500', which may be similar to or a portion of mood property dictionary 500, media grouping templates 645, media collections 650, an audio library 655, a video presentation storage 660, and/or an audio presentation storage 665.

Media management system 600 may be operative to provide a media-compositing application (e.g., an application 103) that may automatically organize MCIs 310 of library 105 into different MCI collections and/or may enable a user to define MCI collections in any suitable manner, and that may then produce any suitable user interface ("UI") layout that may identify the defined MCI collections as collections for which the application may display composite presentations (e.g., video (e.g., audio/visual) presentations). Media management system 600 may enable such a media-compositing application that may be executed by system 1. Collection generator 605 and layout generator 610 may be operative to perform an automated process that may (i) analyze the MCIs (e.g., analyzes the MCIs and any associated metadata of library 105, including metadata network 107n and/or any suitable contextual data) to define one or more MCI collections and (ii) produce a UI layout that may identify the defined MCI collections as collections for which the application can display composite presentations. In performing such operations, these modules may use scoring engine 620 and/or context identifier 615. For example, to define the MCI collections, collection generator 605 may use one or more media grouping templates ("templates") of template storage 645 to try to associate each MCI of library 105 with one or more template instances. In some embodiments, a template in template storage 645 may be defined by reference to a set of media matching attributes and collection generator 605 may compare a template's attribute set with the content and/or metadata of the MCIs in order to identify MCIs that may match the template attributes, such that, when a sufficient number of MCIs match the attribute set of a template, the application may define a template instance by reference to the matching MCIs and may store such a template instance in media collection storage 650. In some embodiments, a template instance may include a list of MCI identifiers that identify the MCI's that matched the instance's template attribute set. Collection generator 605 may be operative to define multiple template instances for a template, such as where the templates may include (i) location-bounded templates (e.g., MCIs captured within a region with a particular radius), (ii) time-bounded templates (e.g., MCIs captured within a particular time range and/or date range), (iii) time-bounded and location-bounded templates (e.g., mornings at a beach), (iv) content-defined templates (e.g., MCIs containing smiles), and (v) user-metadata based templates (e.g., MCIs from albums created by a user, MCIs shared by a user with others, MCIs having particular user-defined metadata tags, etc.).

Based on template definition, layout generator 610 may generate any suitable UI layouts that may identify one or more defined template instances as MCI collections for which the application can display composite presentations. Layout generator 610 may generate a UI layout that identifies a subset of defined template instances that may be contextually relevant to a user of the device at a particular time (e.g., as based on any suitable contextual attributes that may be provided by context identifier 615 and any template instance scores that may be computed by scoring engine 620 (e.g., to assess whether one template instance is contextually more relevant than, and/or better than, another template instance at a particular time, scoring engine 620 may generate a score for each template instance, rank the template instances based on the generated scores, and then generate a UI layout based on the rankings so that a user may choose a template instance (e.g., MCI collection) for use in presenting a related composite presentation, where a template instance's score may be based on any suitable contextual information, such as (i) contextual attributes that may relate to the time at which the UI layout is being generated and/or displayed, and (ii) quality and/or quantity attributes that may relate to quality and/or quantity of the MCIs of the template instance, where examples of contextual attributes may include (i) time, (ii) location of device 100, (iii) location of future calendared events stored on, or accessible by, device 100, (iv) locations derived from electronic tickets stored on device 100, and/or the like).

When a user selects a particular template instance via any suitable UI, or when system 1 may automatically select a particular template instance in any suitable manner, layout generator 610 may direct collection enhancer 675 to generate media collection enhancement definitions that may be rendered by engine 635 to produce an enhancement (e.g., a composite presentation) for consumption by the user (e.g., via any suitable UI (e.g., I/O component 109a)) For example, layout generator 610 may be operative to direct video compositor 625 and/or audio compositor 630 to generate, for the selected template instance, the definitions of video and audio presentation components (e.g., for storage in storage 660 and/or 665), which rendering engine 635 may then render to produce a composite presentation for display. Collection enhancer 675 may generate the definition of the composite media presentation from the MCIs of the selected template instance. In some embodiments, a composition presentation may be generated for each template instance prior to selection of a particular template instance.

In some embodiments, the definition of a composite media presentation may include the identity of the MCIs of the collection that are to be included in the presentation, the presentation order for the included MCIs, and/or a list of any suitable edit operations (e.g., transition operations, special effects, etc.) that may be performed to generate the composite presentations from the MCIs. In some embodiments, the MCIs of the composite media presentation can be identical to the MCIs of the template instance, or they can be MCIs that the media compositor may derive from the instance's MCIs. For example, multiple MCIs of a template instance can be still photos, where, for some or all of these still photos, collection enhancer 675 (e.g., video compositor 625) may generate a video clip in the composite generation by specifying a particular type of effect (e.g., a "Ken Burns" effect) for each of these photos. Also, from a video clip MCI of a template instance, the application can extract one or more video clips to include in the composite presentation. Similarly, from an MCI that is a burst-mode sequence, collection enhancer 675 may be operative to extract one or more still photos of the sequence and/or one or more types of video clips for one or more of the still photos of the sequence. Many other examples of deriving the composite-presentation with MCIs from a template instance's MCIs exist.

Collection enhancer 675 may be operative to generate composite media definitions by selecting a blueprint from a number of possible blueprints for the composite presentation. A blueprint may describe the desired transitions, effects, edit styles (e.g., including pace of the edits), etc. for a composite presentation. A blueprint can also specify the desired type of presentation, which can then influence the type of MCIs included or emphasized in the composite presentation. For example, one blueprint might specify highlights as the desired type of presentation, while another blueprint might specify retrospective as the desired type. For highlights, collection generator 605 or collection enhancer 675 may select the best MCIs that are representative of the MCIs of the template instance. For retrospectives, collection generator 605 or collection enhancer 675 may select the MCIs that are not necessarily of the whole set of MCIs of the template instance. In some embodiments, a blueprint may determine the duration of the composite presentation that collection enhancer 675 may generate. System 600 may be operative to specify the duration based on the amount of high-quality, unique content in the MCI collection of the template instance. For instance, in some embodiments, a blueprint's specified parameters (e.g., parameters specifying ideal duration for the MCIs) along with the MCIs that are selected may determine the desired duration of the composite presentation. In some embodiments, the blueprint might also specify other suitable parameters.

A valid mood and/or valid keyword identified for the MCI collection of the template instance may be used by collection enhancer 675 to determine which blueprint of the available blueprints is to be used for defining the composite presentation. For example, as shown in FIG. 6, mood identifier 670 may be operative to access any suitable information associated with any MCI collection from collections 650 and may process that MCI collection with respect to mood property dictionary 500 (e.g., according to any suitable process described herein with respect to valid mood identification) in order to identify and associate one or more valid moods with that MCI collection, such that collection enhancer 675 may be operative to receive and utilize the one or more identified valid moods to determine the generation of the composite generation in any suitable way(s). Additionally or alternatively, keyword identifier 670' may be operative to access any suitable information associated with any MCI collection from collections 650 and may process that MCI collection with respect to keyword property dictionary 500' (e.g., according to any suitable process described herein with respect to valid keyword identification) in order to identify and associate one or more valid keywords with that MCI collection, such that collection enhancer 675 may be operative to receive and utilize the one or more identified valid keywords to determine the generation of the composite generation in any suitable way(s).

When an MCI collection is associated with a single valid mood, that mood may be used by collection enhancer 675 to determine an appropriate blueprint to be used to generate a composite presentation. If multiple valid moods may be associated with the MCI collection, collection enhancer 675 may choose a different blueprint for each mood and generate multiple composite presentations based on those blueprints, and each presentation may be suggested to the user for selection (e.g., in a suggested order that may be defined by any order of the valid moods if any may be provided (e.g., based on any weights of the valid moods) so as to prioritize one of the presentations over another for selection by the user). Alternatively, when an MCI collection is associated with a single valid keyword, that keyword may be used by collection enhancer 675 to determine an appropriate blueprint to be used to generate a composite presentation. If multiple valid keywords may be associated with the MCI collection, collection enhancer 675 may choose a different blueprint for each keyword and generate multiple composite presentations based on those blueprints, and each presentation may be suggested to the user for selection (e.g., in a suggested order that may be defined by any order of the valid keywords if any may be provided (e.g., based on any weights of the valid keywords) so as to prioritize one of the presentations over another for selection by the user). In some embodiments, a user may be enabled via any suitable UI to change a mood associated with a composite presentation (e.g., by choosing a mood associated with another blueprint) such that a different composite presentation may be presented to the user. Additionally or alternatively, a user may be enabled via any suitable UI to change a duration of time associated with a composite presentation (e.g., by choosing a specific length of time to be associated with the composite presentation) such that a different composite presentation may be presented to the user. Alternatively the length of time may be automatically chosen based on any identified valid mood and/or valid keyword and/or based on the blueprint selected.

In some embodiments, collection enhancer 675 may be operative to provide the particular duration of time for the composite presentation to audio compositor 630, after such a duration may have been selected by a user and/or mood and/or keyword and/or blueprint. Based on the received duration, audio compositor 630 may dynamically define a composite audio presentation to accompany the composite media presentation of video compositor 625. Audio compositor 630 may dynamically define an audio presentation to include several audio segments (e.g., of one or more of the MCIs and/or from audio library 655) in a particular sequence, and a set of edits and transitions between the audio segments in the sequence. In some embodiments, the audio segments are part of one song, while in other embodiments, they can be part of two or more songs. These audio segments may be referred to as body segments to signify that they are parts of another song. In some embodiments, audio compositor 630 may also select an ending segment from several candidate ending segments for the composite audio presentation. Audio compositor 630 may select a starting segment from several starting segments for the composite audio presentation. An editor may define a body, starting and ending segments from one or more songs by using any suitable audio authoring tools.

When an MCI collection is associated with a single valid mood, that mood may be used by audio compositor 630 to determine an appropriate song or collection of songs to be used to generate at least a portion of an audio portion of composite presentation. If multiple valid moods may be associated with the MCI collection, audio compositor 630 may choose an appropriate song or collection of songs to be used to generate at least a portion of an audio portion of a composite presentation for each mood and generate multiple composite presentations or may choose an appropriate song or collection of songs to be used to generate at least a portion of an audio portion of a composite presentation based on all the valid moods to generate one composite presentation. When an MCI collection is associated with a single valid keyword, that keyword may be used by audio compositor 630 to determine an appropriate song or collection of songs to be used to generate at least a portion of an audio portion of composite presentation. If multiple valid keywords may be associated with the MCI collection, audio compositor 630 may choose an appropriate song or collection of songs to be used to generate at least a portion of an audio portion of a composite presentation for each keyword and generate multiple composite presentations or may choose an appropriate song or collection of songs to be used to generate at least a portion of an audio portion of a composite presentation based on all the valid keywords to generate one composite presentation. In some particular embodiments, a particular blueprint may be selected based on one or more valid moods associated with the MCI collection, where the particular blueprint may be associated with a number of different possible songs, and a particular one or more of the different possible songs may be selected for the particular blueprint based on one or more valid keywords associated with the MCI collection. Alternatively, no matter how a blueprint may be selected, one or more songs to be used for defining a composite presentation with the selected blueprint may be selected based on one or more valid keywords associated with the MCI collection. The group of available songs from which collection enhancer 675 (e.g., audio compositor 630) may select one or more songs (e.g., from audio library 655) may be any suitable collection of songs, which may be a particular curated list of music for collection enhancer 675 or may be any suitable song from a library of songs available to system 1 (e.g., a user's personal music collection available to system 1). Each song may be associated with any suitable metadata that may be used by collection enhancer 675 in order to select an appropriate one or more songs based on any valid keywords and/or moods associated with the MCI collection. For example, lyric metadata and/or song title metadata and/or artist metadata and/or tempo metadata and/or song style metadata and/or the like may be compared with any valid keyword(s) and/or mood(s) to identify one or more songs to use for generating one or more composite presentations for the MCI collection. For example, a valid keyword of "Orlando" or "Disney" may be operative to enable collection enhancer to identify and select a Disney-themed song for use with the composite presentation.

After collection enhancer 675 may generate a definition of the composite presentation (e.g., after video compositor 625 may generate a definition for a video/media presentation, and after audio compositor 630 may generate a definition for an audio (e.g., song) presentation), the generated presentation definition(s) may be stored in storage (e.g., video/media presentation definition(s) in storage 660 and audio (e.g., song) presentation definition(s) in storage 665, although in some embodiments one storage (e.g., one file) may be used for both video and audio definitions). Rendering engine 635 may then retrieve the definition(s) and generate a rendered composite presentation from the definition(s), which may then be output to a frame buffer of the system for presentation. One of ordinary skill will realize that system 600 may operate in any other suitable manner, such as, instead of defining a composite presentation for a template instance after a user selects a particular instance and/or mood and/or duration, system 600 may defines the composite presentation for some or all appropriate MCI collections in advance of receive any user selection. For instance, in some embodiments, the system may identify a subset of composite presentations that should initially be concurrently represented on a UI layout, and to identify an order of summary panes for those composite presentations on the UI layout. Alternatively, some embodiments may render the composite presentations before generating the UI layout, while still other embodiments may define a portion of a composite presentation before the UI layout is generated, and then may generate the rest of the definition of the composite presentation after the UI layout is generated.

In some embodiments, after a user selects a particular MCI collection of a particular template instance, system 600 may direct collection enhancer 675 to generate, for the selected template instance, the definition of the composite presentation. To generate the definition of the media composite presentation, collection enhancer 675 may automatically pick a mood for the composite presentation based on any suitable available data, including one or more identified valid moods and/or one or more identified valid keywords. After picking the mood (e.g., collection enhancer 675 may be operative to randomly select or specifically select one of multiple identified valid moods using any suitable technique of the techniques described above with respect to process 700 (e.g., based on history and/or weights and/or the like)), collection enhancer 675 may select from a number of different blueprints a particular blueprint for the composite presentation based on the picked mood. The blueprint may describe any suitable characteristics of the presentation to be generated based on the blueprint, including, but not limited to, the desired transitions, effects, edit styles (e.g., including pace of the edits), the desired type of presentation, and/or the like, where one or more of such characteristics may vary between different blueprints. Collection enhancer 675 may select a subset or all of the MCIs of the MCI collection based on the picked mood and/or the selected blueprint for use in generating the composite presentation. Collection enhancer 675 may select a particular duration of time for the composite presentation based on the picked mood and/or the selected blueprint and/or the selected MCIs for use in generating the composite presentation. In conjunction with the selected blueprint, which may specify the type of desired edits (e.g., fast transition edits, or slow transition edits), the selection of the subset of MCIs may allow collection enhancer 675 to automatically define the duration of the composite presentation without any user input. After computing the desired duration of the composite presentation, collection enhancer 675 may provide this duration to audio compositor 630 in order for audio compositor 630 to dynamically generate the definition of a song presentation that has this duration. As mentioned above, audio compositor 630 may be operative to generate this definition by exploring different combinations of body segments from one or more songs available songs, along with different possible starting and ending segments, where one or more songs may be selected from a collection of available songs based on one or more of any valid mood(s) associated with the MCI collection, any valid keyword(s) associated with the MCI collection, the mood chosen for the presentation, the blueprint chosen for the presentation, and/or the duration of time chosen for the presentation. Then the video/media/audio presentation definitions may be synched and provided to rendering engine 635 that may generate a rendered composite presentation from these definitions.

Before or after viewing a composite presentation, system 600 may be configured to allow a user to modify the composite presentation. For instance, in some embodiments, the user can modify the duration or mood of the composite presentation. Some embodiments also may allow the user to change the song that is used for the composite presentation. Similarly, some embodiments may allow the user to change the MCIs (e.g., add or delete MCIs) that are used for the composite presentation. GUI screens 190*a*-190*d* of FIGS. 2A-2D may illustrate how an exemplary UI of a media management application of system 600 may represent a machine-selected mood and machine-generated duration of the composite presentation, and how this UI may allow the user to change this presentation and duration. Each one of the four operational stages of screens 190*a*-190*d* may show a page of these stages shows a page 200 that displays a viewer 210 in which the composite presentation can be played. In such embodiments, as shown, page 200 may be illustrated as representative of after finishing a full-screen display of the composite presentation or after the user stops the full-screen composite presentation display. In some embodiments, the user may have to select the viewer (e.g., by tapping it) to start a full screen display of the presentation again, or to start a display of this presentation just in the viewer's window. Each stage of FIGS. 2A-2D also shows a mood slider 215 and a duration slider 220. Each slider lists a number of candidate slider values that can scroll left and right across the screen in a sliding direction when the user performs a drag operation on the slider. The mood slider lists several mood values (e.g., Happy, Epic, Chill, Gentle, Sentimental, etc.), while the duration slider lists several durations (e.g., 30 seconds, 45 seconds, 60 seconds, etc.).

The first stage of FIG. 2A shows the user performing a drag operation on mood slider 515. This stage also shows the machine-selected mood for the composite presentation is happy. The second stage of FIG. 2B shows the user selecting the Epic mood in order to change the mood of the composite presentation from Happy to Epic. The third of FIG. 2C shows that the presentation mood has been changed to Epic. The third stage may also show the user performing a drag operation on duration slider 520. This stage also shows the machine-defined duration for the composite presentation is 30 seconds. The fourth stage of FIG. 2D shows the user selecting a 60 second duration in order to change the duration of the composite presentation from 30 seconds to 60 seconds. The fourth stage also shows that the presentation duration has been changed to 60 seconds. The mood options that may be presented by mood slider 215 may be selected and/or ordered based on the one or more identified valid moods and/or the one or more identified valid keywords for the MCI collection associated with the composite presentation. For example, continuing with the example where moods 502, 503, 504, and 507 were identified as valid, and where second mood 502 may be weighted with a weight value of +¾, third mood 503 may be weighted with a weight value of +⅝, fourth mood 504 may be weighted with a weight value of +⅝, and seventh mood 507 may be weighted with a weight value of +⅞, and each weighted valid mood may be provided to collection enhancer 675, then collection enhancer 675 may be operative to automatically select most weighted seventh mood 507 as the initial mood with which to define the composite presentation (e.g., select the blueprint, etc.), and that may be the mood initially selected at the first stage of FIG. 2A. Moreover, the other valid moods may be ordered based on weight and presented in that order next to seventh mood 507 with mood slider 215 such that mood slider 215 may at least present the weighted valid moods in order before presenting other moods for a user to select from that may not be an identified valid mood. Therefore, each identified valid mood may be operative to affect the UI presentation even if only one of the identified valid moods may be picked to initially define the composite presentation initially presented to the user.

FIG. 8 is a flowchart of an illustrative process 800 for analyzing media content (e.g., on an electronic device). At operation 802 of process 800, the electronic device may identify a collection of media content items (MCIs) of a media library and metadata associated with the media library. Continuing with process 800, the electronic device may identify at least one valid mood of a plurality of moods for use with the identified collection of MCIs. For example, at operation 804 of process 800, the electronic device may analyze the collection of MCIs and the metadata to identify a plurality of mood sources associated with the collection of MCIs. At operation 806 of process 800, the electronic device may obtain, for each mood source of the identified number of mood sources, a source mood vector ("SMV") (or any other suitable source mood statistical representation) including a plurality of SMV elements, wherein each SMV element of the plurality of SMV elements is associated with a respective mood of the plurality of moods, and wherein each SMV element of the plurality of SMV elements includes a SMV value. At operation 808 of process 800, the electronic device may determine, based on the SMV obtained for each mood source of the identified plurality of mood sources, a group positive mood vector ("GPMV") (or any other suitable group positive mood statistical representation) including a plurality of GPMV elements, wherein each GPMV element of the plurality of GPMV elements is associated with a respective mood of the plurality of moods, and wherein each GPMV element of the plurality of GPMV elements includes a GPMV value. At operation 810 of process 800, the electronic device may determine, based on the SMV obtained for each mood source of the identified plurality of mood sources, a group negative mood vector ("GNMV") (or any other suitable group negative mood statistical representation) including a plurality of GNMV elements, wherein each GNMV element of the plurality of GNMV elements is associated with a respective mood of the plurality of moods, and wherein each GNMV element of the plurality of GPMV elements includes a GNMV value. At operation 812 of process 800, the electronic device may determine, for each mood of the plurality of moods, that the mood is a valid mood by determining that the GPMV value of the GPMV element associated with the mood satisfies a GPMV threshold condition and determining that the GNMV value of the GNMV element associated with the mood satisfies a GNMV threshold condition (e.g., at least one mood of a plurality of potential moods may be identified as a valid mood by determining a GPMV from (weighted or unweighted) positive values of SMVs associated with identified mood sources of an MCI collection, by determining a GNMV from (weighted or unweighted) negative values of SMVs associated with identified mood sources of the MCI collection, and determining whether the value of each GPMV and GNMV associated with a mood satisfies a respective condition).

It is understood that the operations shown in process 800 of FIG. 8 are only illustrative and that existing operations may be modified or omitted, additional operations may be added, and the order of certain operations may be altered.

Figure 9:
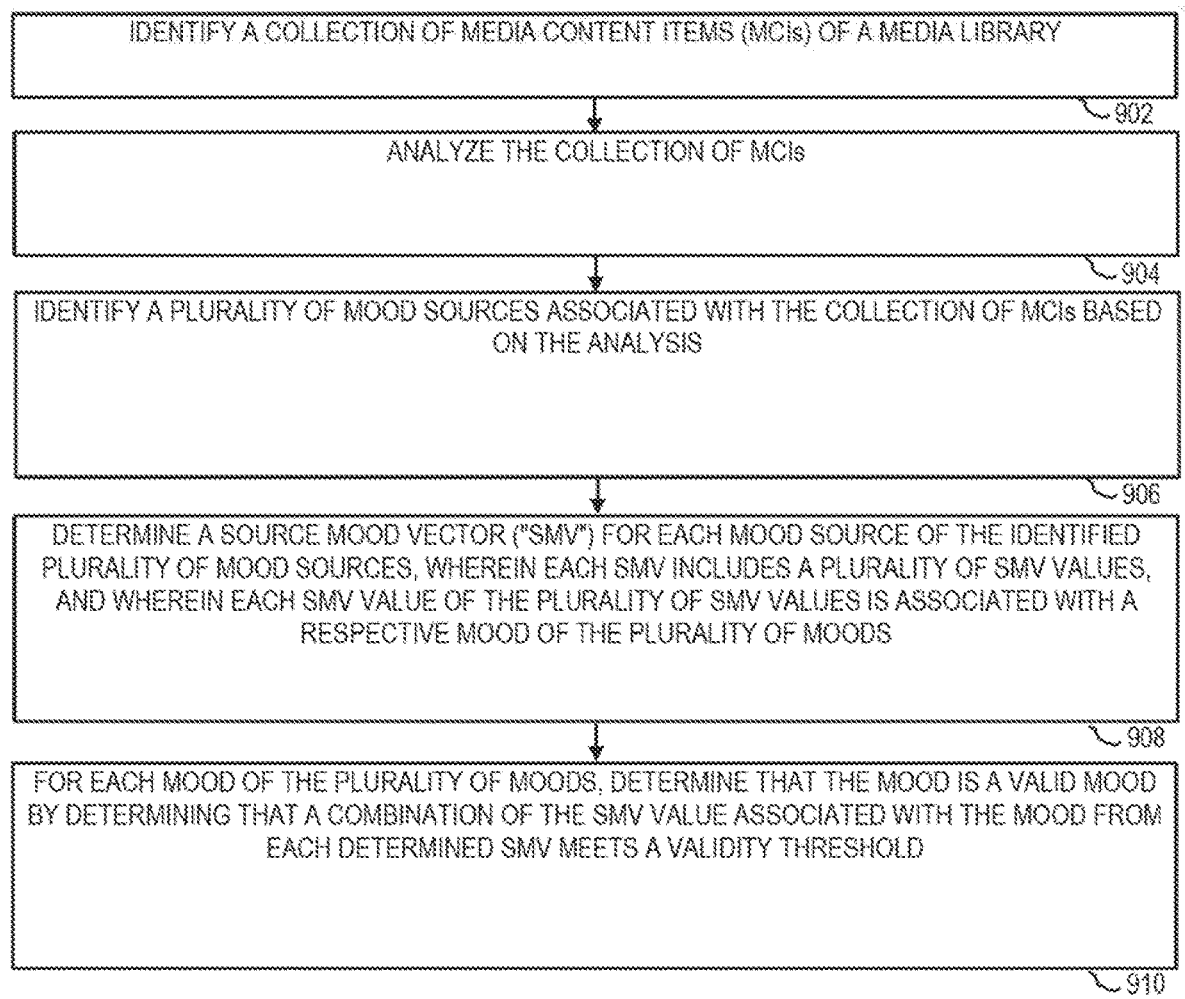

FIG. 9 is a flowchart of an illustrative process 900 for managing a media library with a computing system. At operation 902 of process 800, the computing system may identify a collection of media content items (MCIs) of the media library. Continuing with process 900, the computing system may identify at least one valid mood of a plurality of moods for use with the identified collection of MCIs. For example, at operation 904 of process 900, the computing system may analyze the collection of MCIs. At operation 906 of process 900, the computing system may identify a plurality of mood sources associated with the collection of MCIs based on the analysis. At operation 908 of process 900, the computing system may determine a source mood vector ("SMV") (or any other suitable source mood statistical representation) for each mood source of the identified plurality of mood sources, wherein each SMV (or any other suitable source mood statistical representation) includes a plurality of SMV values, and wherein each SMV value of the plurality of SMV values is associated with a respective mood of the plurality of moods. At operation 910 of process 900, the computing system may determine, for each mood of the plurality of moods, that the mood is a valid mood by determining that a combination of the SMV value associated with the mood from each determined SMV meets a validity threshold (e.g., at least one mood of a plurality of potential moods may be identified as a valid mood by analyzing values from determined SMVs associated with identified mood sources of the MCI collection).

It is understood that the operations shown in process 900 of FIG. 9 are only illustrative and that existing operations may be modified or omitted, additional operations may be added, and the order of certain operations may be altered.

Figure 10:
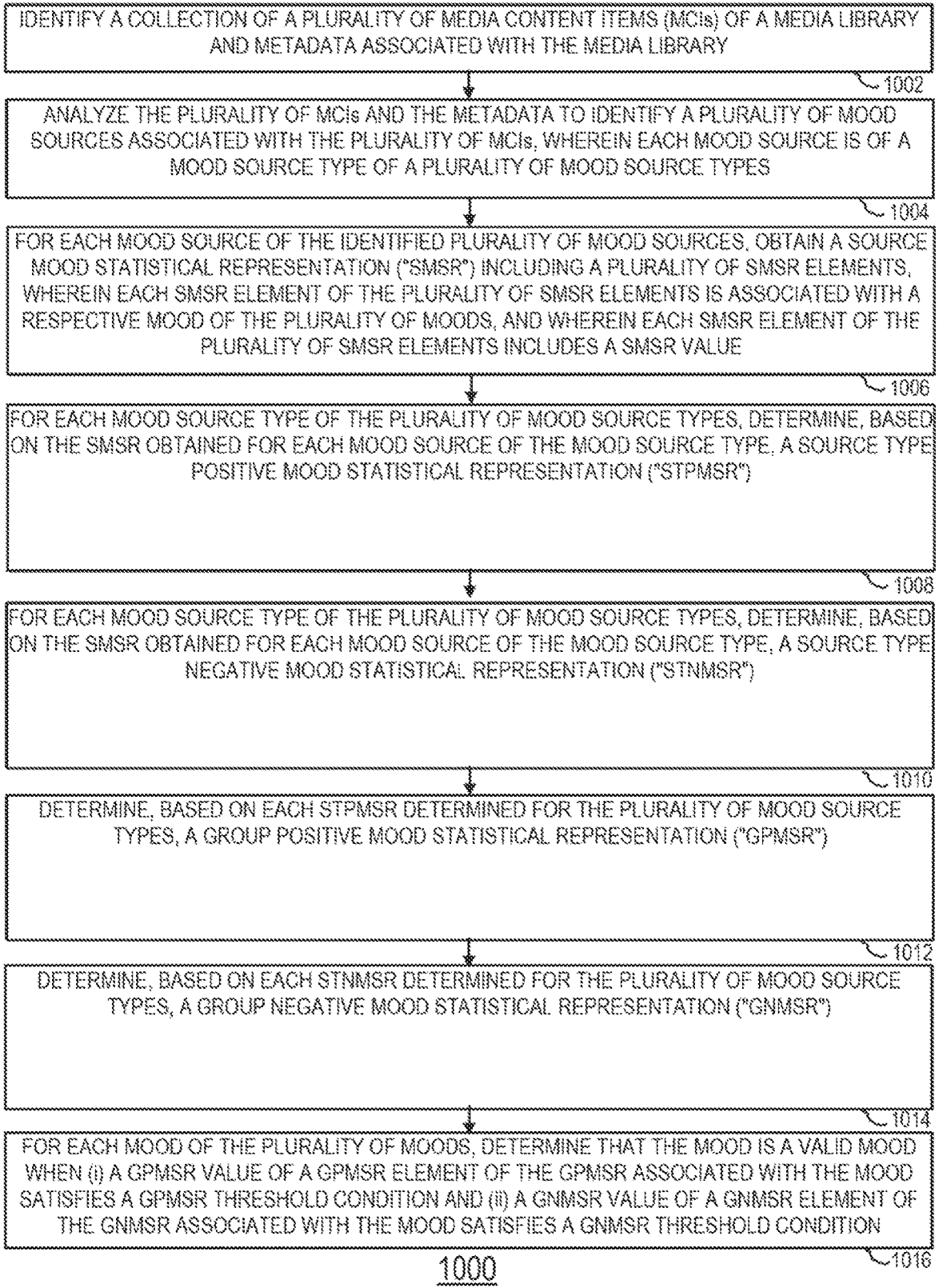

FIG. 10 is a flowchart of an illustrative process 1000 for managing a media library with a computing system. At operation 1002 of process 1000, the computing system may identify a collection of a plurality of media content items (MCIs) of a media library and metadata associated with the media library. Continuing with process 1000, the computing system may identify at least one valid mood of a plurality of moods for use with the identified collection of MCIs. For example, at operation 1004 of process 1000, the computing system may analyze the plurality of MCIs and the metadata to identify a plurality of mood sources associated with the plurality of MCIs, wherein each mood source is of a mood source type of a plurality of mood source types. At operation 1006 of process 1000, the computing system may obtain, for each mood source of the identified plurality of mood sources, a source mood statistical representation (SMSR) including a plurality of SMSR elements, wherein each SMSR element of the plurality of SMSR elements is associated with a respective mood of the plurality of moods, and wherein each SMSR element of the plurality of SMSR elements includes a SMSR value. At operation 1008 of process 1000, the computing system may, for each mood source type of the plurality of mood source types, determine, based on the SMSR obtained for each mood source of the mood source type, a source type positive mood statistical representation (STPMSR). At operation 1010 of process 1000, the computing system may, for each mood source type of the plurality of mood source types, determine, based on the SMSR obtained for each mood source of the mood source type, a source type negative mood statistical representation (STNMSR). At operation 1012 of process 1000, the computing system may determine, based on each STPMSR determined for the plurality of mood source types, a group positive mood statistical representation (GPMSR). At operation 1014 of process 1000, the computing system may determine, based on each STNMSR determined for the plurality of mood source types, a group negative mood statistical representation (GNMSR). At operation 1016 of process 1000, the computing system may, for each mood of the plurality of moods, determine that the mood is a valid mood when a GPMSR value of a GPMSR element of the GPMSR associated with the mood satisfies a GPMSR threshold condition and when a GNMSR value of a GNMSR element of the GNMSR associated with the mood satisfies a GNMSR threshold condition.

It is understood that the operations shown in process 1000 of FIG. 10 are only illustrative and that existing operations may be modified or omitted, additional operations may be added, and the order of certain operations may be altered.

Figure 11:
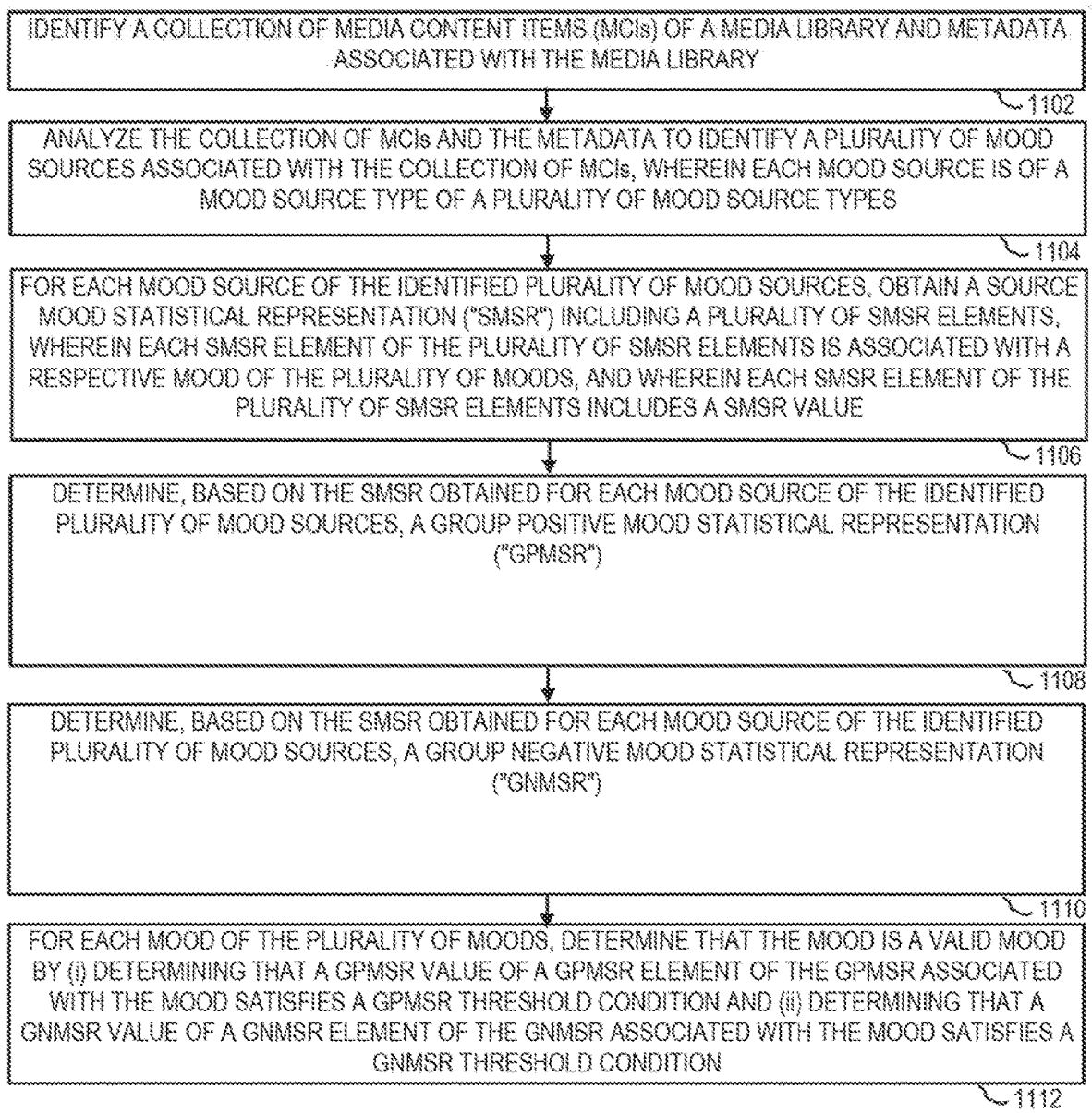

FIG. 11 is a flowchart of an illustrative process 1100 for managing a media library with a computing system. At operation 1102 of process 1100, the computing system may identify a collection of media content items (MCIs) of a media library and metadata associated with the media library. Continuing with process 1100, the computing system may identify at least one valid mood of a plurality of moods for use with the identified collection of MCIs. For example, at operation 1104 of process 1100, the computing system may analyze the collection of MCIs and the metadata to identify a plurality of mood sources associated with the collection of MCIs. At operation 1106 of process 1100, the computing system may obtain, for each mood source of the identified plurality of mood sources, a source mood statistical representation (SMSR) including a plurality of SMSR elements, wherein each SMSR element of the plurality of SMSR elements is associated with a respective mood of the plurality of moods, and wherein each SMSR element of the plurality of SMSR elements includes a SMSR value. At operation 1108 of process 1100, the computing system may determine, based on the SMSR obtained for each mood source of the identified plurality of mood sources, a group positive mood statistical representation (GPMSR). At operation 1110 of process 1100, the computing system may determine, based on the SMSR obtained for each mood source of the identified plurality of mood sources, a group negative mood statistical representation (GNMSR). At operation 1112 of process 1100, the computing system may determine, for each mood of the plurality of moods, that the mood is a valid mood by determining that a GPMSR value of a GPMSR element associated with the mood satisfies a GPMSR threshold condition and determining that a GNMSR value of a GNMSR element associated with the mood satisfies a GNMSR threshold condition.

It is understood that the operations shown in process 1100 of FIG. 11 are only illustrative and that existing operations may be modified or omitted, additional operations may be added, and the order of certain operations may be altered.

Figure 12:
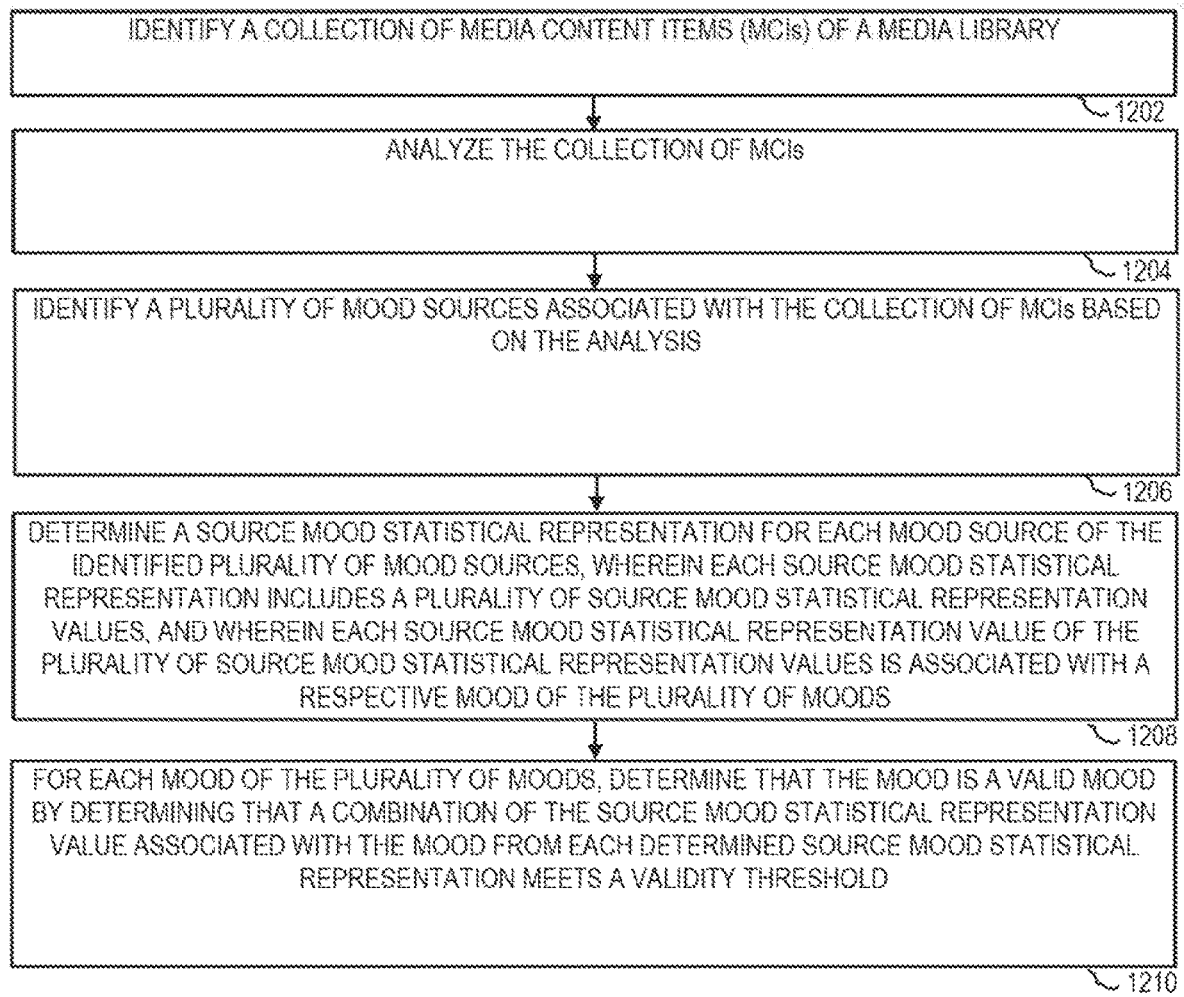

FIG. 12 is a flowchart of an illustrative process 1200 for managing a media library with a computing system. At operation 1202 of process 1200, the computing system may identify a collection of media content items (MCIs) of a media library. Continuing with process 1200, the computing system may identify at least one valid mood of a plurality of moods for use with the identified collection of MCIs. For example, at operation 1204 of process 1200, the computing system may analyze the collection of MCIs. At operation 1206 of process 1200, the computing system may identify a plurality of mood sources associated with the collection of MCIs based on the analyzing. At operation 1208 of process 1200, the computing system may determine a source mood statistical representation for each mood source of the identified plurality of mood sources, wherein each source mood statistical representation includes a plurality of source mood statistical representation values, and wherein each source mood statistical representation value of the plurality of source mood statistical representation values is associated with a respective mood of the plurality of moods. At operation 1210 of process 1200, the computing system may determine, for each mood of the plurality of moods, that the mood is a valid mood by determining that a combination of the source mood statistical representation value associated with the mood from each determined source mood statistical representation meets a validity threshold.

It is understood that the operations shown in process 1200 of FIG. 12 are only illustrative and that existing operations may be modified or omitted, additional operations may be added, and the order of certain operations may be altered.

One, some, or all of the processes described with respect to FIGS. 1-12 may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of such a non-transitory computer-readable medium (e.g., memory 104 of FIG. 1) may include, but are not limited to, read-only memory, random-access memory, flash memory, CD-ROMs, DVDs, magnetic tape, removable memory cards, optical data storage devices, and the like. The computer-readable medium can also be distributed over network-coupled computer systems so that the computer-readable code is stored and executed in a distributed fashion. For example, the computer-readable medium may be communicated from one electronic device to another electronic device using any suitable communications protocol (e.g., the computer-readable medium may be communicated to electronic device 100 via any suitable communications circuitry 106 (e.g., as at least a portion of application 103)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module of media management system 600 may be provided as a software construct, firmware construct, one or more hardware components, or a combination thereof. For example, any or each module of media management system 600 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules of media management system 600 are only illustrative, and that the number, configuration, functionality, and interconnection of existing modules may be modified or omitted, additional modules may be added, and the interconnection of certain modules may be altered.

At least a portion of one or more of the modules of media management system 600 may be stored in or otherwise accessible to device 100 in any suitable manner (e.g., in memory 104 of device 100 (e.g., as at least a portion of application 103)) and/or to server 50. Any or each module of media management system 600 may be implemented using any suitable technologies (e.g., as one or more integrated circuit devices), and different modules may or may not be identical in structure, capabilities, and operation. Any or all of the modules or other components of media management system 600 may be mounted on an expansion card, mounted directly on a system motherboard, or integrated into a system chipset component (e.g., into a "north bridge" chip).

Any or each module of media management system 600 may be a dedicated system implemented using one or more expansion cards adapted for various bus standards. For example, all of the modules may be mounted on different interconnected expansion cards or all of the modules may be mounted on one expansion card. With respect to media management system 600, by way of example only, the modules of media management system 600 may interface with a motherboard or processor 102 of device 100 through an expansion slot (e.g., a peripheral component interconnect ("PCI") slot or a PCI express slot). Alternatively, media management system 600 need not be removable but may include one or more dedicated modules that may include memory (e.g., RAM) dedicated to the utilization of the module. In other embodiments, media management system 600 may be at least partially integrated into device 100. For example, a module of media management system 600 may utilize a portion of device memory 104 of device 100. Any or each module of media management system 600 may include its own processing circuitry and/or memory. Alternatively, any or each module of media management system 600 may share processing circuitry and/or memory with any other module of media management system 600 and/or processor 102 and/or memory 104 of device 100. Alternatively, any or each module of media management system 600 may share processing circuitry and/or memory of server 50 remote from device 100.

As described above, one aspect of the present technology is the gathering and use of data available from various sources to determine at least one valid mood for a collection of MCIs of a media library. The present disclosure contemplates that in some instances, this gathered data may include personal information data that uniquely identifies or can be used to contact or locate a specific person. Such personal information data can include demographic data, location-based data, telephone numbers, email addresses, social network identifiers, home addresses, office addresses, data or records relating to a user's health or level of fitness (e.g., vital signs measurements, medication information, exercise information, etc.), date of birth, or any other identifying or personal information.

The present disclosure recognizes that the use of such personal information data, in the present technology, can be used to the benefit of users. For example, the personal information data can be used to improve the determination of at least one valid mood for a collection of MCIs of a media library with the electronic device. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act ("HIPAA"); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of location detection services, the present technology can be configured to allow users to select to "opt in" or "opt out" of participation in the collection of personal information data during registration for services or anytime thereafter. In addition to providing "opt in" or "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, the determination of at least one valid mood for a collection of MCIs of a media library can be made based on non-personal information data or a bare minimum amount of personal information, such as the content being requested by the device associated with a user, other non-personal information available to the device, or publicly available information.

While there have been described systems, methods, and computer-readable media for determining at least one valid mood for a collection of MCIs of a media library, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A method for producing a composite presentation of media items, the method comprising, at a computing device:
    accessing a plurality of media items included in a media library accessible to the computing device, wherein each media item of the plurality of media items is associated with at least one mood source;
    identifying at least one mood on which to base the composite presentation;
    obtaining, from the plurality of media items, a subset of media items, wherein each media item of the subset of media items is associated with at least one mood source that corresponds to the at least one mood; and
    in response to identifying that a number of media items included in the subset of media items are available to produce the composite presentation:
        forming a collection of media items based on at least some of the media items of the subset of media items,
        producing the composite presentation based on the collection of media items, and adding an audio track to the composite presentation, wherein:
            the audio track is identified based on a template that corresponds to the composite presentation,
            the audio track corresponds to the at least one mood, and
            a length of the audio track corresponds to a duration of the composite presentation.

2. The method of claim 1, wherein the at least one mood is identified based on:

identifying that a threshold number of media items included in the plurality of media items are associated with at least one mood source that corresponds to the at least one mood; or receiving a selection of the at least one mood through a user interface of the computing device.

3. The method of claim 1, wherein the mood sources associated with at least some media items of the plurality of media items are assigned based on data provided by at least one sensor that is communicably coupled to the computing device.

4. The method of claim 3, wherein, for a given media item of the plurality of media items, the at least one mood source is assigned at a time the media item is obtained by the computing device.

5. The method of claim 1, wherein the composite presentation is further based on a selection of a duration received at the computing device.

6. The method of claim 1, wherein the composite presentation is further based on a template that defines at least one characteristic for the composite presentation to exhibit.

7. The method of claim 1, wherein the audio track comprises a composition of at least two audio tracks that are selected or generated based on the at least one mood.

8. A non-transitory computer readable storage medium configured to store instructions that, when executed by a processor included in a computing device, cause the computing device to produce a composite presentation of media items, by carrying out steps that include:

accessing a plurality of media items included in a media library accessible to the computing device, wherein each media item of the plurality of media items is associated with at least one mood source;

identifying at least one mood on which to base the composite presentation;

obtaining, from the plurality of media items, a subset of media items, wherein each media item of the subset of media items is associated with at least one mood source that corresponds to the at least one mood; and in response to identifying that a number of media items included in the subset of media items are available to produce the composite presentation:

forming a collection of media items based on at least some of the media items of the subset of media items, producing the composite presentation based on the collection of media items, and adding an audio track to the composite presentation, wherein:

the audio track is identified based on a template that corresponds to the composite presentation, the audio track corresponds to at least one mood, and a length of the audio track corresponds to a duration of the composite presentation.

9. The non-transitory computer readable storage medium of claim 8, wherein the at least one mood is identified based on:

identifying that a threshold number of media items included in the plurality of media items are associated with at least one mood source that corresponds to the at least one mood; or receiving a selection of the at least one mood through a user interface of the computing device.

10. The non-transitory computer readable storage medium of claim 8, wherein the mood sources associated with at least some media items of the plurality of media items are assigned based on data provided by at least one sensor that is communicably coupled to the computing device.

11. The non-transitory computer readable storage medium of claim 10, wherein, for a given media item of the plurality of media items, the at least one mood source is assigned at a time the media item is obtained by the computing device.

12. The non-transitory computer readable storage medium of claim 8, wherein the composite presentation is further based on a selection of a duration received at the computing device.

13. The non-transitory computer readable storage medium of claim 8, wherein the composite presentation is further based on a template that defines at least one characteristic for the composite presentation to exhibit.

14. The non-transitory computer readable storage medium of claim 8, wherein the audio track comprises a composition of at least two audio tracks that are selected or generated based on the at least one mood.

15. A computing device configured to produce a composite presentation of media items, the computing device comprising a processor configured to cause the computing device to carry out steps that include:

accessing a plurality of media items included in a media library accessible to the computing device, wherein each media item of the plurality of media items is associated with at least one mood source;

identifying at least one mood on which to base the composite presentation;

obtaining, from the plurality of media items, a subset of media items, wherein each media item of the subset of media items is associated with at least one mood source that corresponds to the at least one mood; and in response to identifying that a number of media items included in the subset of media items are available to produce the composite presentation:

forming a collection of media items based on at least some of the media items of the subset of media items, producing the composite presentation based on the collection of media items, and adding an audio track to the composite presentation, wherein:

the audio track is identified based on a template that corresponds to the composite presentation, the audio track corresponds to the at least one mood, and a length of the audio track corresponds to a duration of the composite presentation.

16. The computing device of claim 15, wherein the at least one mood is identified based on:

identifying that a threshold number of media items included in the plurality of media items are associated with at least one mood source that corresponds to the at least one mood; or receiving a selection of the at least one mood through a user interface of the computing device.

17. The computing device of claim 15, wherein the mood sources associated with at least some media items of the plurality of media items are assigned based on data provided by at least one sensor that is communicably coupled to the computing device.

18. The computing device of claim 17, wherein, for a given media item of the plurality of media items, the at least one mood source is assigned at a time the media item is obtained by the computing device.

19. The computing device of claim 15, wherein the composite presentation is further based on a selection of a duration received at the computing device.

20. The computing device of claim 15, wherein the composite presentation is further based on a template that defines at least one characteristic for the composite presentation to exhibit.

* * * * *

UNITED STATES PATENT AND TRADEMARK OFFICE
CERTIFICATE OF CORRECTION

PATENT NO. : 11,567,985 B2  
APPLICATION NO. : 16/989332  
DATED : January 31, 2023  
INVENTOR(S) : Eric Circlaeys et al.

Page 1 of 1

It is certified that error appears in the above-identified patent and that said Letters Patent is hereby corrected as shown below:

In the Specification

At Column 14, Line 25: "nimbler, vibrator, haptic and/or taptic component, etc.), a" should read -- rumbler, vibrator, haptic and/or taptic component, etc.), a --.

Signed and Sealed this  
Thirty-first Day of October, 2023

Katherine Kelly Vidal  
*Director of the United States Patent and Trademark Office*